United States Patent
Kirkley et al.

(10) Patent No.: US 9,745,770 B2
(45) Date of Patent: Aug. 29, 2017

(54) CRUCIFORM TOWER

(71) Applicant: Tindall Corporation, Spartanburg, SC (US)

(72) Inventors: Kevin Lee Kirkley, Atlanta, GA (US); Bryant Allan Zavitz, Dunwoody, GA (US)

(73) Assignee: TINDALL CORPORATION, Spartanburg, SC (US)

( * ) Notice: Subject to any disclaimer, the term of this patent is extended or adjusted under 35 U.S.C. 154(b) by 0 days.

(21) Appl. No.: 14/106,422

(22) Filed: Dec. 13, 2013

(65) Prior Publication Data

US 2015/0052836 A1 Feb. 26, 2015

Related U.S. Application Data

(60) Provisional application No. 61/868,901, filed on Aug. 22, 2013.

(51) Int. Cl.
| | |
|---|---|
| *E04H 12/34* | (2006.01) |
| *E04H 12/16* | (2006.01) |
| *E04H 12/12* | (2006.01) |
| *F03D 1/00* | (2006.01) |
| *F03D 13/20* | (2016.01) |

(52) U.S. Cl.
CPC ........... *E04H 12/342* (2013.01); *E04H 12/12* (2013.01); *E04H 12/16* (2013.01); *F03D 1/001* (2013.01); *F03D 13/20* (2016.05); *F03D 13/22* (2016.05); *F05B 2240/40* (2013.01); *F05B 2240/912* (2013.01); *Y02E 10/728* (2013.01)

(58) Field of Classification Search
CPC ..... F03D 11/04; E02D 27/425; E04H 12/085; E04H 12/342; E04H 12/16; E04C 3/34; E04B 1/38
USPC ......... 52/592.3, 592.5, 592.6, 223.5, 396.02, 52/396.08, 848
See application file for complete search history.

(56) References Cited

U.S. PATENT DOCUMENTS

| | | | | | |
|---|---|---|---|---|---|
| 1,673,640 | A | * | 6/1928 | Rau ........................... | E04B 1/68 52/396.01 |
| 2,792,704 | A | * | 5/1957 | Kooiman .................. | E04B 2/28 52/437 |
| 3,077,703 | A | * | 2/1963 | Bergstrom ............ | E04B 1/6812 52/396.04 |
| 3,290,849 | A | * | 12/1966 | Wright ...................... | E04B 2/14 52/440 |

(Continued)

FOREIGN PATENT DOCUMENTS

WO 2010057187 A2 5/2010

OTHER PUBLICATIONS

100m Structural Concrete Wind Tower Drawings, dated Sep. 2011.

(Continued)

*Primary Examiner* — Paola Agudelo
(74) *Attorney, Agent, or Firm* — The Tracy IP Law Firm, PLLC

(57) ABSTRACT

A tower includes a plurality of stacked sections extending in a longitudinal direction from a base section to a top section. At least one of the stacked sections includes a first block and a second block joined together. The first block and the second block have interlocking portions such that a first portion of the first block is located above a first portion of the second block in the longitudinal direction.

18 Claims, 56 Drawing Sheets

(56) References Cited

U.S. PATENT DOCUMENTS

| | | | | |
|---|---|---|---|---|
| 3,472,031 | A * | 10/1969 | Kelso | E02D 5/12 |
| | | | | 405/275 |
| 3,707,819 | A * | 1/1973 | Calhoun | E04B 5/04 |
| | | | | 52/220.6 |
| 4,197,687 | A * | 4/1980 | Benoit | E04B 5/04 |
| | | | | 52/262 |
| 4,651,494 | A * | 3/1987 | Van Wagoner | E04D 3/352 |
| | | | | 428/314.8 |
| 4,815,243 | A * | 3/1989 | Pardo | E04F 17/00 |
| | | | | 174/505 |
| 5,456,555 | A * | 10/1995 | Bokeler | E02D 29/025 |
| | | | | 405/285 |
| 5,934,837 | A * | 8/1999 | Lee | E02D 5/20 |
| | | | | 405/231 |
| 5,960,604 | A * | 10/1999 | Blanton | E04B 2/18 |
| | | | | 52/590.2 |
| 6,167,673 | B1 | 1/2001 | Fournier | |
| 6,679,022 | B1 * | 1/2004 | Corporaal | E04B 2/08 |
| | | | | 52/590.2 |
| 7,160,085 | B2 * | 1/2007 | de Roest | E04H 12/085 |
| | | | | 416/244 R |
| 7,739,843 | B2 | 6/2010 | Cortina-Cordero | |
| 8,555,600 | B2 * | 10/2013 | Cortina-Cordero | E04H 12/16 |
| | | | | 52/123.1 |
| 8,590,276 | B2 * | 11/2013 | Kryger | E04H 12/085 |
| | | | | 403/334 |
| 8,720,161 | B2 * | 5/2014 | Herrius De Roest | E04H 12/185 |
| | | | | 52/223.5 |
| 8,826,614 | B2 * | 9/2014 | Garcia Maestre | E04H 12/085 |
| | | | | 52/223.5 |
| 2009/0307998 | A1 * | 12/2009 | Zavitz | E04H 12/12 |
| | | | | 52/152 |
| 2010/0071301 | A1 | 3/2010 | de Roest | |
| 2010/0135821 | A1 | 6/2010 | Bagepalli et al. | |
| 2011/0047920 | A1 * | 3/2011 | Garrett | E04B 5/19 |
| | | | | 52/565 |
| 2013/0001954 | A1 | 1/2013 | Garcia Maestre et al. | |
| 2013/0081350 | A1 * | 4/2013 | Bogl | E04H 12/08 |
| | | | | 52/651.01 |

OTHER PUBLICATIONS

120m Structural Concrete Wind Tower Drawings, dated Jun. 1, 2012.
PCT Search Report for PCT/US2014/052296, Jan. 22, 2015.
PCT Written Opinion for PCT/US2014/052296, Jan. 22, 2005.

* cited by examiner

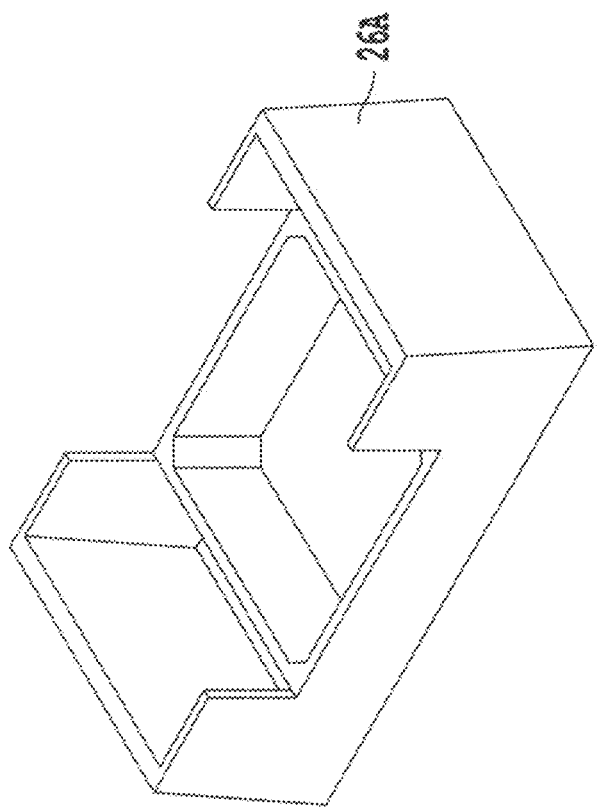
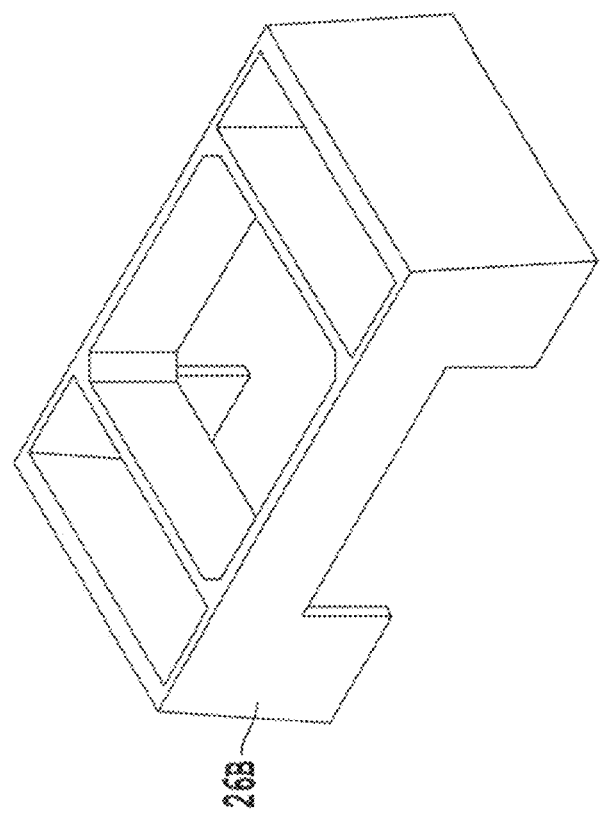
Fig. 22A
Fig. 22B

CRUCIFORM TOWER

CROSS-REFERENCE TO RELATED APPLICATIONS

This application claims priority to U.S. Application No. 61/868,901, filed on Aug. 22, 2013, the entire content of which is incorporated in the present document by reference.

This application incorporates by reference the entire content of U.S. Application No. 61/806,541, filed on Mar. 29, 2013, and U.S. Application No. 61/760,924, filed on Feb. 5, 2013.

BACKGROUND

The present application relates to the field of towers. More specifically, the present application relates to towers and methodologies for tower assembly, such as may be provided involving precast concrete and used in conjunction with dynamic structures such as wind-driven power generators or windmills.

U.S. Pat. No. 7,160,085 by de Roest describes a wind turbine mast composed of prefabricated wall parts which form an annular section. de Roest describes placing three or more segments side by side to form a polygonal ring. de Roest's purpose is to provide a tower than can resist great forces in both horizontal and vertical directions, while being easy and rapid to build. However, de Roest describes using at least three segments side by side to form each level, requiring for each level of the mast at least three joining operations between the side panels, together with at least three joining operations with panels from a level below and a level above. In other words, de Roest requires at least 9 connections be implemented for each mast level. These connections are potential failure points, and require additional time for assembly. de Roest's use of side by side elements requires oblique connections between side by side elements to provide structural integrity.

U.S. Pat. No. 7,739,843 by Cortina-Cordero describes a structure comprising three rounded walls and three flat walls assembled by using tensioning cables which run horizontally through ducts to connect the rounded walls and the flat walls into a monolithic structure. Cortina-Cordero describes assembly steps which include running tensioning cables through ducts in the walls, and an additional step of pouring concrete into each duct. To avoid dimension limitations on the wall elements Cortina-Cordero describes the forming and pouring of all concrete segments as done on site.

U.S. Patent Publication No. 2010/0135821 by Bagepalli et al. describes a tower with longitudinal elements having non-circular cross-sections. Bagepalli's purpose is to expand the cross-section footprint within the constraints of a square box, the size of which is set by transportation modes. Bagepalli describes monolithic elements, each of which must fit within the transport box. In other words, Bagepalli is limited to a maximum monolithic element size. At least one lower axial tower section and one upper axial section are formed of substantially monolithic tubular sections—attempts to expand circumference within square box that will be shipped.

SUMMARY

In one embodiment, the invention includes a tower including a plurality of stacked sections extending in a longitudinal direction from a base section to a top section. At least one of the stacked sections includes a first block and a second block joined together. The first block and the second block have interlocking portions such that a first portion of the first block is located above a first portion of the second block in the longitudinal direction.

In another embodiment, a tower includes a foundation, a plurality of stacked sections extending in a longitudinal direction from a base section to a top section and stacked on the foundation, and a plurality of longitudinal post-tensioning strands each with a first end anchored at the foundation, and a second end. Each strand is adjacent to an interior surface of at least one stacked section. A first number of the longitudinal post-tensioning strands are capped off at a top end of a first stacked section. A second number of the longitudinal post-tensioning strands are capped off at a top end of a top stacked section. A ratio of the second number to a total number of strands is from 0.35 to 0.45.

BRIEF DESCRIPTION OF THE DRAWINGS

The characteristics and advantages of an exemplary embodiment are set out in more detail in the following description, made with reference to the accompanying drawings.

FIGS. 22A-B depict elements of a second exemplary embodiment;

DETAILED DESCRIPTION OF THE PREFERRED EMBODIMENTS

It is an object and feature of an exemplary embodiment described herein to provide a modular tower which can easily be transported between a manufacturing location and a field location. It is another object of an exemplary embodiment described herein to produce a scalable tower structure which reduces the time required to assemble a tower structure in the field.

In an exemplary embodiment of the present invention, a tower may be assembled from several modules. An advantage of this exemplary embodiment may be the ability to increase the maximum size of a tower base and accordingly to increase the tower height. Another advantage of this exemplary embodiment may be the ability to transport elements which fit on a standard truck or train platform, and to assemble these elements on the field.

These and other objects, advantages, and features of the exemplary tower described herein will be apparent to one skilled in the art from a consideration of this specification, including the attached drawings.

In an exemplary embodiment of the present invention, a tower has a height between 90 and 160 meters. This tower supports a device such as a wind powered generator (O).

Figure 1:
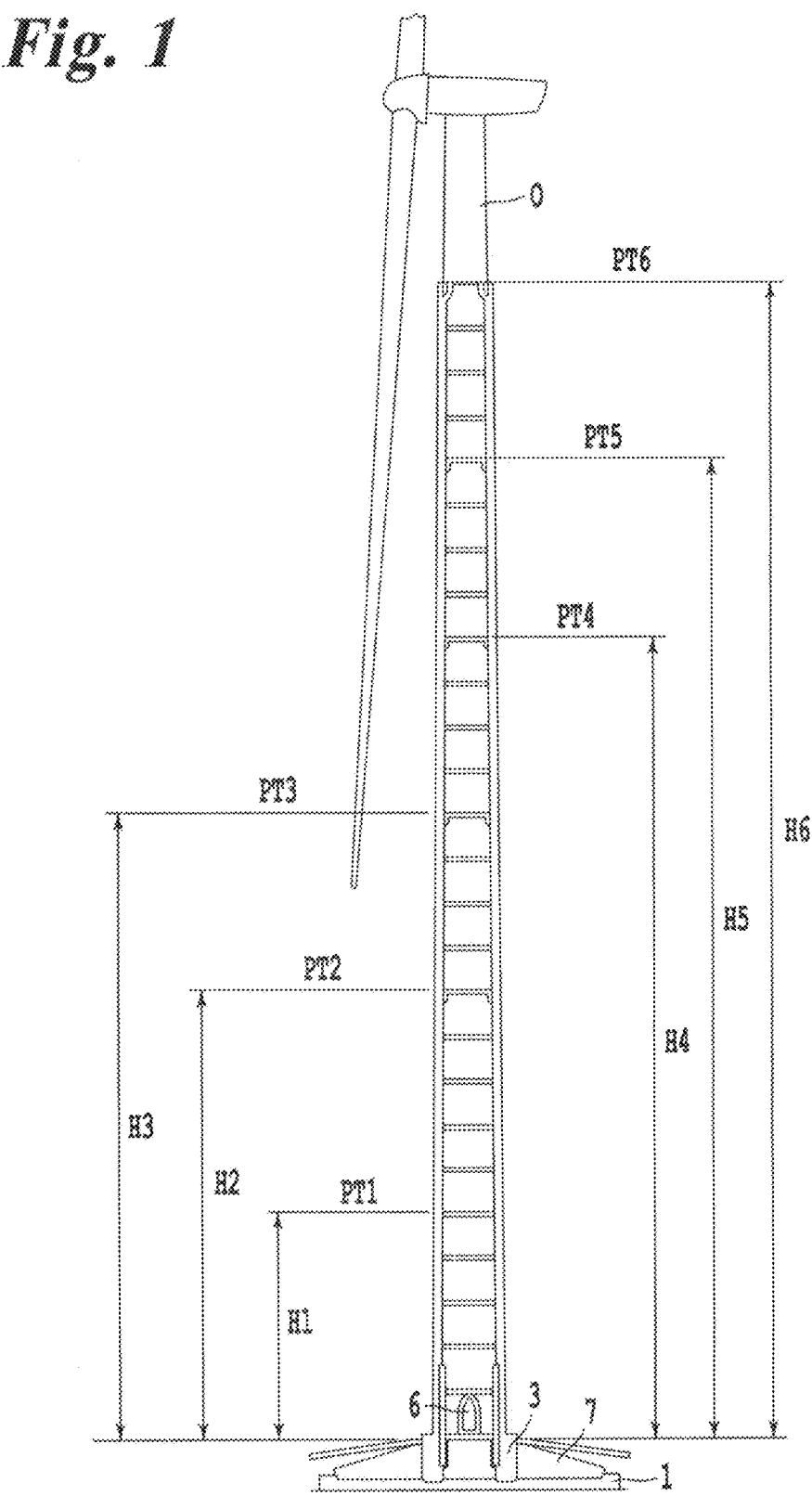
FIG. 1 depicts a cross-sectional view of a first exemplary embodiment.
Figure 2:
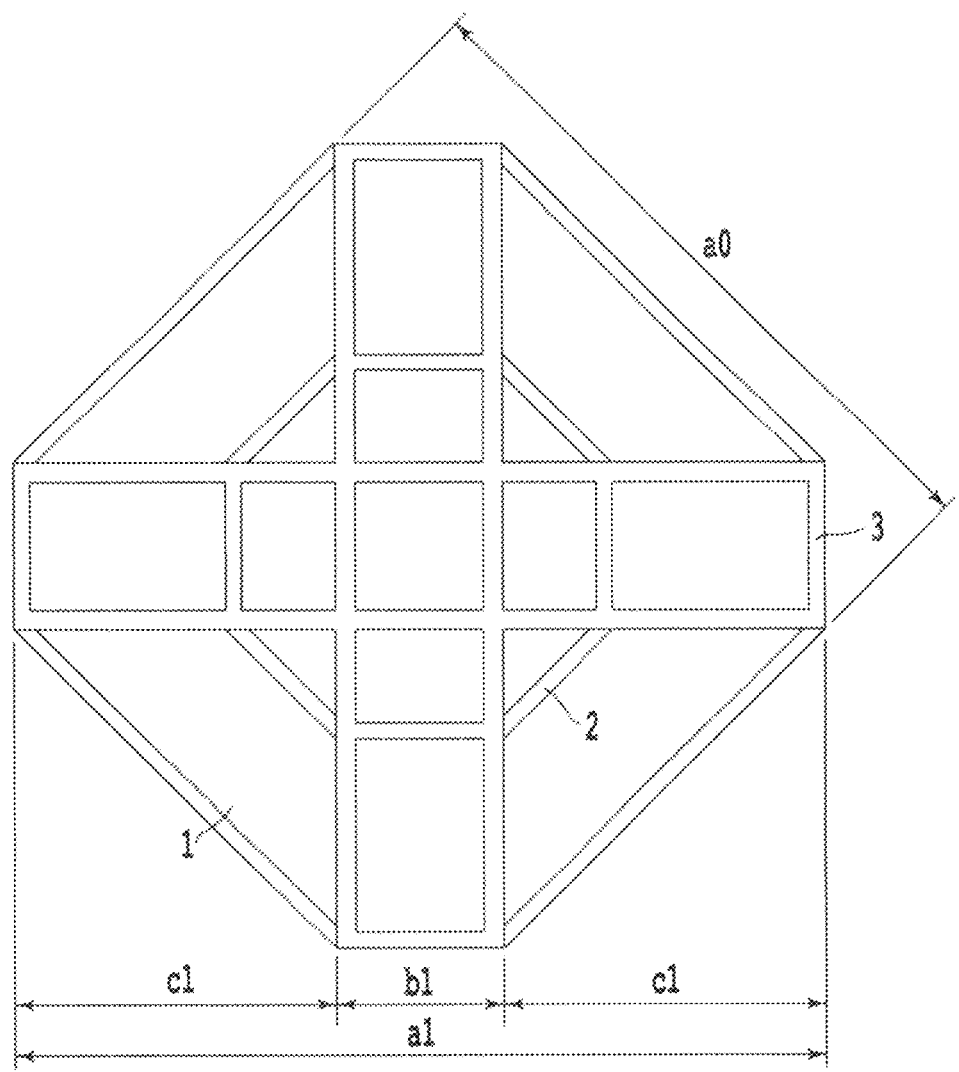
FIG. 2 depicts a plan view of a foundation of a first exemplary embodiment.

In the embodiment shown in FIGS. 1 and 2, the tower includes a foundation with a field poured base slab (1), precast components (3) and stiffeners (2). The tower includes at least one longitudinal section in which the elements have a similar cross-sectional geometry. In another exemplary embodiment, the tower includes at least two longitudinal sections with different cross-sectional geometries. Some of the longitudinal sections may include pairs of elements assembled to form a longitudinal pair, such that a first portion of the first element is higher than a second portion of the second element. It is an advantage of this embodiment that the amount of circumferential post-tensioning used can be reduced. Other longitudinal sections may include a single, unitary element.

In another embodiment, the structural elements of the tower are shells with an inner wall, an outer wall, and at least one cavity between the inner and the outer wall. In an exemplary embodiment, the structural elements of the tower are filled, with no cavities between an inner wall and an outer wall.

Figure 3:
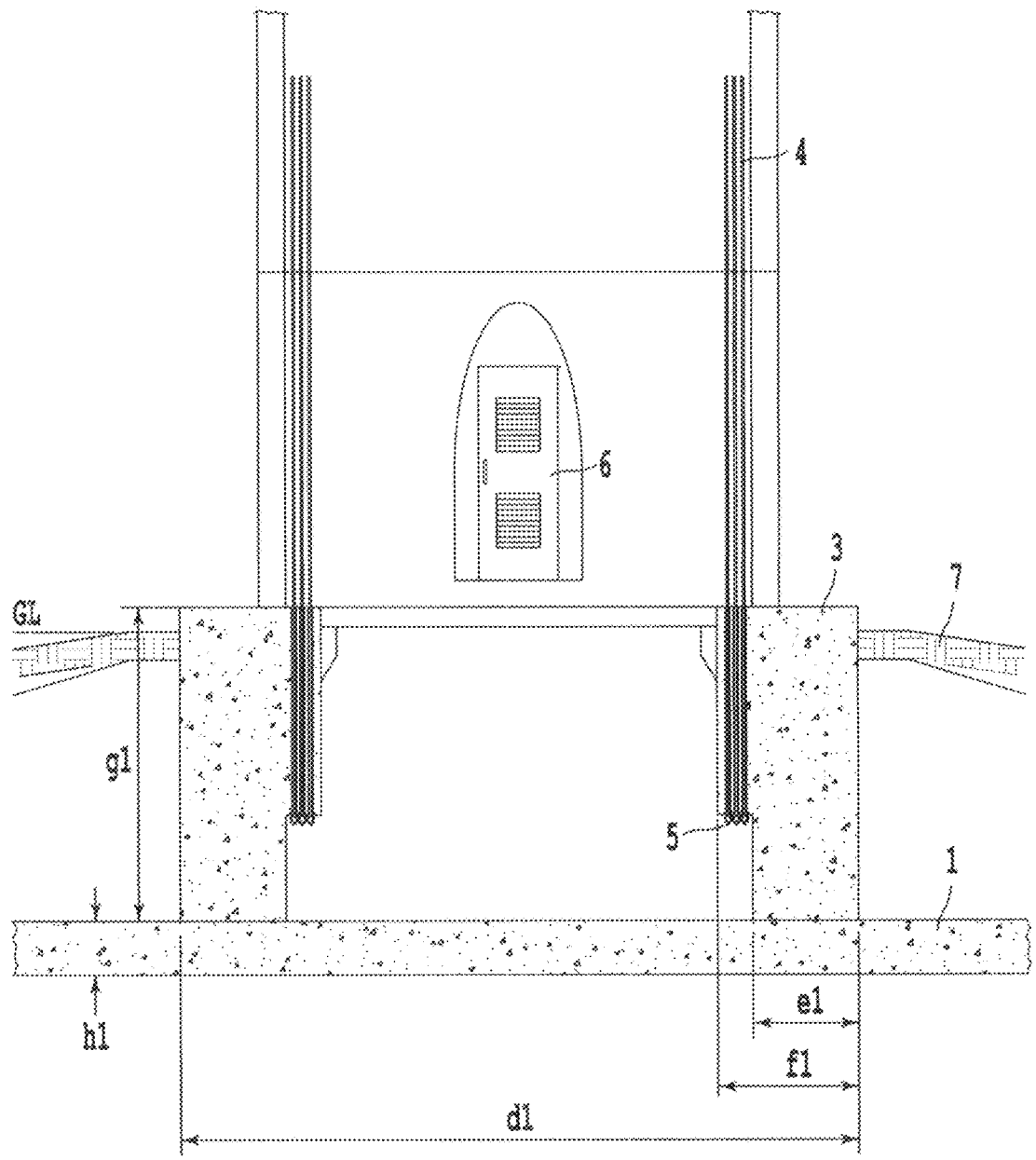
FIG. 3 depicts a cross-sectional view of the foundation of a first exemplary embodiment.

In the exemplary embodiment shown in FIG. 3, the tower longitudinal integrity is maintained by using post tensioning (PT) cables (4), which for each longitudinal section connect the foundation to the top of the longitudinal section, where each cable or strand is capped, and go through each element of the longitudinal section. Post-tensioning cables or strands are located within an inner bore of the tower structural components, but external to the tower structural components, and can accordingly be easily installed and inspected. In an exemplary embodiment, a tensile force is applied to the post-tensioning strands and sustained by the anchors anchoring the strands, thereby stabilizing the tower structure by generating a circumferential compressive force on the tower elements. In exemplary embodiments, a lower longitudinal section is traversed by a larger number of strands than an upper longitudinal section, since a portion of strands is capped off at the top of the lower longitudinal section, and accordingly do not traverse the upper longitudinal section. A percentage of strands goes through both lower and upper longitudinal sections, and is capped off at the top of the upper longitudinal section. At the top of the uppermost longitudinal section of the tower, all strands are capped off. At each level where strands are capped off, there are capped off strands at at least two radial locations relative to the tower axis. In exemplary embodiments, the number of strands capped off and the number of strands carried through at each PT level depends on economic considerations and structural considerations. A larger amount of strands increases the cost of the tower, while for higher levels less strands are required, and too many strands can lead to structural damage.

Referring to FIG. 1, a first exemplary embodiment of the tower is shown with the foundation base slab (1), precast foundation components (3) and buttresses (7) which support the tower mast. A door (6), located on ground level, enables access to the inside of the tower mast. In the embodiment of FIG. 1, six post tensioning levels may be referenced throughout the tower mast, PT1-PT6. In exemplary embodiments, the tower includes between four and seven PT levels.

In the embodiment of FIG. 1, buttresses (7) are used to reinforce the tower base below ground level, and include at least one surface which matches the shape of the tower longitudinal elements. Buttresses (7) include internal reinforcements such as rebar, and are cast in place.

In the embodiment of FIG. 1, the heights H1-6 of levels PT1-6 are measured from the ground level (GL).

In this embodiment, the height H1 of the PT1 level is preferably 32 meters, the height H2 of the PT2 level preferably 47 meters, the height H3 of the PT3 level preferably 60 meters, the height H4 of the PT4 level preferably 72 meters, the height H5 of the PT5 level preferably 85 meters, and the height H6 of the PT6 level preferably 98 meters.

In other exemplary embodiments, the height H1 of the PT1 level is between 15 and 40 meters, the height H2 of the PT2 level is between 32 and 50 meters, the height H3 of the PT3 level is between 44 and 70 meters, the height H4 of the PT4 level is between 57 and 80 meters, the height H5 of the PT5 level is between 69 and 95 meters, and the height H6 of the PT6 level is between 82 and 110 meters. In alternate exemplary embodiments, the heights H1-6 can be expressed relative to the total height of the tower, with H6 being 100% of the tower height. In exemplary embodiments H1 is between 15 and 38%, H2 is between 38 and 47%, H3 is between 47 and 65%, H4 is between 65 and 75%, and H5 is between 75 and 85% of the total height H6. In exemplary embodiments, the distance between the H1-6 platform levels is constrained by a height of an access lift system used to build up the tower. In exemplary embodiments, the number of platforms used results from a trade-off between simplicity, with few platforms requiring less operations, and structural requirements, capping off strands at multiple locations along the tower height. In these embodiments, the number of PT strands required to meet the tower structural requirements decreases with height, and having too many strands in the higher portions of the tower can facilitate long term fatigue failure. In exemplary embodiments, to avoid fatigue failure of the tower the total number of strands used at the tower base depends on the tower height and the expected load from the wind turbine. The wind turbine load on the tower depends in part on the wind turbine classification in terms of size and capacity.

Figure 17:
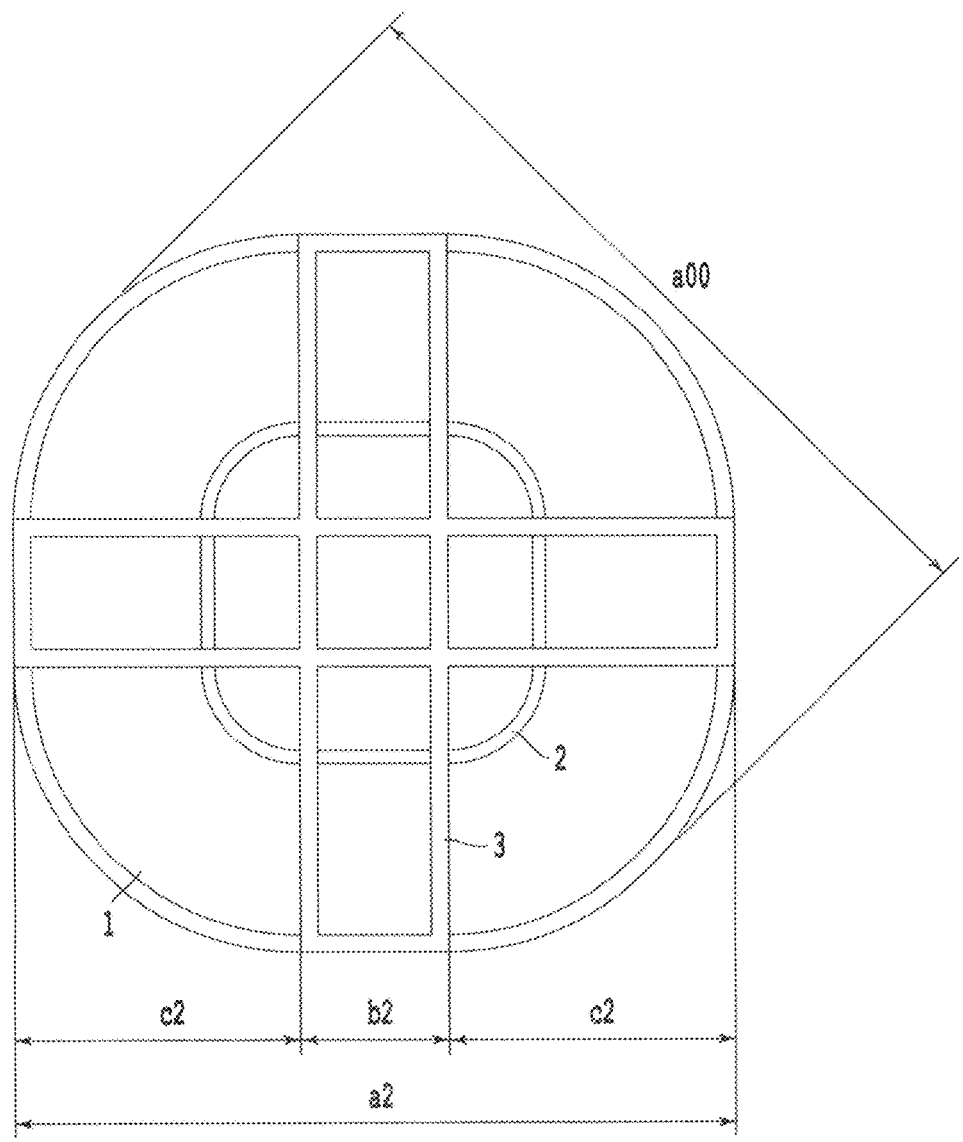
FIG. 17 depicts a plan view of a foundation of a second exemplary embodiment.

Referring to FIG. 2, a top view of a first exemplary embodiment of the tower foundation is shown, where the foundation base slab (1) is square with side length a0, with corner chamfers of width b1, and where the precast foundation elements (3) form a cruciform structure of width b1 with arms aligned along the base slab diagonals, where the length of the arms is c1. Foundation stiffeners (2) are located between perpendicular foundation components, as shown in FIG. 2. In this embodiment, the width b1 is preferably 4.8 meters, the arm length c1 is preferably 9.5 meters, and the side length a0 is preferably 20.5 meters. In other exemplary embodiments, the width b1 can be between 4 and 5 meters, the arm length c1 can be between 9 and 10 meters, and the side length a0 can be between 15 and 25 meters. An alternative embodiment of the tower foundation is shown in FIG. 17 and described below, which can be used interchangeably with the exemplary foundation shown in FIG. 2.

Referring to FIG. 3, a cross-section of a first exemplary embodiment of the tower is shown for the foundation. The base slab (1) which is field poured supports precast foundation elements (3), and buttresses (7) reinforce the precast foundation elements. In this embodiment, longitudinal elements may be cast in another location and transported for assembly on the field. It is therefore an advantage of this exemplary embodiment that the amount of field casting is reduced. As indicated in FIG. 3, single strand anchors, also known as PT cables or strands (4) are anchored to the precast foundation elements at a location (5), and run up through the precast foundation. These PT strands are located along the inner wall of the longitudinal tower elements.

In the embodiment shown in FIG. 3, the base slab has a thickness h1 which is preferably 0.5 meters, the precast foundation elements have an overall width d1 preferably 6.3 meters, with a first width e1 preferably 1 meter, a second width f1 preferably 1.3 meters, and a height g1, preferably 3 meters. In other exemplary embodiments, the base slab thickness h1 is between 0.4 and 0.6 meters, the overall width d1 is between 5 and 7 meters, the first width e1 is between 0.5 and 1.5 meters, the second width f1 is between 1 and 1.5 meters, and the height g1 is between 2.5 and 3.5 meters.

Figure 4:
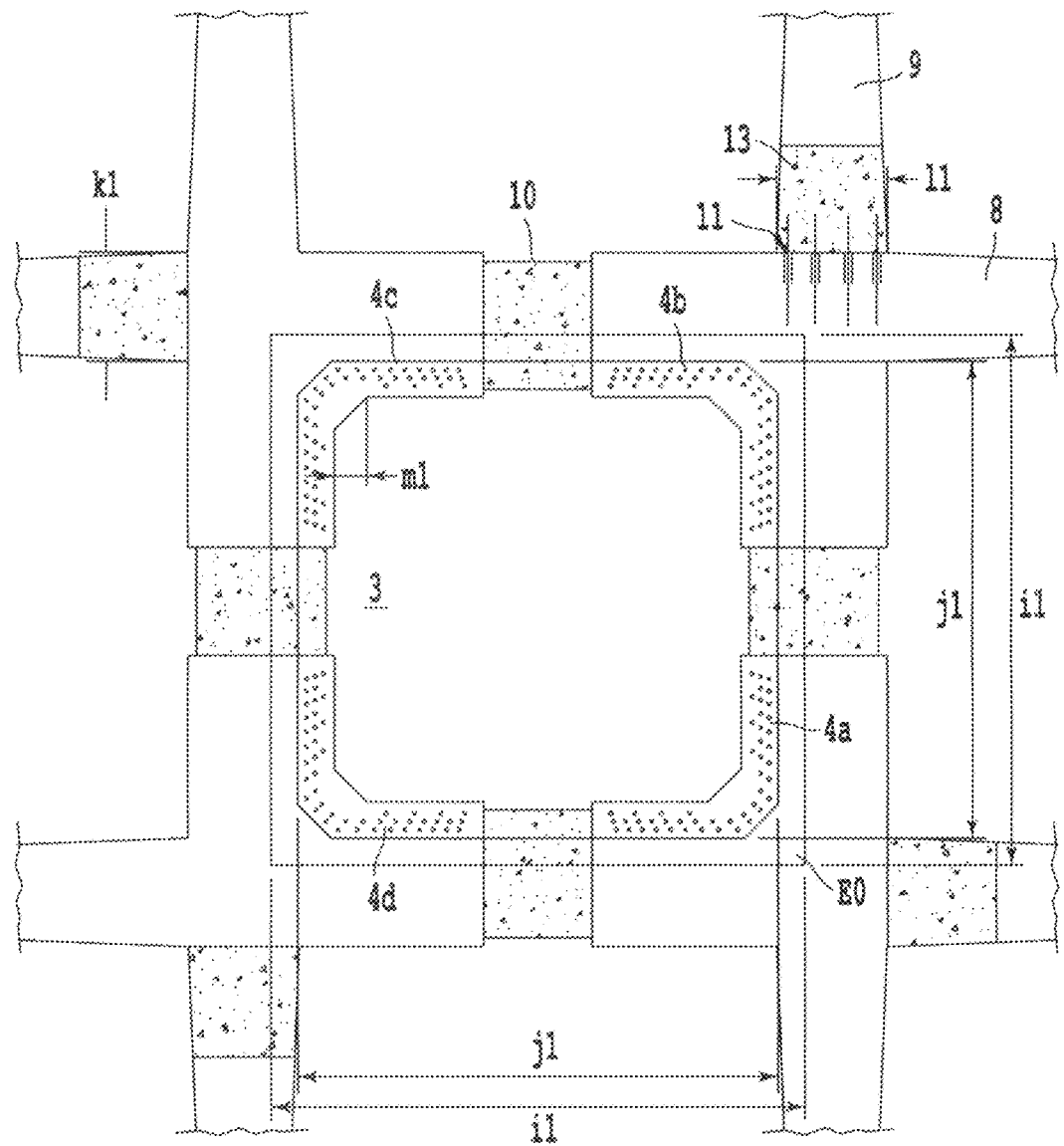
FIG. 4 depicts a plan view of a first exemplary embodiment.
Figure 6:
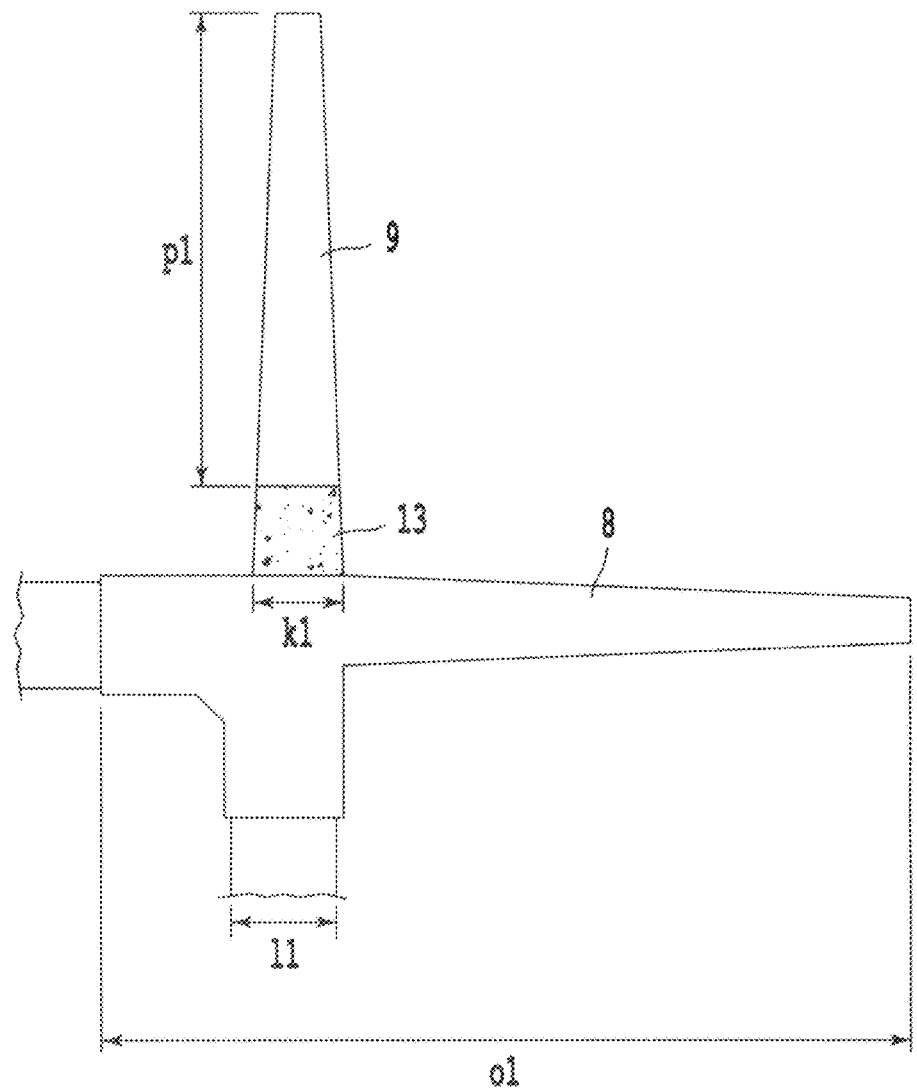
FIG. 6 depicts a buttress pair for the foundation of a first exemplary embodiment.

Referring to FIG. 4, a top view of an exemplary embodiment of the tower at the foundation level shows the core (3) of the field poured base precast foundation elements, with the footprint of a first longitudinal tower element (E0), that has a square cross-section with outer width i1 preferably 4.8 meters, inner width j1 preferably 4.3 meters, and chamfered corners with dimension m1 preferably 0.3 meters. The tower element (E0) cross-section is smaller than the base precast foundation element cross-section. In addition, two types of buttresses are shown, with four buttresses (9) having a 90 degree shape and bracing each foundation corner, with a brace of each buttress (9) extending parallel to a side of the of the base. Four buttresses (8) of width l1 preferably 1.3 meters, are used in conjunction with buttresses (9) and provide support, perpendicular to the extended brace of corresponding buttresses (9). Buttresses (8) do not directly abut the base slab, but connections (13) between buttresses (8) and (9) with a width k1 preferably 1 meter, are provided by field pour. Referring to FIG. 6, a detailed view of a pair of buttresses including one buttress (8) with length o1 preferably 9 meters, and one buttress (9) with length p1 preferably 5.3 meters, are located on a corner of base slab (3), with the field pour (13) joining both buttresses. Splice bars consolidate the field poured base slab and are used between the field pour connection (13) and buttresses (8) to strengthen the connection between buttresses.

In other exemplary embodiments, the outer width i1 is between 4 and 5.5 meters, the inner width j1 is between 4 and 5 meters, the width l1 is between 1 and 1.5 meters, the width k1 is between 0.5 and 1.5 meters, the chamfer dimension m1 is between 0.2 and 0.5 meters, the buttress (9) length p1 is between 4 and 6 meters, the buttress (8) length O1 is between 8 and 10 meters, and the chamfer dimension m1 is between 0.2 and 0.5 meters.

Referring to FIG. 4, the interior of the first longitudinal tower element (E0) shows multiple PT strands (4) located in each quadrant (4a-b), with the number of PT strands in each quadrant the same. In each quadrant the PT strands are distributed along two adjacent sides of the longitudinal tower element, and along the corner chamfer between the two adjacent sides of the longitudinal tower element.

Figure 5:
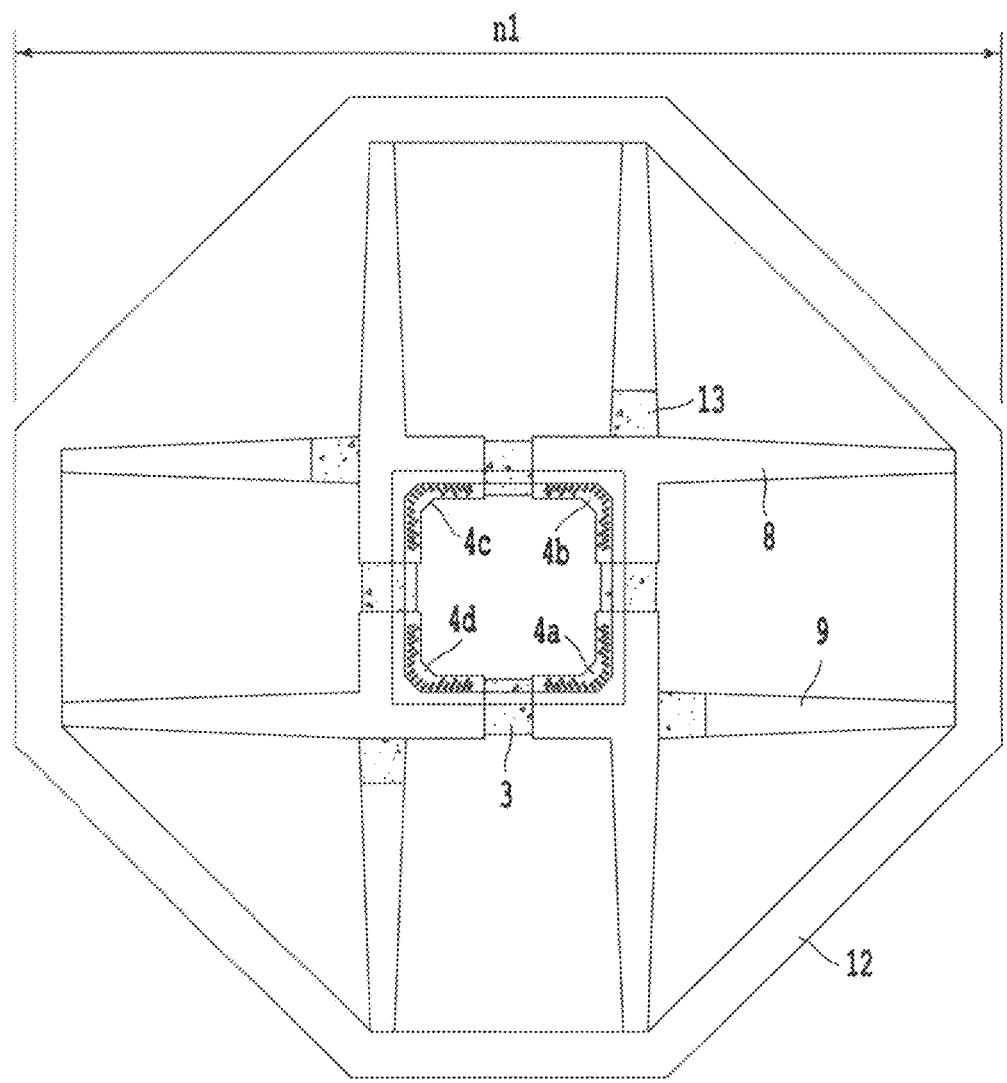
FIG. 5 depicts an overall plan view of the foundation of a first exemplary embodiment.

Referring to FIG. 5, a top view of a first exemplary embodiment of the tower shows the entire foundation as in FIG. 4, which includes eight buttresses and the regular octagonal turn-up slab (12) with characteristic dimension n1, preferably 21 meters, and a thickness between 0.5 and 1 meters. In other exemplary embodiments, the octagon dimension n1 is between 19 and 22 meters.

Figure 7:
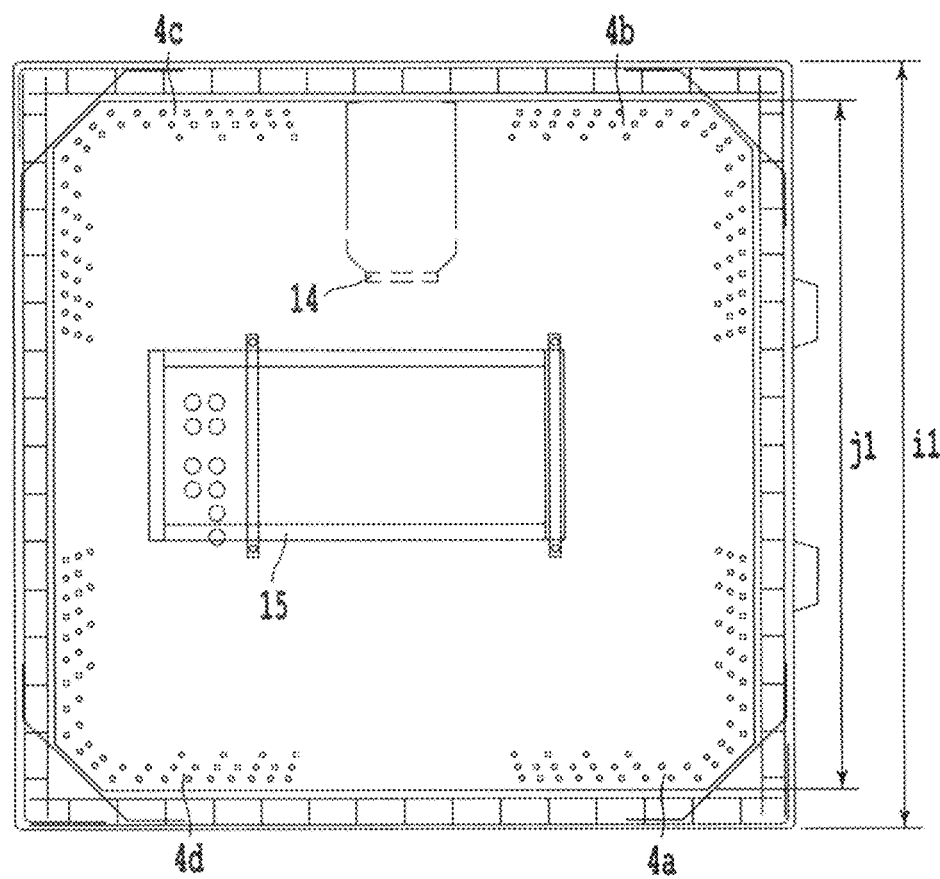
FIG. 7 depicts a plan view at ground level of a first exemplary embodiment.
Figure 35:
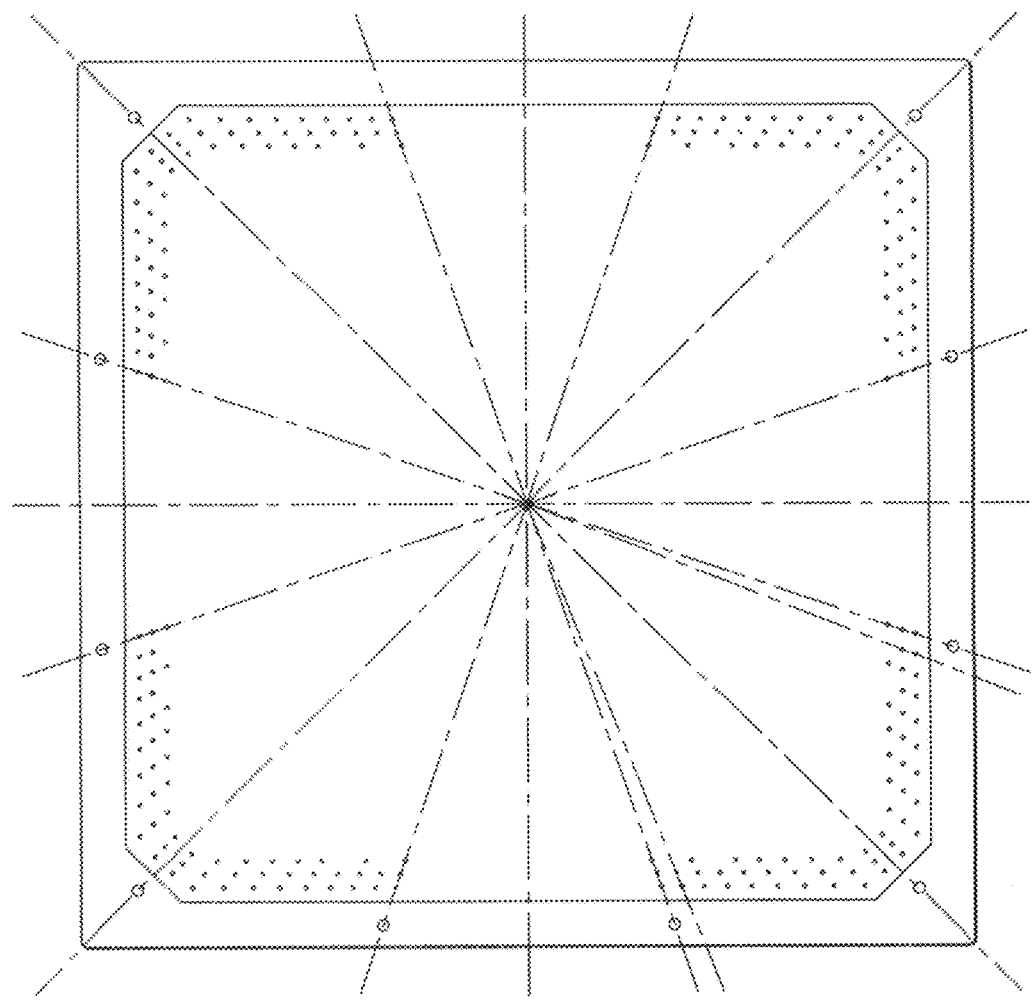
FIG. 35 depicts a plan view of a second exemplary embodiment.

Referring to FIG. 7, a top view of a first exemplary embodiment of the tower shows a plan view of the tower cross-section at ground level, with the longitudinal element (E0) shown, together with PT strand groups 4a-4c. In addition, the tower power unit (15) for powering a service lift is shown, as well as a ladder access (14). In the embodiment of FIG. 7, reinforcements such as rebar are used within the elements. Referring to FIG. 35, a cross-section of the tower shows the presence of continuous rebars Cr within the tower walls. In an exemplary embodiment, 12 rebars are evenly spaced around the tower periphery.

Figure 8:
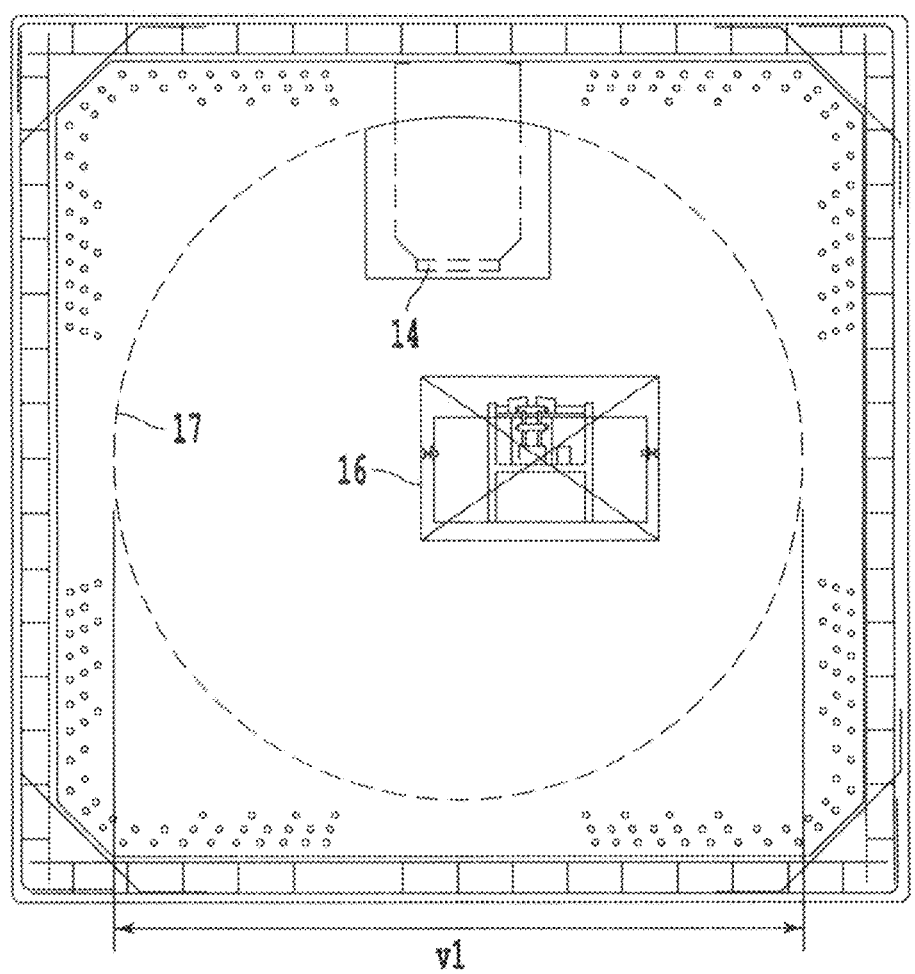
FIG. 8 depicts a plan view at a first height of a first exemplary embodiment.
Figure 9:
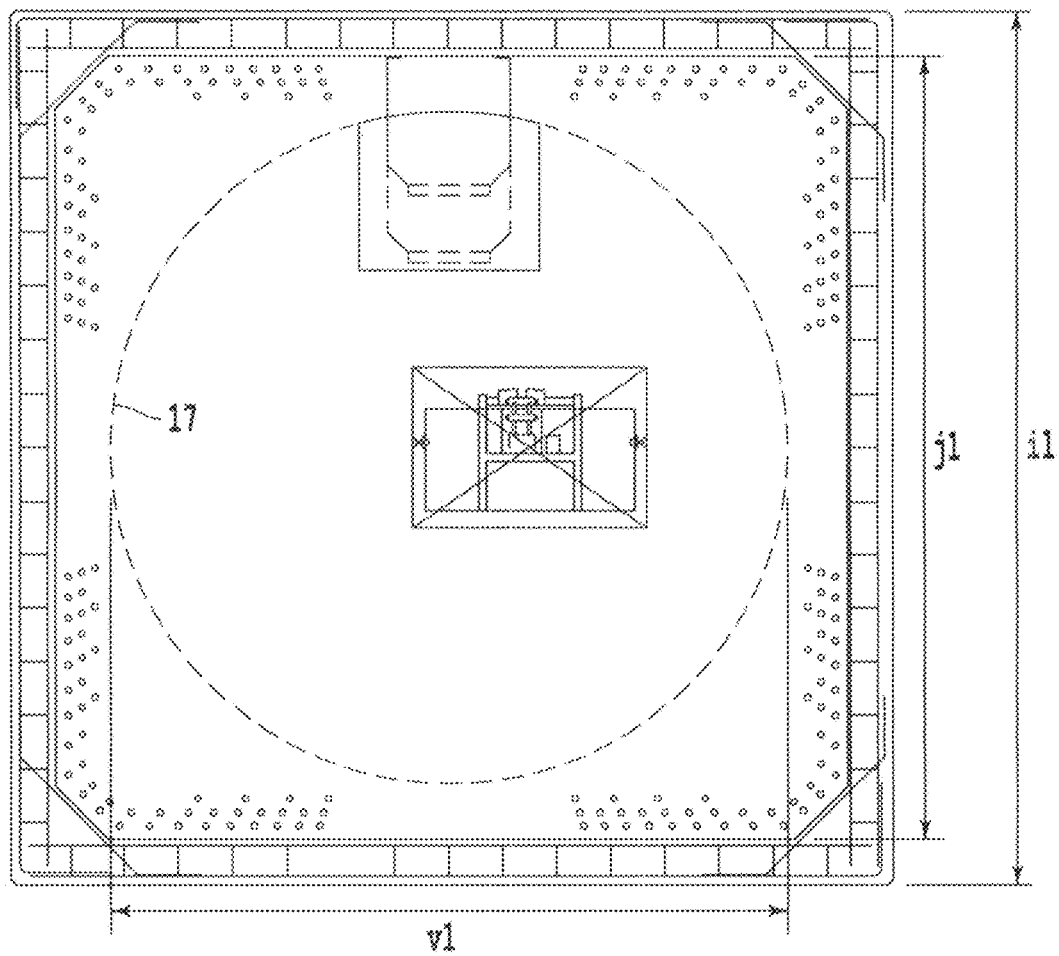
FIG. 9 depicts a plan view at a second height of a first exemplary embodiment.

Referring to FIGS. 8 and 9, a top view of a first exemplary embodiment of the tower shows a plan view of the tower cross-section at two elevations above that shown in FIG. 7, where a circular platform (17) with diameter v1, preferably 3.7 meters, is located at the level of door (6). This platform supports ladder access (14) and the service-lift platform. In further embodiments, the platform diameter v1 is between 3 and 4 meters.

Figure 10:
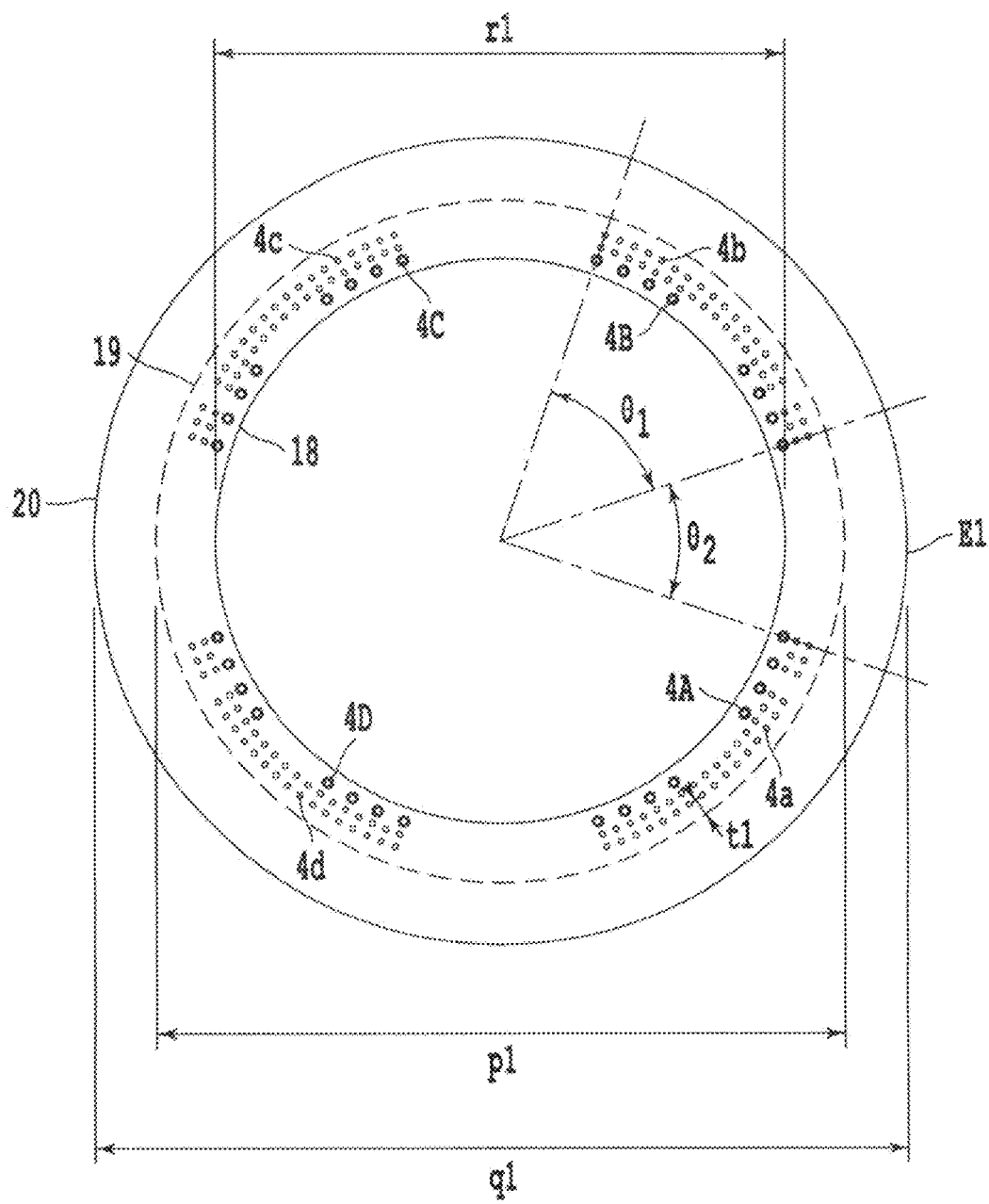
FIG. 10 depicts a plan view at a third height of a first exemplary embodiment.

Referring to FIG. 10, a top view of a first exemplary embodiment of the tower shows a plan view of the tower cross-section at an elevation above that shown in FIGS. 8 and 9. The longitudinal tower element (E1) includes an inner wall (18) with diameter r1, preferably 3.1 meters, and an outer wall (20) with diameter P1, preferably 3.8 meters, with a ledge drop-off (19) with diameter q1, preferably 4.5 meters, equidistant from the inner and outer walls. In further embodiments, the diameter P1 is between 3 and 5 meters, the diameter q1 is between 4 and 5 meters, and the diameter r1 is between 3 and 4 meters.

As shown in the exemplary embodiment of FIG. 10, PT strand groups 4a-d, which extend from the foundation anchor points (5), are distributed in a multi-row circular pattern between an inner wall (18) and the ledge drop-off (19), with each strand quadrant spanning an angle θ1, preferably 52.25 degrees, and an angle θ2 between strand quadrants, preferably 37.75 degrees. In the embodiment of FIG. 10, three concentric rows of PT strands are anchored in the foundation. The outermost row of strands is at a distance t1 from ledge (19), with t1 preferably 0.1 meters. In each quadrant, a portion of the PT strands (4A-D) are capped off. Referring to FIG. 1, a portion of the PT strands in each quadrant is capped off at each level PT1 through PT6, such that at the PT6 level, all PT strands have been capped off. In an exemplary embodiment, tensioning and the slope of the tower allow the PT strand geometrical distribution to transition between longitudinal tower elements with different cross-sectional geometries.

In other exemplary embodiments, the spacing t1 is between 0.05 and 0.2 meters, the angle θ1 is between 50 and 55 degrees, and the angle θ2 is between 35 and 40 degrees.

Figure 11:
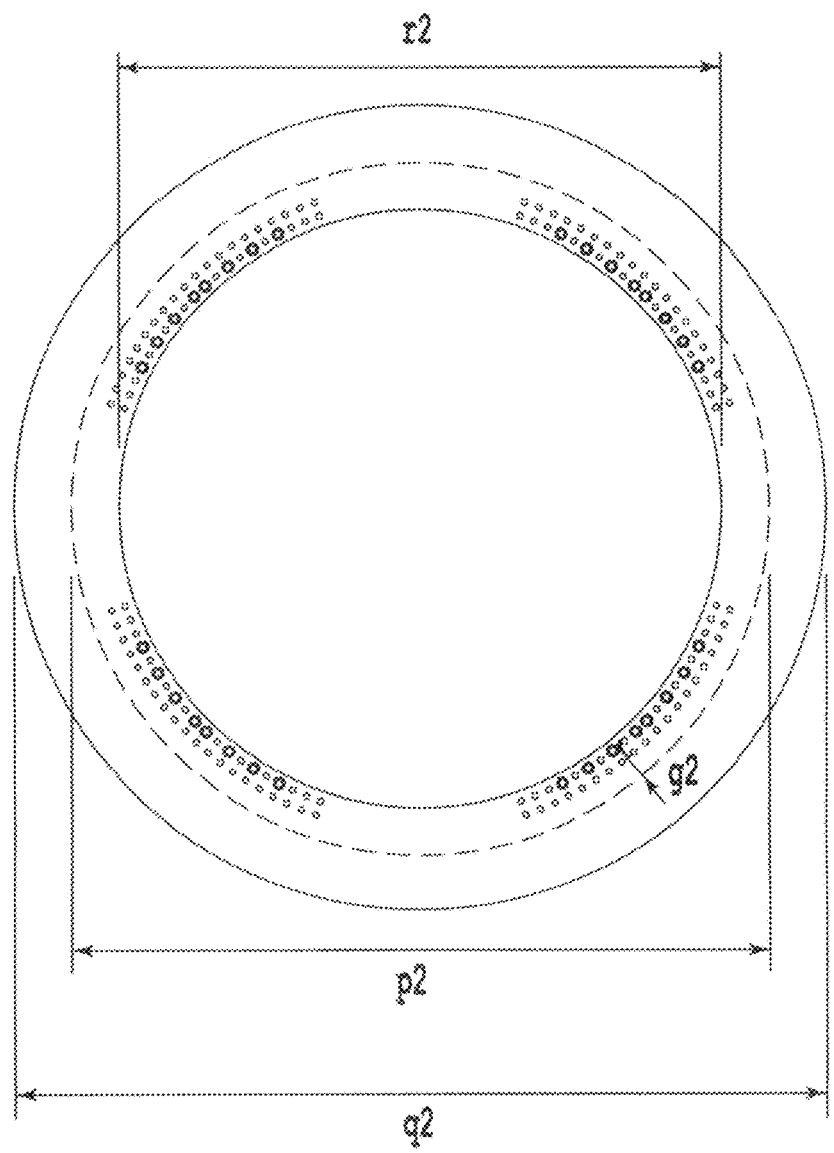
FIG. 11 depicts a plan view at a fourth height of a first exemplary embodiment.

Referring to FIG. 11, a top view of a first exemplary embodiment of the tower shows a plan view of the tower cross-section at an elevation above that of FIG. 10, with a geometry similar to that shown in FIG. 10, but with reduced dimensions, as the tower narrows towards the top. In addition, the total number of PT strands present in the FIG. 11 cross-section is lower than the number of PT strands at a lower level cross-section, and the proportion of capped PT strands is higher. In this embodiment P2 is preferably 3.6 meters, q2 preferably 4.2 meters, and r2 preferably 3.1 meters. In other exemplary embodiments, diameter P2 is between 3 and 5 meters, diameter q2 is between 4 and 5 meters, and diameter r2 is between 3 and 4 meters.

Figure 12:
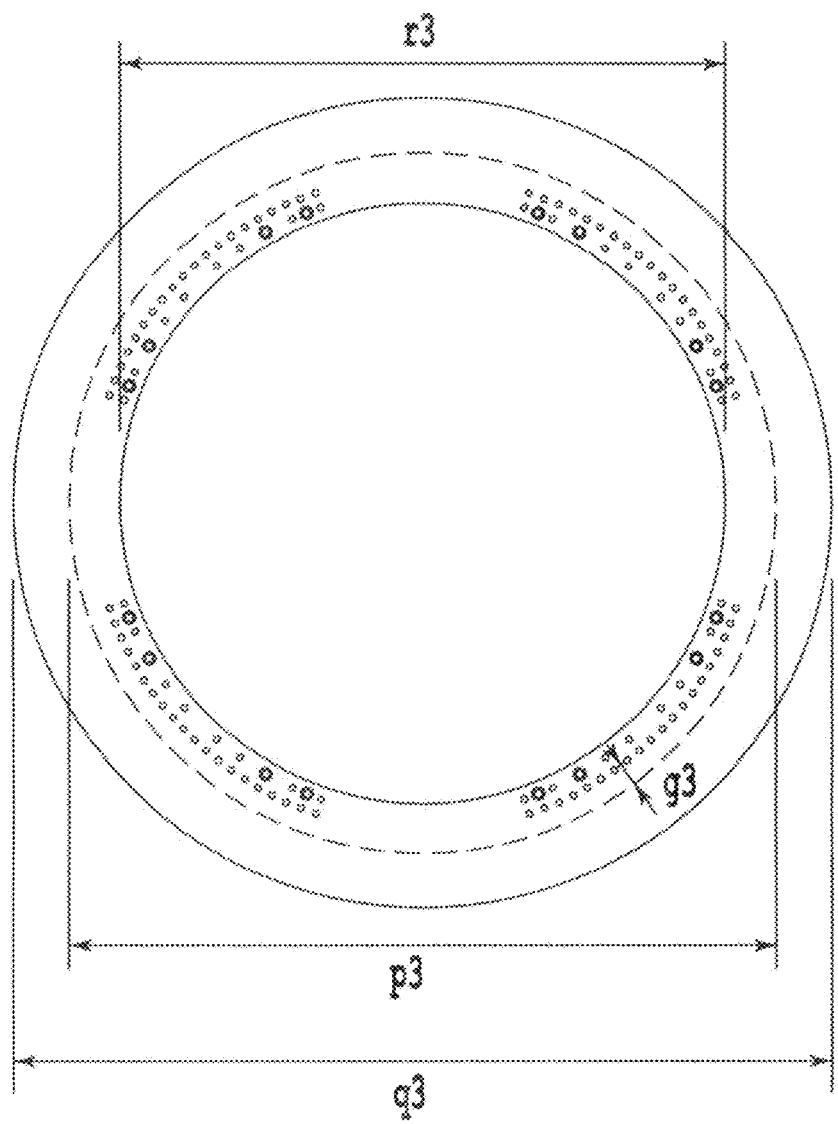
FIG. 12 depicts a plan view at a fifth height of a first exemplary embodiment.

Referring to FIG. 12, a top view of a first exemplary embodiment of the tower shows a plan view of the tower cross-section at an elevation above that of FIG. 11, with a similar geometry as that shown in FIG. 11, but with reduced dimensions, as the tower narrows towards the top. In addition, the total number of PT strands present in this cross-section is lower than the number of PT strands at a lower level cross-section, and the proportion of capped PT strands is higher. In this embodiment P3 is preferably 3.4 meters, q3 preferably 4 meters, and r3 preferably 2.9 meters. In other exemplary embodiments, diameter P3 is between 3 and 5 meters, diameter q3 is between 3.5 and 4.5 meters, and diameter r3 is between 2.5 and 3.5 meters.

Figure 13:
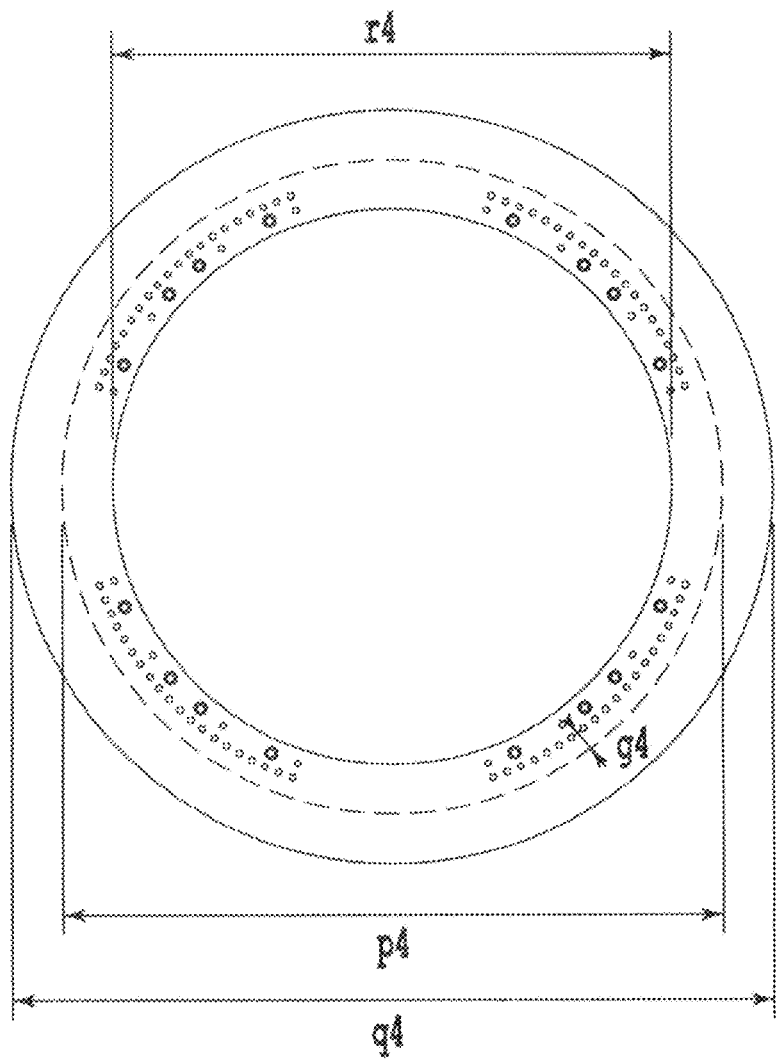
FIG. 13 depicts a plan view at a sixth height of a first exemplary embodiment.

Referring to FIG. 13, a top view of a first exemplary embodiment of the tower shows a plan view of the tower cross-section at an elevation above that of FIG. 12, with a similar geometry to that of FIG. 12, but with reduced dimensions, as the tower narrows towards the top. In addition, the total number of PT strands present in this cross-section is lower than the number of PT strands at a lower level cross-section, and the proportion of capped PT strands is higher. In this embodiment P4 is preferably 3.2 meters, q4 preferably 3.7 meters, and r4 preferably 2.7 meters. In other exemplary embodiments, diameter P4 is between 3 and 4 meters, diameter q4 is between 3 and 5 meters, and diameter r4 is between 2 and 3 meters.

Figure 14:
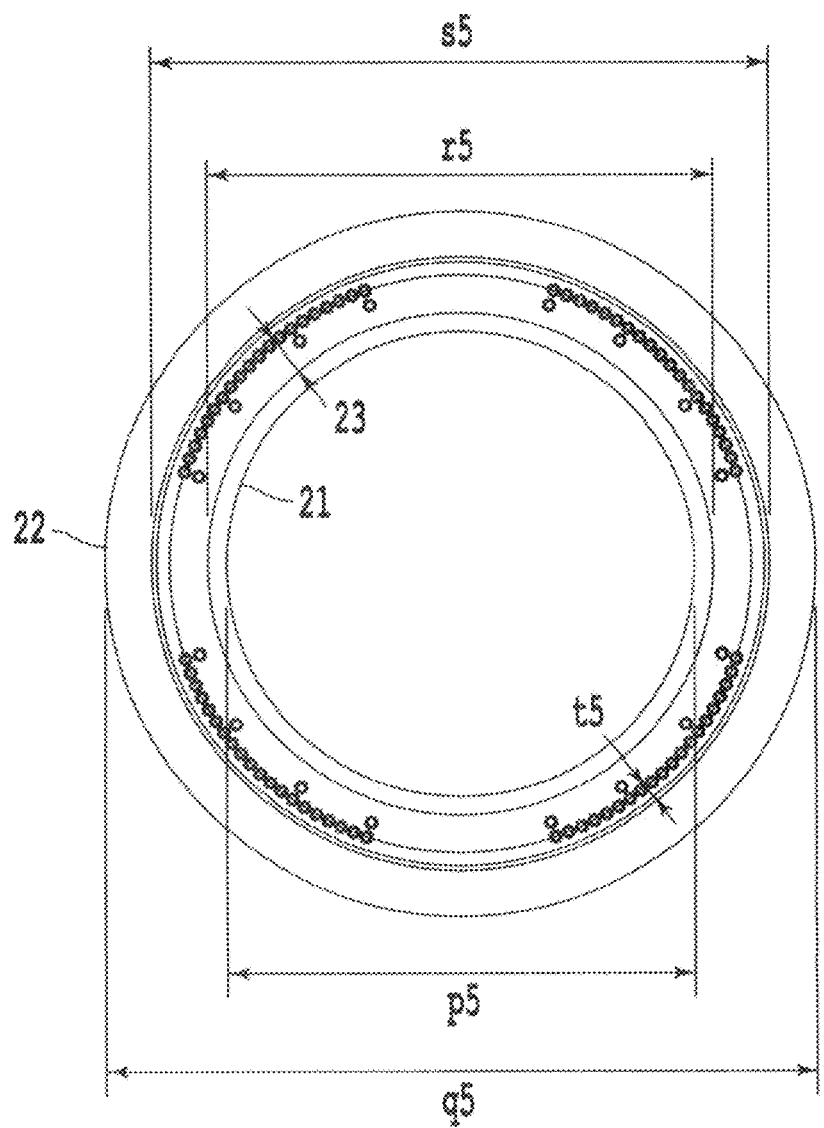
FIG. 14 depicts a plan view at a seventh height of a first exemplary embodiment.

Referring to FIG. 14, a top view of a first exemplary embodiment of the tower shows a plan view of the tower cross-section at an elevation above that of FIG. 13. The cross-section indicates that all PT strands are capped off on a steel plate (23) protruding from the inner cylindrical steel section, and located between an inner concrete wall (21) and outer concrete wall (22).

In this embodiment P5 is preferably 2.3 meters, q5 preferably 3.5 meters, and r5 preferably 2.5 meters. In other exemplary embodiments, diameter P5 is between 2 and 3 meters, diameter q5 is between 3 and 4 meters, and diameter r5 is between 2 and 3 meters.

In the embodiment shown in FIG. 1, 240 PT strands are anchored to the tower foundation. Of these 240 PT strands, 48 strands are capped off at the PT1 level. At the PT2 level, 32 of the remaining 192 PT strands are capped off. At the PT3 level, 32 of the remaining 160 PT strands are capped off. At the PT4 level, 16 of the remaining 128 PT strands are capped off. At the PT5 level, 16 of the remaining 112 PT strands are capped off. All of the remaining 96 PT strands are capped off at the PT6 level.

In another exemplary embodiment, 224 PT strands are anchored to the tower foundation. At the PT1 level, 32 of the 224 PT strands are capped off. At the PT2 level, 32 of the remaining 192 PT strands are capped off. At the PT3 level, 32 of the remaining 160 PT strands are capped off. At the PT4 level, 16 of the remaining 128 PT strands are capped off. At the PT5 level, 16 of the remaining 112 PT strands are capped off. All of the remaining 96 PT strands are capped off at the PT6 level.

In yet another exemplary embodiment, 192 PT strands are anchored to the foundation, with 32 of the 192 PT strands capped off at the PT2 level, 32 of the remaining 160 PT strands capped off at the PT3 level, 32 of the remaining 128 PT strands capped off at the PT4 level, 16 of the remaining 112 PT strands capped off at the PT5 level, and the remaining 96 PT strands capped off at the PT6 level.

In a third exemplary embodiment, the tower includes 6 PT levels, and N1 strands are anchored at the foundation. At the lowest PT level, PT1, 20% of the N1 strands are capped off. At PT2, between 6 and 7% of the N1 strands are capped off. At PT3, 13% of the N1 strands are capped off. At PT4, 13% of the N1 strands are capped off. At PT5, between 6 and 7% of strands are capped off. At the highest PT level, PT6, 40% of the N1 strands are capped off.

In other exemplary embodiments, 100% of the total number of strands N are anchored at the foundation, between 5 and 25% of strands N are capped off at the lowest PT level, between 35 and 45% of strands N are capped off at the highest PT level, and between 10 and 25% of strands N are capped off at each PT level other than the lowest or highest PT level.

Figure 15:
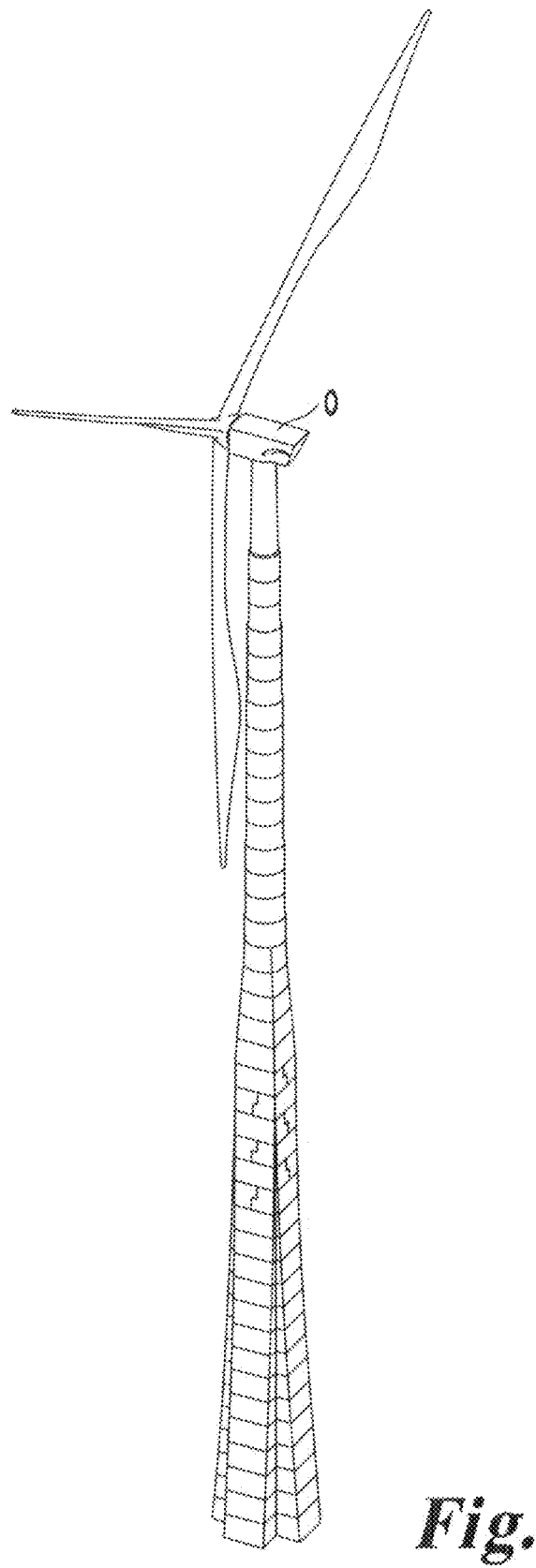
FIG. 15 depicts a perspective view of a second exemplary embodiment.

In the exemplary embodiment shown in FIG. 15, the tower includes a first longitudinal section with cruciform cross-section elements, a second longitudinal section with transition cruciform cross-section elements, a third longitudinal section with transition cross-section elements, and a fourth longitudinal section with circular cross-section elements.

Figure 16:
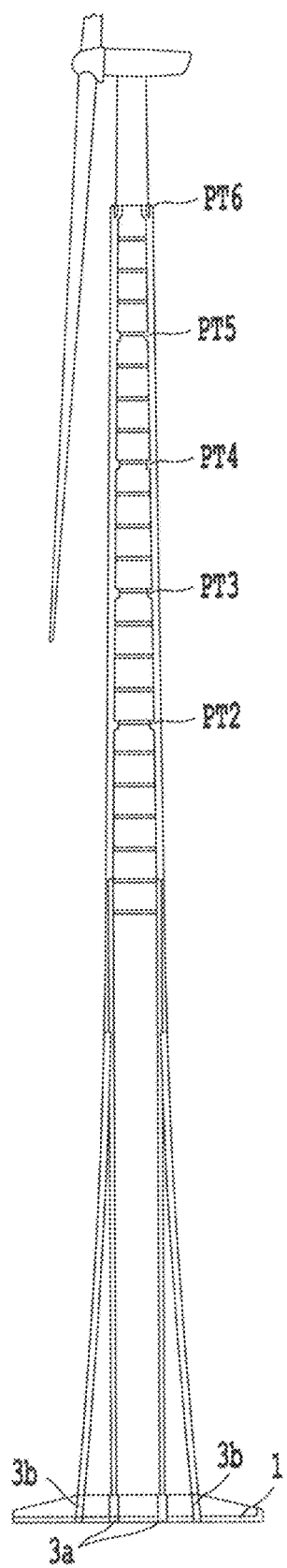
FIG. 16 depicts a cross-sectional view of a second exemplary embodiment.

Referring to FIG. 16, which is a plan view of the exemplary embodiment of the tower foundation as shown in FIG. 15, a foundation base slab (1) is below and supports precast foundation components (3) with a precast core (3a) and precast wings (3b), and six height levels which may be referenced throughout the tower mast as PT1-PT6.

Referring to FIG. 17, a plan view of a second exemplary embodiment of the tower foundation is shown, where the foundation base slab (1) is square with a side a2, preferably 24 meters, with rounded corners, and where the precast foundation elements (3) form a cruciform structure of width b2, preferably 4.8 meters, with arm length c2, preferably 9.5 meters, and each arm parallel to the base slab sides. In a second exemplary embodiment, curvilinear foundation stiffeners (2) are located between perpendicular foundation components. In further exemplary embodiments, the side a2 is between 20 and 30 meters, the width b2 is between 4 and 5 meters, and the arm length c2 is between 9 and 10 meters.

Figure 18:
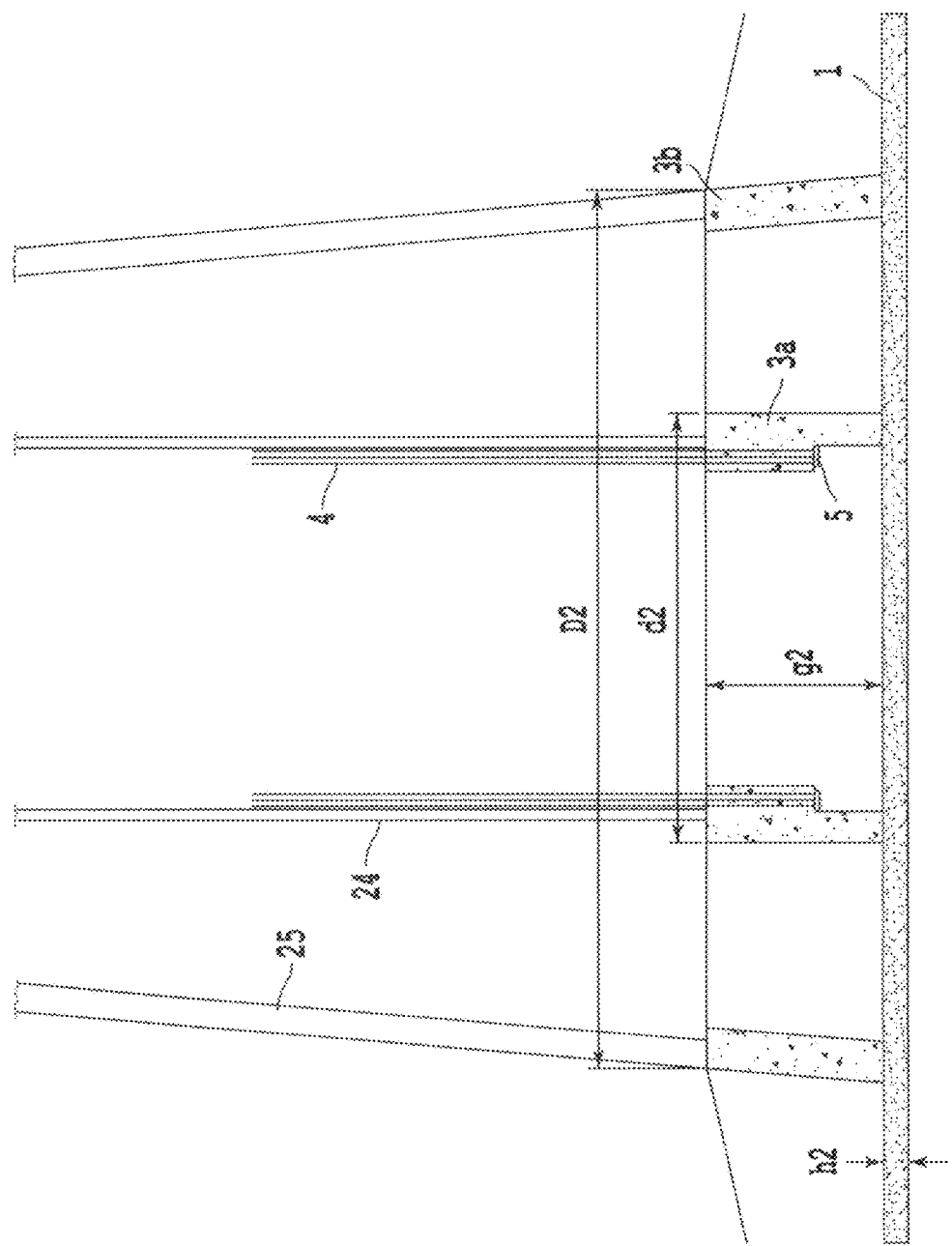
FIG. 18 depicts a cross-sectional view of a foundation of a second exemplary embodiment.

Referring to FIG. 18, a cross-section of a second exemplary embodiment of the tower is shown for the foundation. The base slab (1) of height h2, preferably 0.3 meters, which is field poured, supports precast core foundation elements (3a) with a width d2, preferably 5.3 meters, and a height g2, preferably 2.5 meters, with precast wing foundation elements (3b) spanning a width D2, preferably 11 meters. In further exemplary embodiments, the height h2 is between 0.1 and 0.5 meters, the width d2 is between 5 and 6 meters, the height g2 is between 2 and 3 meters, and the width D2 is between 9 and 12 meters.

In the exemplary embodiment shown in FIG. 18, single strands are anchored in the precast core foundation and run adjacent to the interior surface of boxed core walls (24). In other exemplary embodiments, PT strands are anchored in the precast wings foundation and run up along the inner surface of out-rigger walls (25).

Figure 19:
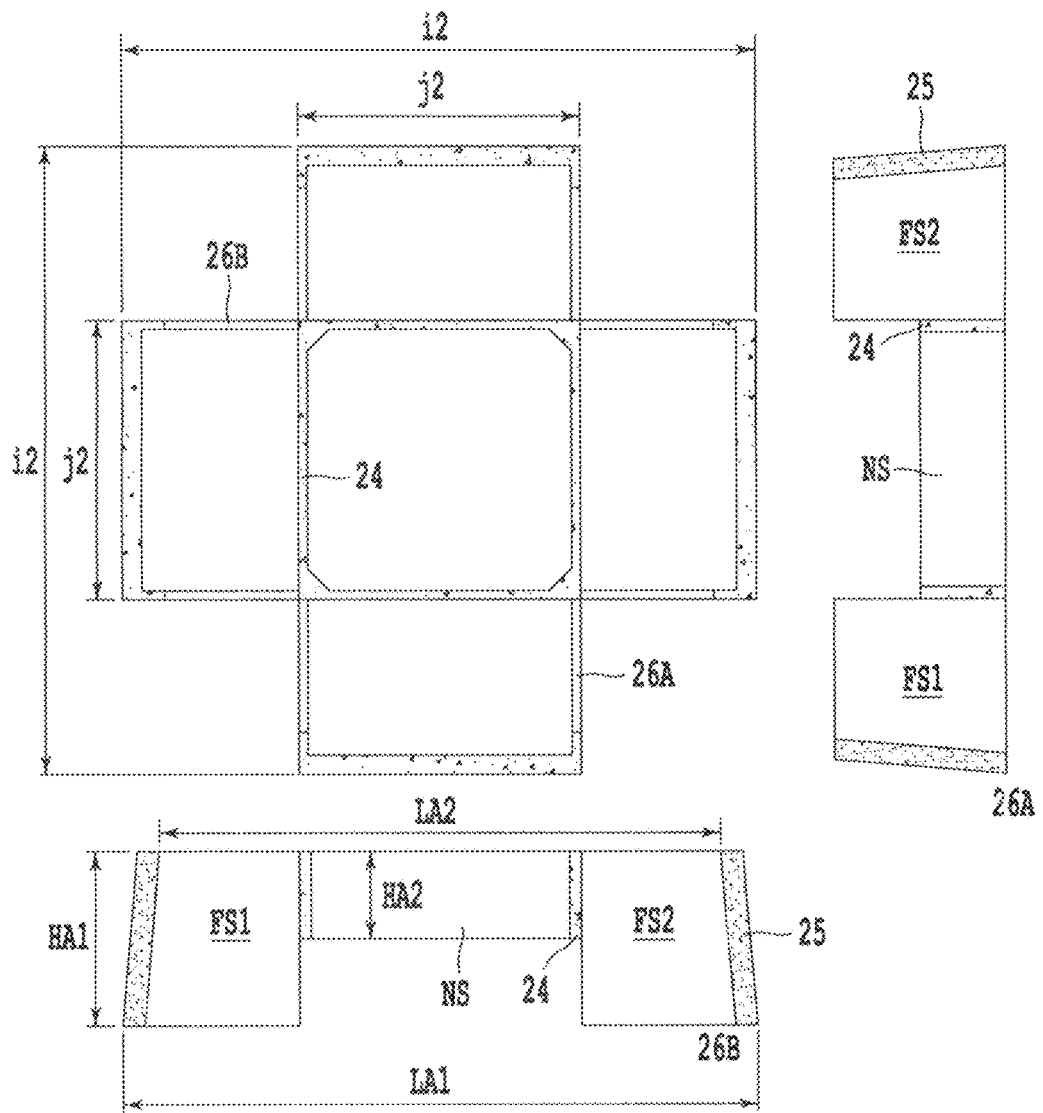
FIG. 19 depicts a longitudinal element of a second exemplary embodiment.
Figure 26:
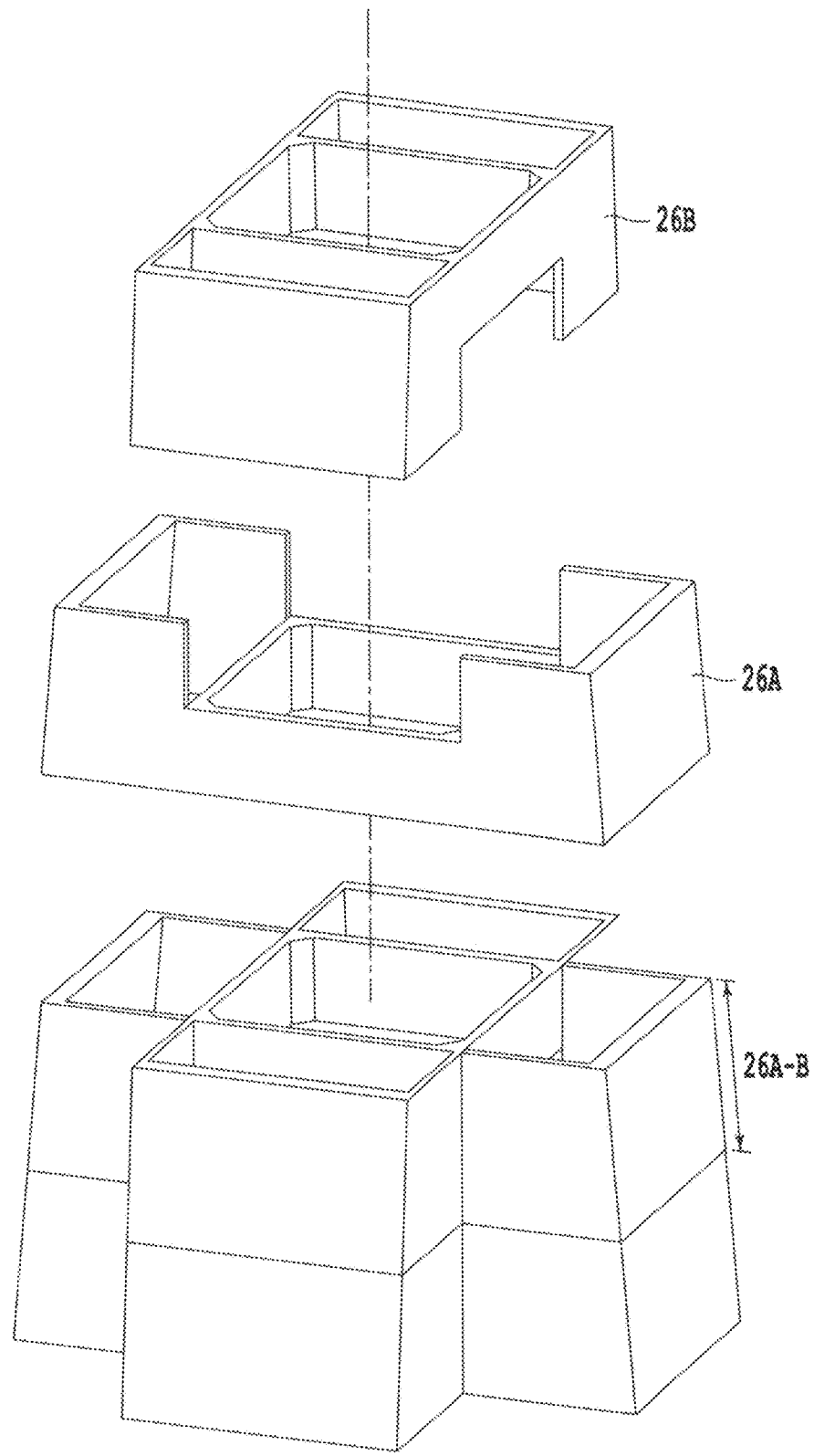
FIG. 26 depicts the assembly of an element of a second exemplary embodiment.

Referring to FIG. 19, a plan view of the cruciform cross-section elements in a second exemplary embodiment of the tower is shown at ground level. A cruciform cross-section element comprises a first element (26A) and a second element (26B), each with a U-shape and an interlocking notched section (NS) which allows the assembly of cruciform cross-section elements (26A-B) in a pair which forms a cruciform cross-section footprint element pair. FIG. 26 shows a perspective view of the assembly of elements 26A and 26B to form the cruciform footprint element pairs.

Figure 60:
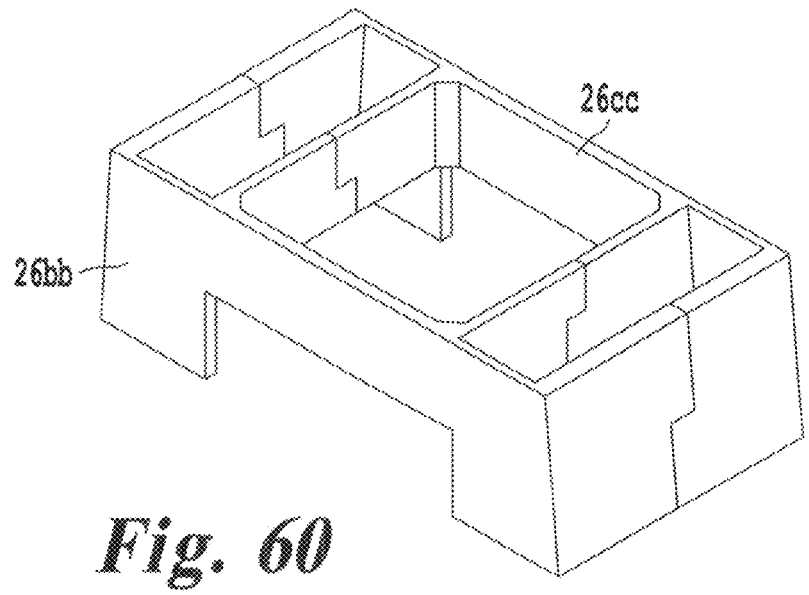
FIG. 60 depicts a variant for elements of a second exemplary embodiment.

Referring to FIG. 60, in an exemplary embodiment each element (26A, 26B) of a cruciform cross-section can be composed of two identical pieces, 26bb and 26cc, which can be made from the same mold prior to assembly. This variant advantageously reduces the number of molds necessary to build the tower assembly, with only a single mold required for each level. This variant also permits the construction of a taller tower with a larger footprint as a result of dividing each element (26A-B) into two pieces with an increase in size.

As shown in the exemplary embodiment of FIG. 19, the U-shape of elements 26A-B includes two right trapezoidal prisms on opposite sides of a rectangular parallelepiped which form the notched section. The rectangular parallelepiped of element 26A is adjacent to a shorter base of the trapezoidal prisms, and the rectangular parallelepiped of element 26B is adjacent to a longer base of the trapezoidal prisms. Each element 26A and 26B has a width j2, preferably 4.8 meters, and a length i2, preferably 11 meters, and each combination of elements 26A-B has a height of 3 meters. In an exemplary embodiment the height of each element pair 26A-B is constrained by shipping and handling capabilities, such as the dimensions of a truck bed, or train platform. In other exemplary embodiments, the width i2 is between 9 and 12 meters, and the width j2 is between 4 and 6 meters.

Referring to FIG. 19, each element 26A or 26B includes a central notched section NS with a height HA2, flanked on opposite sides by elements FS1 and FS2, which have a height HA1, and include a vertical wall adjacent to the notched section, and oblique walls opposite the notched sections, creating a first length of the element on one side LA1, and a second length of element 26A or B on another side LA2. In an exemplary embodiment, dimensions LA1 and LA2 are determined by the overall tower height and the corresponding tower wall slope, which can vary for example between 0 and 6 degrees.

In one embodiment, elements 26A-B can be used to form up to 50 meters of the tower. In another embodiment, elements 26A-B can be used to form up to a third of the overall tower height. Each pair of elements (26A-B) is epoxied along the walls of the inner rectangular cross-section, which are superposed with precast core elements (3a). In addition, each element 26A is epoxied to an upper level adjacent element 26A along its outermost edges (25) which are superposed with precast foundation wings (3b). Each element 26B is epoxied to an upper level adjacent element 26B along the element outermost edges (25) which are superposed with precast foundation wings (3b).

Figure 20:
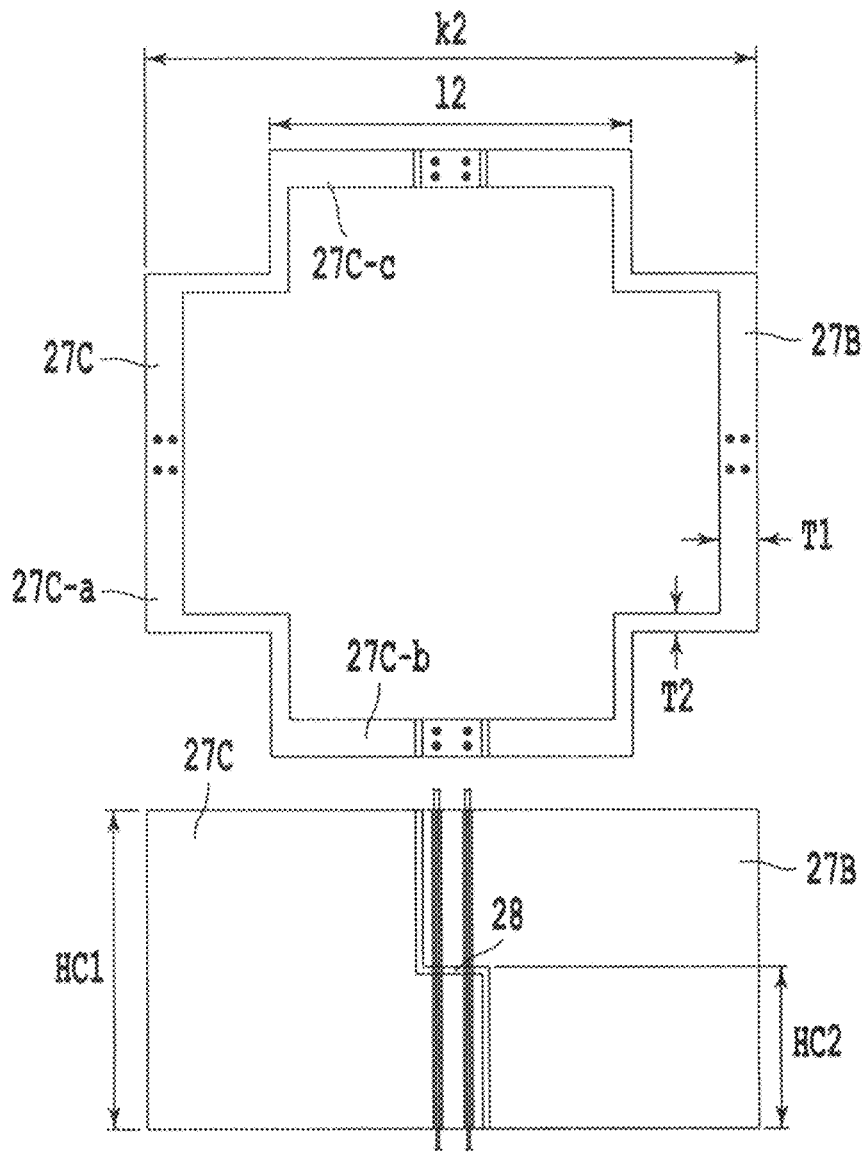
FIG. 20 depicts a longitudinal element of a second exemplary embodiment.
Figure 27:
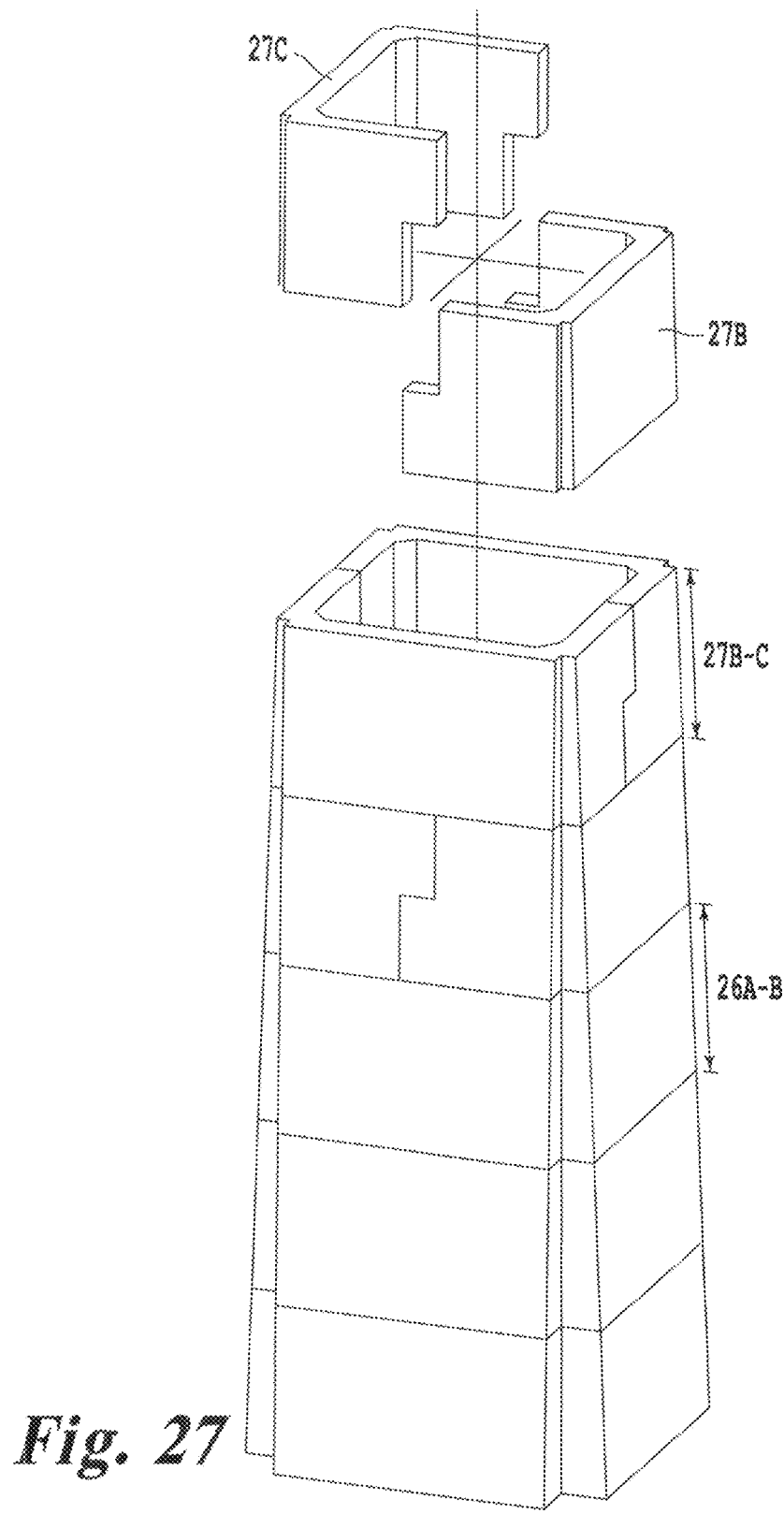
FIG. 27 depicts the assembly of an element of a second exemplary embodiment.

Referring to FIG. 20, a plan view of a transition cruciform cross-section element in a second exemplary embodiment of the tower is shown at a height greater than the height of the cruciform cross-section element in FIG. 19. A transition cruciform cross-section element comprises a first element (27B) and a second element (27C), each of which comprises three panels, a first panel (27C-a) with a U-shaped cross-section in a transverse plane and rectangular cross-section in a longitudinal plane, and two opposite panels (27C-b and 27C-c) with an L-shaped profile in both the longitudinal and transverse planes. FIG. 27 shows a perspective view of the assembly of elements 27B and 27C to form a square with a pair 27B-C. The width of the U-shaped cross-section 12 is preferably 3.37 meters, and the width k2 of an assembled pair of elements 27B-C is preferably 5.7 meters. In other exemplary embodiments, the width k2 is between 5 and 6 meters, and the width l2 is between 3 and 4 meters. In the embodiment shown in FIG. 20, the L-shaped profile in the longitudinal plane includes a stepped surface (28) with step width (sw) between 10 and 30% of L2 at a distance HC2 from one of the edges of the element, which has a length HC1, as shown in FIG. 20. In an exemplary embodiment HC2 is between 35 to 70% of HC1, with HC1 ranging between 2 and 4 meters. Both elements 27B and 27C have the same length HC1, such that in the longitudinal direction, a pair of elements 27B-C is level. In the embodiment of FIG. 20, the ratio of the lengths HC2/HC3 is preferably 1, and the height HC2 of 27B in the longitudinal direction is equal to the height HC2 of the 27C. In alternative embodiments the ratio HC2/HC3 may be between 0.3 and 3. As shown in FIG. 20, the outermost surfaces of the panels have a thickness T1, and the inner most surfaces of the panels have a thickness T2, where T1 and T2 range between 100 and 400 mm. As shown in the exemplary embodiment of FIG. 20, elements 27B and 27C are assembled by mating the L-shaped profiles along the horizontal contact surface (28).

As shown in FIG. 27, the L-shaped profile of a first transition cruciform cross-section element (27B) can be interlocked with an L-shaped profile of a second transition cruciform cross-section element (27C) which allows the assembly of elements (27B-C) in a pair which forms a transition cruciform cross-section segment. Each pair of elements (27B-C) is epoxied along the horizontal wall of the L-shaped faces, but in this embodiment no epoxy is required for the vertical joint between elements 27B and 27C. Pairs of elements 27B-C form longitudinal elements, which are superposed, while rotating the location of the L-shaped contact region between 27B and 27C by 90 degrees for each pair. One advantage of this exemplary embodiment is the ability to maintain the structural integrity of the structure. PT strands are located in each quadrant.

Figure 62:
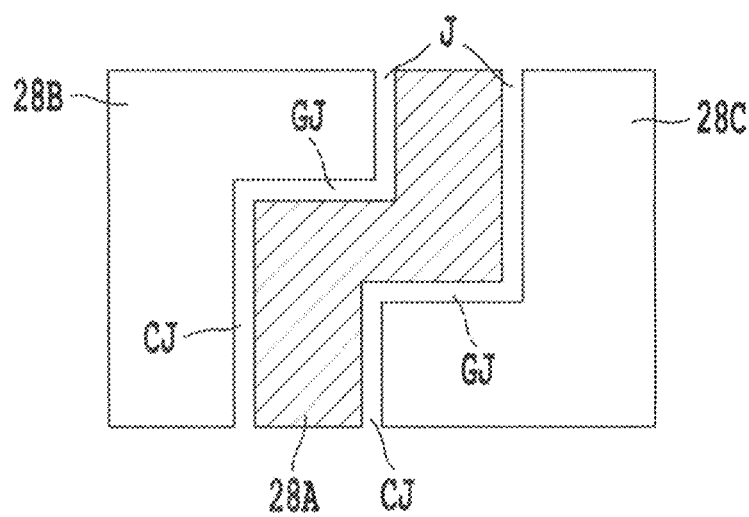
FIG. 62 depicts a cross-section of a connection between two transition elements.
Figure 63:
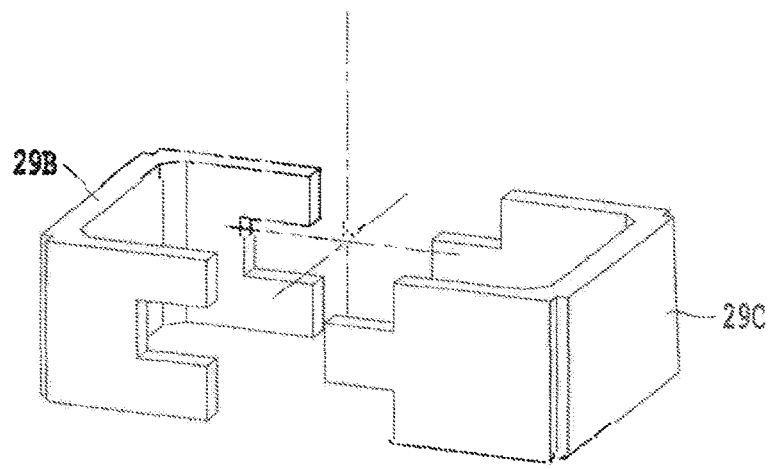
FIG. 63 depicts an isometric view of a variant for elements of a second exemplary embodiment.
Figure 64:
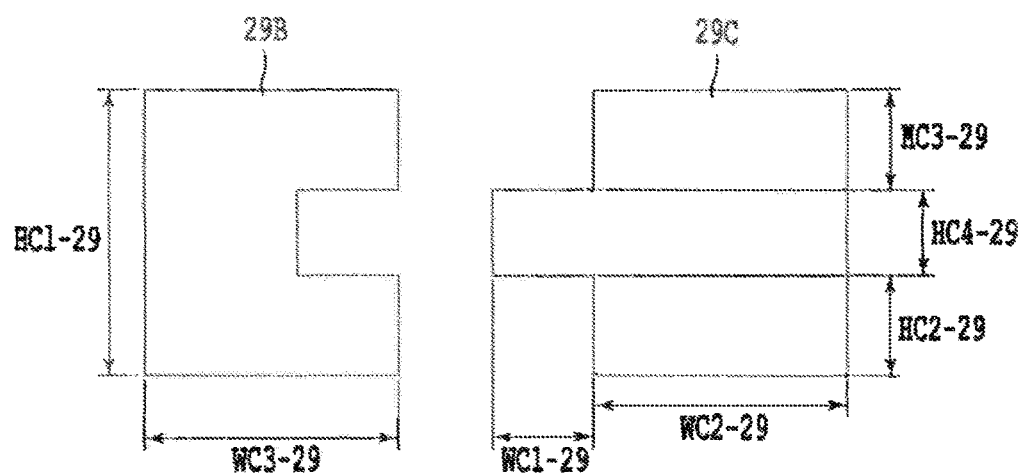
FIG. 64 depicts a side view of a second exemplary embodiment.

Referring to FIG. 63, in an exemplary variant, elements 29B and 29C, which have a function similar to elements 27B and 27C, have an alternate shape. FIG. 62 shows an isometric view of elements 29B and 29C, as shown in FIG. 63. In the embodiment of FIG. 63, the heights HC1-29, HC2-29, HC3-29, and HC4-29 are preferably defined by the following ratios: HC2-29/HC1-29 is 0.25, HC3-29/HC1-29 is 0.25, and HC4-29/HC1-29 is 0.5, with HC1-29 preferably 3.5 m. In other exemplary embodiments HC2-29/HC1-29 is between 0.2 and 0.35, HC3-29/HC1-29 is between 0.2 and 0.35, and HC4-29/HC1-29 is between 0.3 and 0.6, with HC1-29 preferably between 2 and 5 meters. In the embodiment shown in FIG. 63, the widths WC3-29, WC2-29, and WC1-29 are preferably defined by the following ratios: WC1-29/WC3-29 is 0.25, and WC2-29/WC3-29 is 1, with WC3-29 being 4 meters and with WC1-29 being 1 meter. In other exemplary embodiments, WC1-29/WC3-29 is between 0.1 and 1, and WC2-29/WC3-29 is between 0.8 and 1.2, with WC3-29 between 3 and 6.5 meters and WC1-29 between 0.5 and 3 meters. In another embodiment, the combined length of WC3-29 and WC2-29 is 8 meter. In other exemplary embodiments, the combined length of WC3-29 and WC2-29 is between 6 and 13 meters.

In an alternative embodiment, elements 26bb and 26cc, shown in FIG. 60 have a cross-section similar to that shown in FIG. 63. Similarly, in an alternative embodiment, elements 26A and 26B, shown in FIG. 26, have a cross-section similar to that shown in FIG. 63.

In the embodiment shown in FIGS. 62 and 63, vertical joints between elements 29B and 29C are caulk joints, whereas horizontal joints between elements 29B and 29C are grout joints.

Figure 32A:
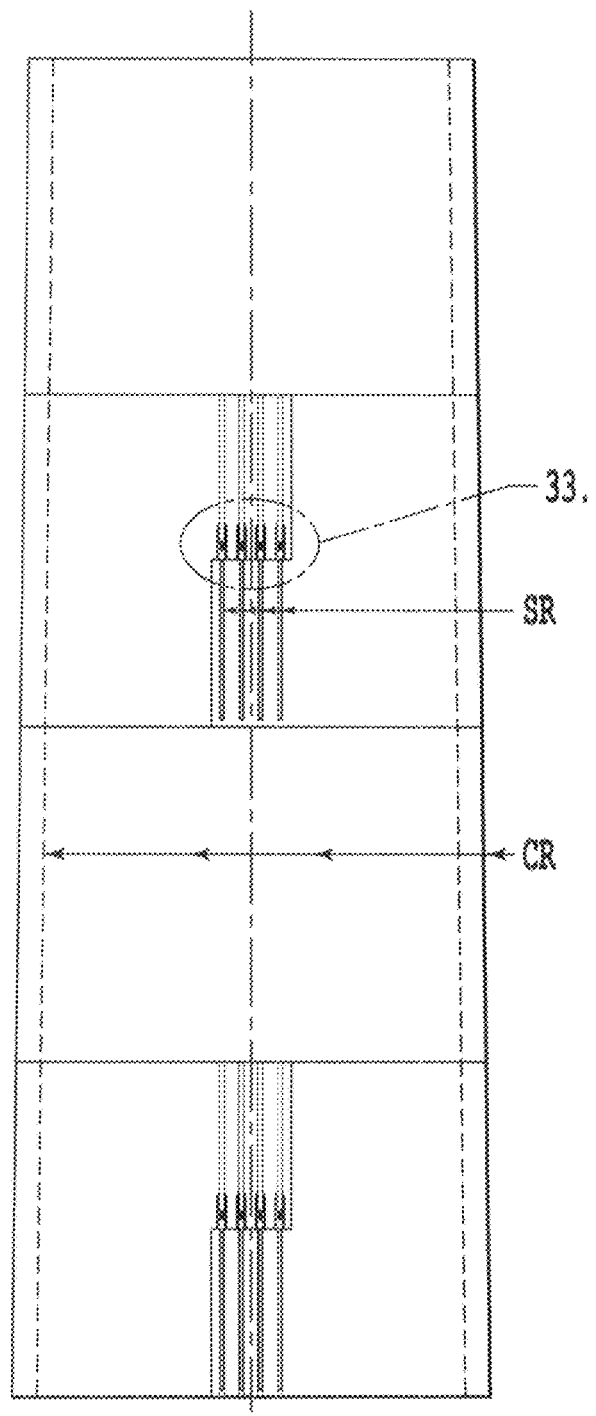
FIGS. 32A-B depict cross-sections of a first and second embodiment of a connection between two transition cross-section elements.

As shown in FIG. 32A, elements 27B and 27C are assembled and held securely in place by rebar strands Sr, which splice the elements 27B and 27C together. In the embodiment shown in FIG. 32A, 4 spliced rebars are used to connect elements 27B and 27C. In other exemplary embodiments, between 2 and 8 spliced rebars are used. As indicated in the embodiment of FIG. 32A, continuous rebar Cr with a constant diameter is used within the tower walls, and coupled at each height interface. In other exemplary embodiments, the diameter of the rebar varies along the tower height. Between 2 and 4 continuous rebars Cr can be used on each tower face. In the embodiment shown in FIG. 32A, 4 continuous rebars are used for each tower face. In an alternate embodiment, 4 continuous rebars are used for the tower, with each rebar located at a tower corner.

Figure 33:
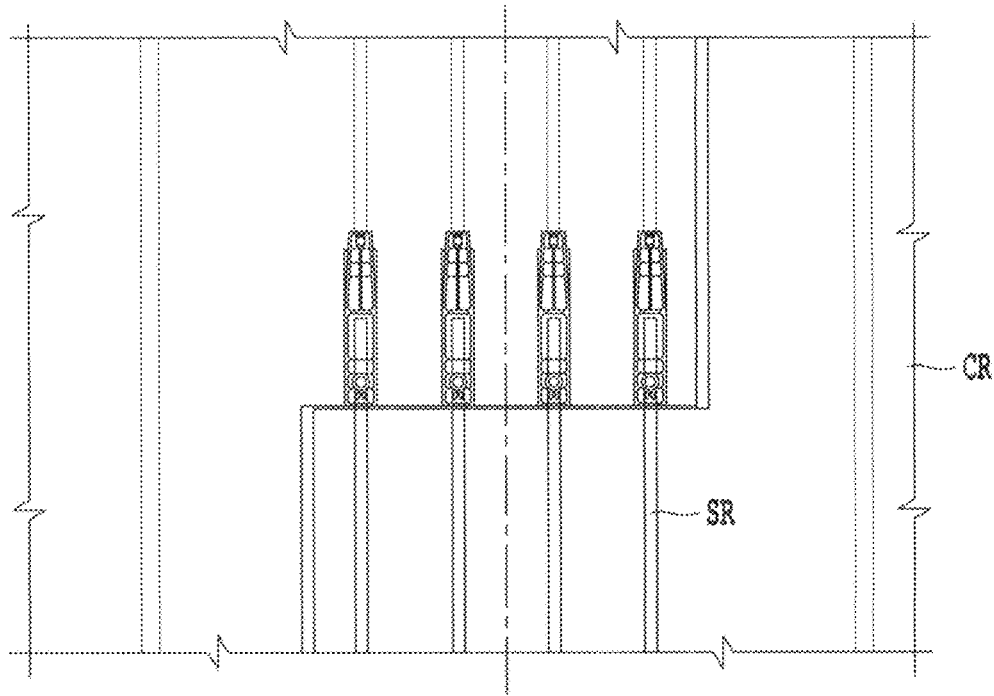
FIGS. 33-34 depict details of the connection between two transition elements for a first and a second embodiment.

FIG. 33 depicts the rebar strands Sr connecting elements 27B and 27C in greater detail. In the embodiment of FIG. 33, the vertical joints present between elements 27B and 27C are sealed with a non-structural caulk for water proofing, while the horizontal joints present between elements 27B and 27C are epoxied or grouted to ensure transfer of normal and shear forces between the elements.

Figure 32B:
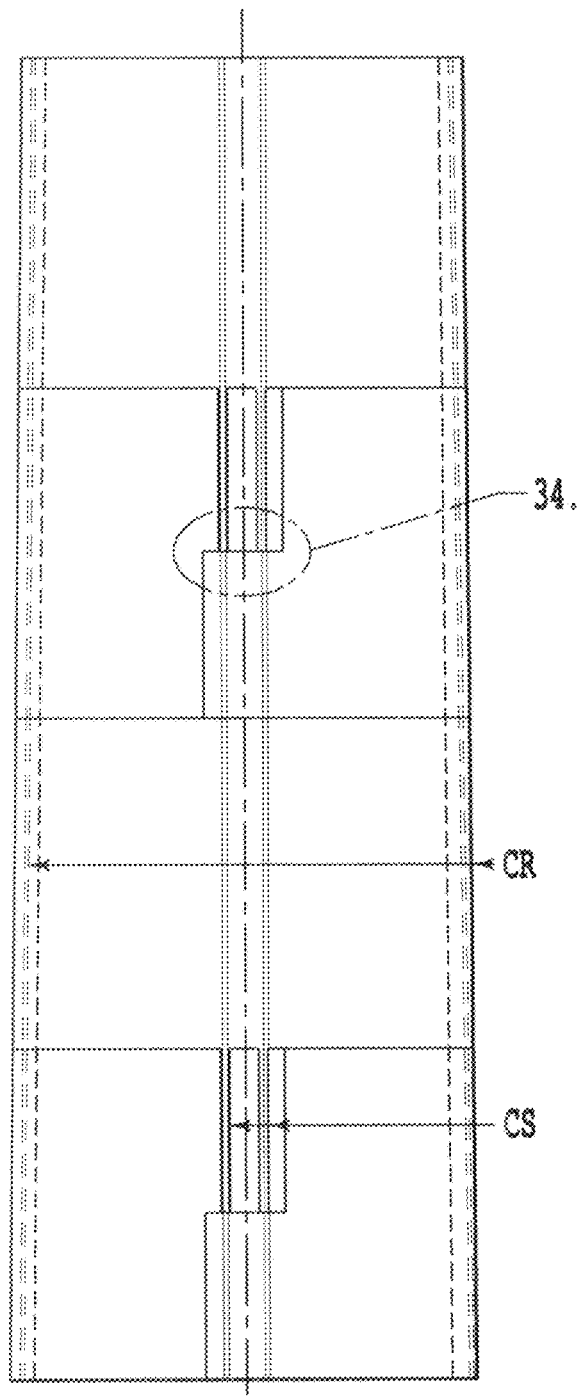
Figure 34:
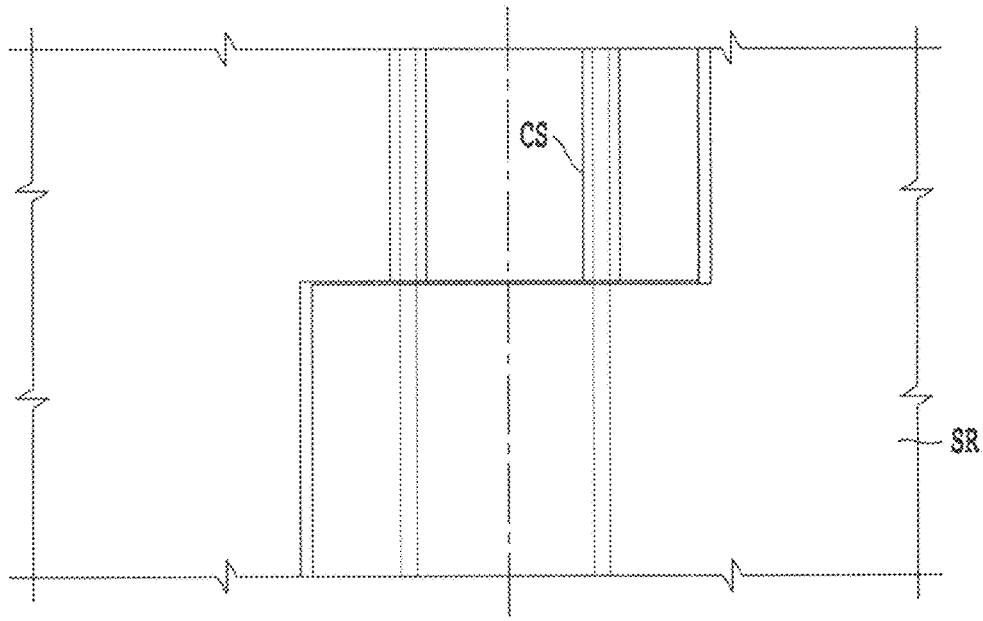

In the embodiment shown in FIG. 32B, elements 27B and 27C are spliced by two rebars to form a unit, with these rebars Sr continuing over the entire tower height. The two spliced rebars are also spliced at each tower level. In the embodiment of FIG. 32B, the spliced rebars are covered by a corrugated sleeve Cs, with a diameter 1.5 to 2.5 times larger than the diameter of the spliced rebars. As shown in FIG. 32B, full height continuous rebars Cr are also present in the tower walls, as discussed above. FIG. 34 depicts two spliced rebars SR connecting elements 27B and 27C, as well as the corrugated sleeves, which are grouted after the tower assembly to provide additional structural support.

Figure 37:
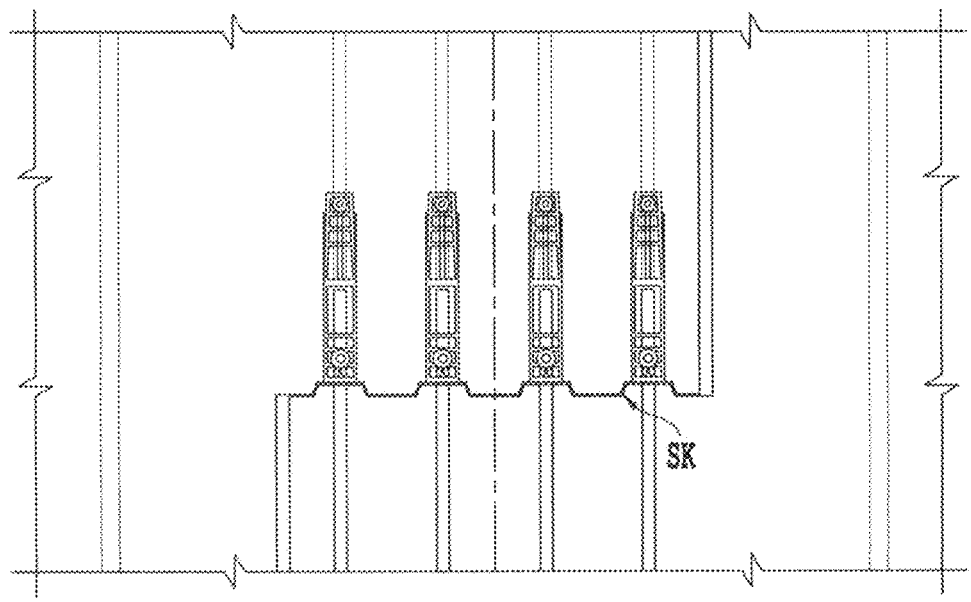
FIGS. 37 and 38 depict details of a first and second variant of the connection between two transition elements.
Figure 38:
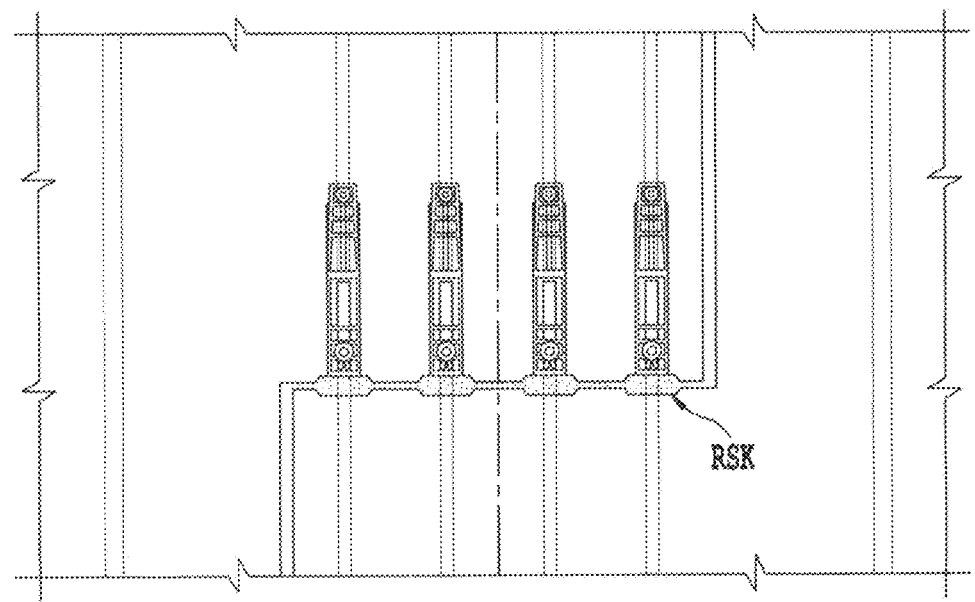

Referring to FIGS. 37 and 38, additional variants of the connection between elements 27B and 27C are shown. In the exemplary embodiment of FIG. 37, a shear-keyed surface (SK) is used for both elements 27B and 27C, such that the shear keyed surfaces of elements 27B and 27C are aligned with each other. In the exemplary embodiment of FIG. 38, a shear-keyed surface is used for both elements 27B and 27C, yielding a reversed shear-keyed surface (RSK), between elements 27B and 27C.

Figure 61:
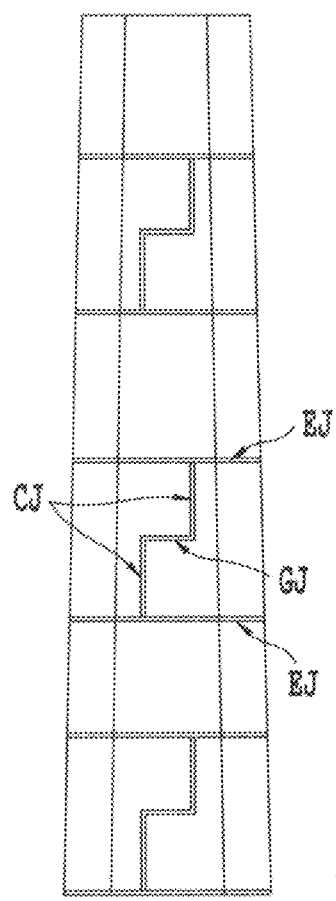
FIG. 61 depicts a side view of alternative embodiment of a connection between two transition elements.

Referring to FIG. 61, epoxy joints (EJ) are used to attach pairs of elements (27B-C) which form different levels of the tower. In this exemplary embodiment, the vertical joints (CJ) between elements 27B and 27C are caulk joints, while the horizontal joint (GJ) between elements 27B and 27C is a grout joint.

Structural connections between joints are required to be certified, which is both costly and time consuming. Structural connections must be able to withstand compression, tension and shear loads, with a minimum factor of safety. In an exemplary embodiment, the number of areas which need to be certified is advantageously minimized. The epoxy and grouted joints are structurally fastened together, but the vertical caulked joints have no structural connection between elements. This system is also economic since it allows pre-fabrication of the tower without the need for structural connection of vertical joints which is quite difficult. Both the epoxy and grouted joints are pre-compressed by application of the tower post-tensioning system. The caulked joints could be offset from the vertical by as much as 8 degrees. By being vertical or near vertical the caulked joints are substantially parallel to the main internal force flow in the tower structure, and accordingly have no significant impact on the tower performance. The caulked joints could be arranged in the repeated pattern shown or in any number of alternative patterns. In an alternative embodiment, each face could have vertical caulked joints, with each joint location offset from that of joints on another level, such that vertical joints do not align at the epoxy joint location between levels.

In further embodiments, connections between tower structural elements include grooves filled with filler material. The filler material used is thixotropic, such that it takes a finite time to attain equilibrium viscosity in the event of a step change in shear rate.

In another exemplary embodiment, a longitudinal section of the tower includes at least three elements, such that a first portion of a first element is higher than a second portion of a second element, a first portion of a second element is higher than a second portion of a third element, and a first portion of a third element is higher than a second portion of a first element.

Figure 21:
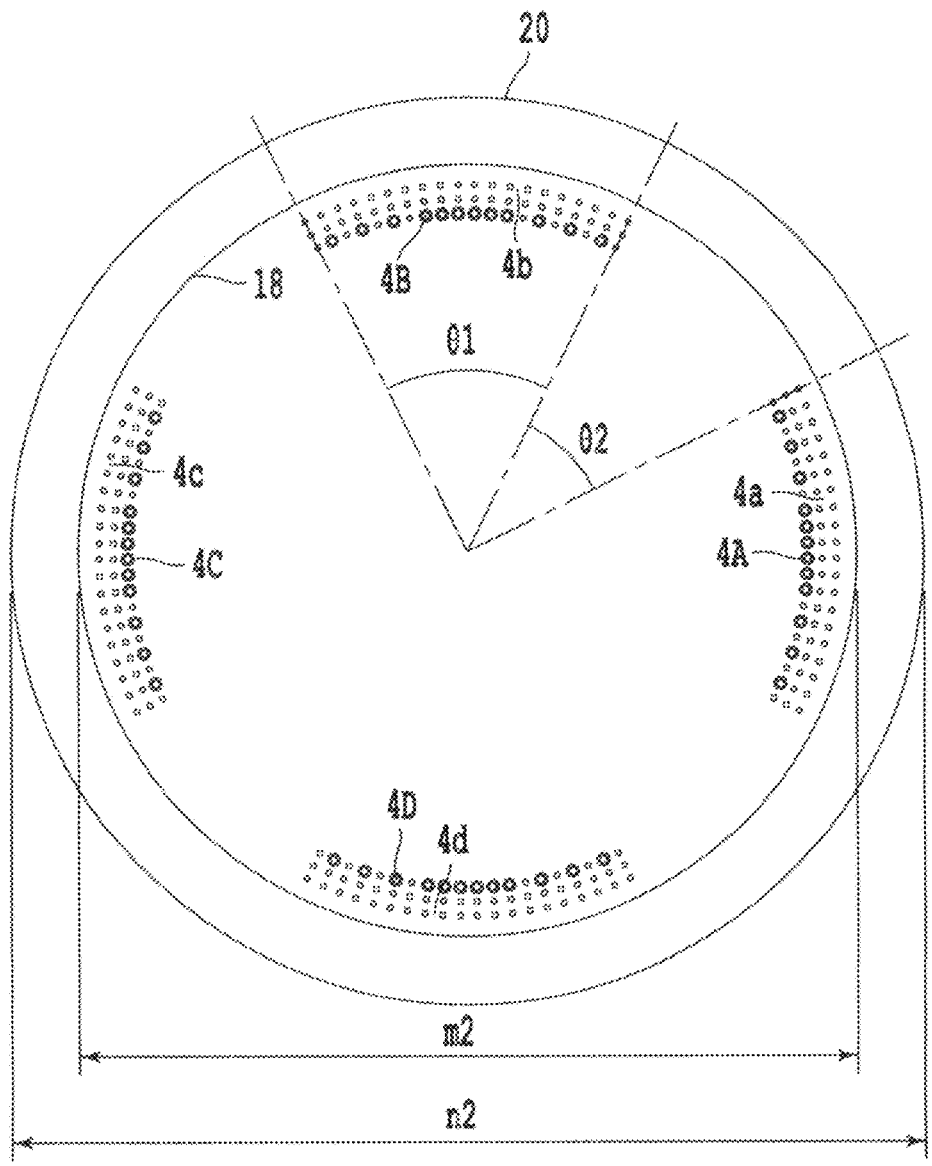
FIG. 21 depicts a plan view at a first height of a second exemplary embodiment.
Figure 23A:
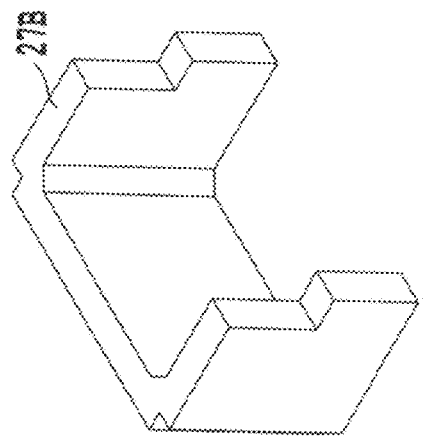
FIGS. 23A-B depict elements of a second exemplary embodiment.
Figure 36:
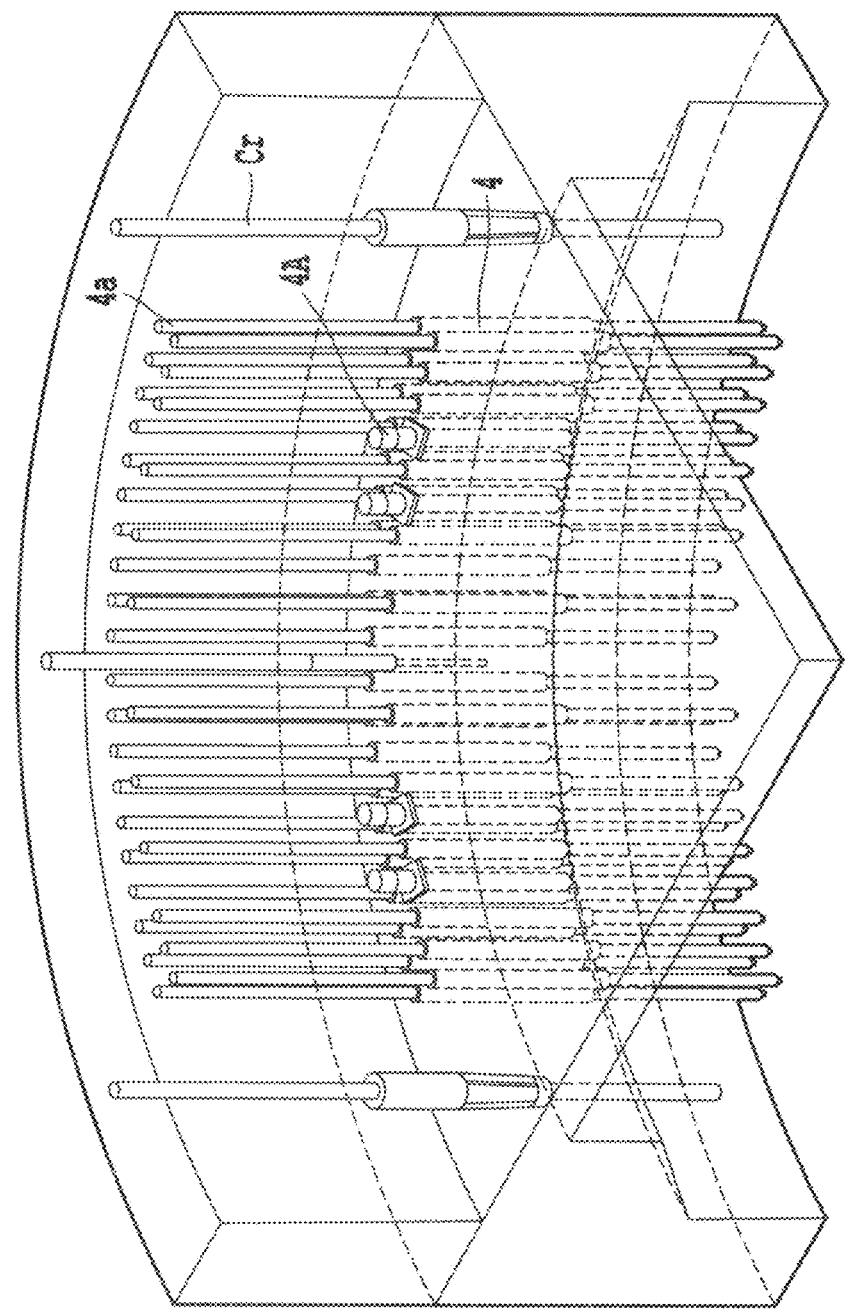
FIG. 36 depicts a perspective view of a quadrant of an exemplary embodiment with post-tensioning strands.

Referring to FIG. 21, a plan view of the tower is shown at a height greater than that of FIG. 20. The longitudinal tower element includes an inner wall (18) with diameter m2 and an outer wall (20) with diameter n2. PT strand groups 4a-d, which extend from the foundation anchor points (5) are present along the inner surface of the inner wall (18). Each PT strand quadrant spans an angle $\theta 1$, with an angle $\theta 2$ between strand quadrants. In the embodiment shown in FIG. 21, four concentric rows of PT strands are anchored in the foundation. In addition, referring to FIG. 16, a portion of the PT strands in each quadrant is capped off at each level PT1 through PT6, such that at the PT6 level, all PT strands have been capped off. In this exemplary embodiment, the number and location of strands being capped off at each level is identical in each strand quadrant. Referring to FIG. 36, a perspective view of a quadrant of a tower segment is shown with post-tensioning strands (4) connecting two tower elements, with a portion (4a) of the PT cables going through the tower elements, and a portion (4A) of the PT cables capped off above the lower tower element. The presence of continuous rebar (Cr) between PT cable groupings is also shown in FIG. 36.

Figure 24:
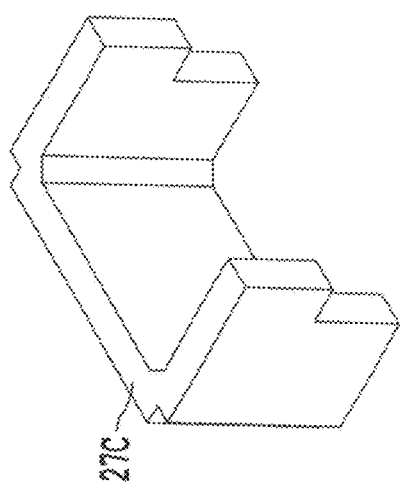
FIG. 24 depicts an element of a second exemplary embodiment.
Figure 23B:
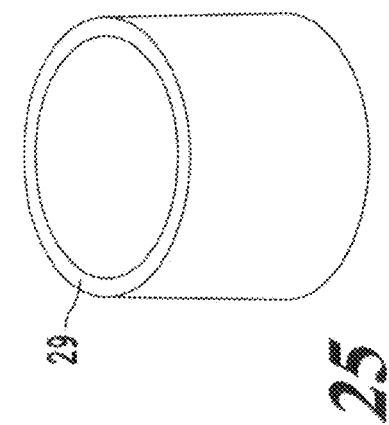
Figure 25:
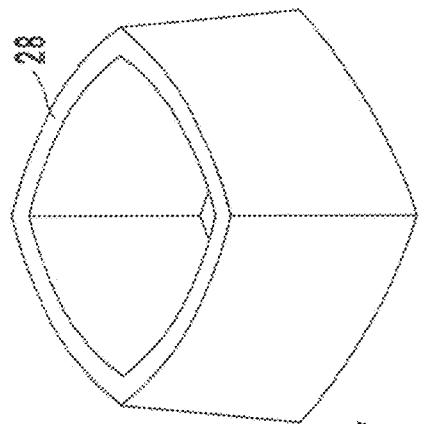
FIG. 25 depicts an element of a second exemplary embodiment.

FIG. 24 shows a perspective view of a transition element (28). In the exemplary embodiment shown in FIGS. 15-16, several transition elements are used to connect square cross-section elements to circular cross-section elements. Accordingly, each transition element (28) has an upper and lower cross-sectional profiles which differ from each other. The transition element abutting a square cross-section element has a square lower cross-section, while the transition element abutting a circular cross-section element has a circular upper cross-section. Transition elements located between the transition element abutting a square cross-section and the transition element abutting a circular cross-section have upper and lower cross-sectional profiles which are neither exactly square, nor exactly circular. The closer a transition element is to a circular cross-section element, the more circular its cross-section profiles are. The closer a transition element is to a square cross-section element, the squarer its cross-section profiles are.

In other exemplary embodiments, the tower includes at least one first longitudinal section with square cross-sectional elements, at least one second longitudinal section with transition elements having a changing cross-section between square and circular, and at least one third longitudinal section with tubular cross-section elements.

Figure 30:
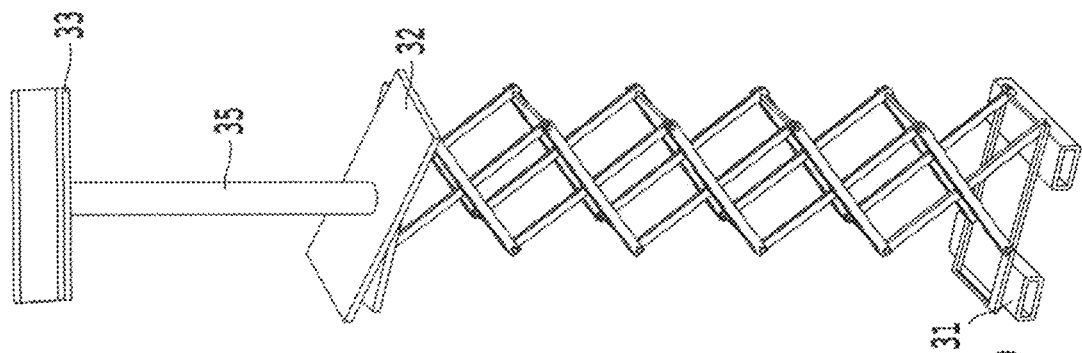
FIGS. 28-30 depict side, front, and perspective views of a platform lift system of an exemplary embodiment.
Figure 29:
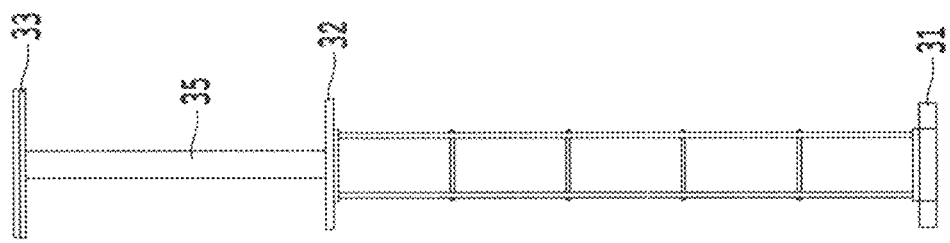
Figure 28:
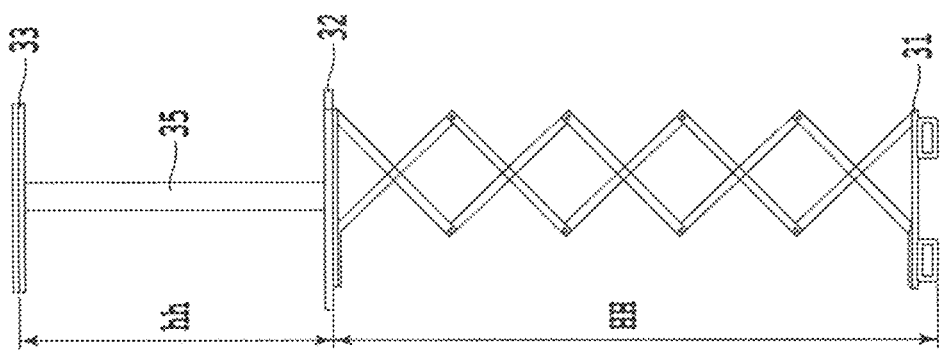
Figure 31A:
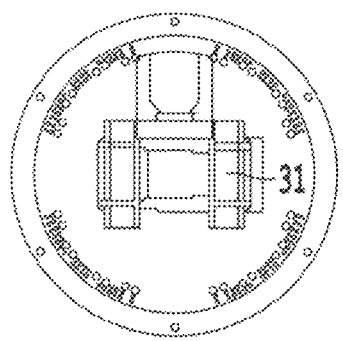
FIGS. 31A-C depict a cross-section of a platform lift system of an exemplary embodiment at three different levels.
Figure 31B:
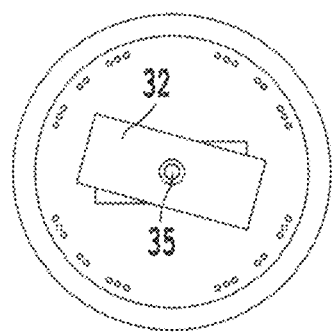
Figure 31C:
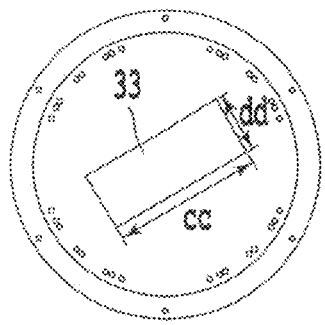

In the embodiment exemplified in FIGS. 28-30, a service lift platform can be used to help with the construction of the tower. The service lift platform includes a retractable outrigger (31), an intermediate platform (32), and an upper platform (33). Referring to FIGS. 28-30, the folding elevating system (34) with a maximum extended height HH vertically connects the outrigger (31) to the rotating intermediate platform (32). A vertical mast (35) with height hh is connected to the rotating intermediate platform (32), and supports an upper rotating platform (33). Referring to FIGS. 31A-C, the lift system is shown at a lower level with the visible outrigger (31) in FIG. 31A, the intermediate platform (32) and mast (35) at a higher level in FIG. 31B, and the upper platform (33), with dimensions cc and dd at an upper level in FIG. 31C. In an exemplary embodiment, during construction, the rectangular service lift platform is positioned on a platform (17) and gradually extended to its maximum height while the tower is assembled. A circular PT platform with a rectangular slot larger than the dimensions of the lift system base is then positioned to cover the existing tower elements, and the lift system is hoisted by a crane through the opening in the PT platform, before being positioned on this next PT platform. The lift system is rotated such that its base is not coaxial with the platform rectangular slot, allowing it to rest on the PT platform. The lift system can then be used in a similar fashion to help construct the tower to a next higher PT level. This process can be repeated after each PT tower level has been constructed, with the lift system being used, a PT platform being put in place as a lid, and the lift system lifted through an opening in that PT platform, then rotated to securely rest on the PT platform and help build the next level.

In the embodiment shown in FIG. 7, a ladder (14) provides access to an upper level. The service lift platform is located at a radius which is smaller than the radius at which the post-tensioning (PT) strands are located. In alternative embodiments, the ladder is present along the entire length of the tower, providing access to all levels.

In the embodiment shown in FIGS. 28-30, the vertical mast (35) height hh is preferably 3.6 meters. In exemplary embodiments, the mast (35) height hh is between 3 and 4 meters, and the maximum extended height HH of the folding system (34) is between 6 and 8 meters.

Figure 39:
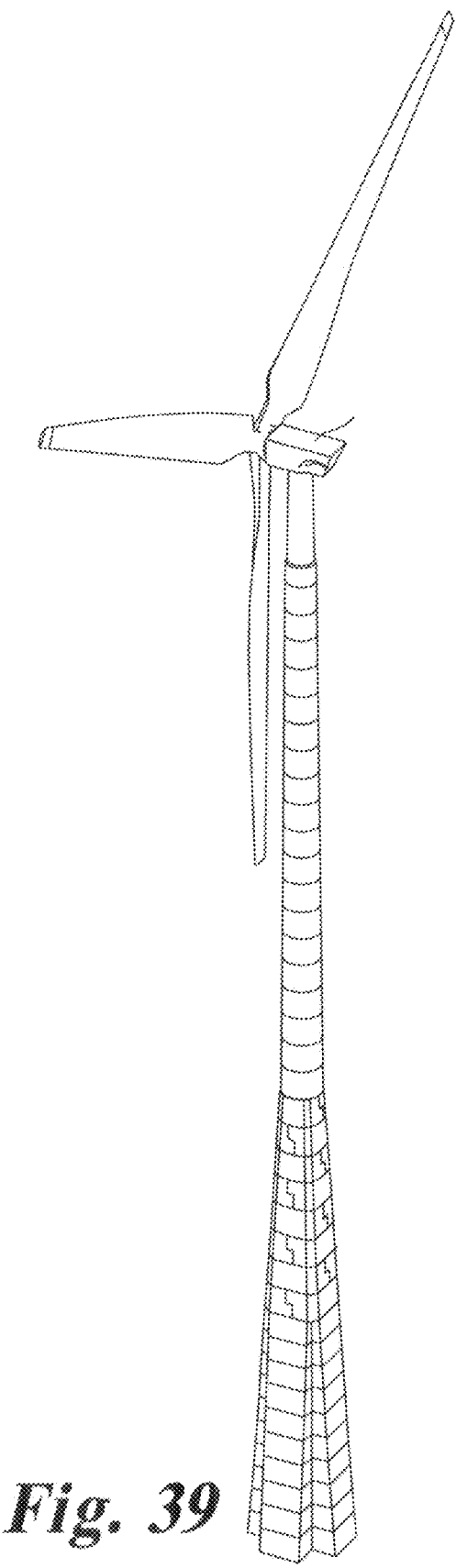
FIG. 39 depicts a perspective view of a third embodiment.
Figure 40:
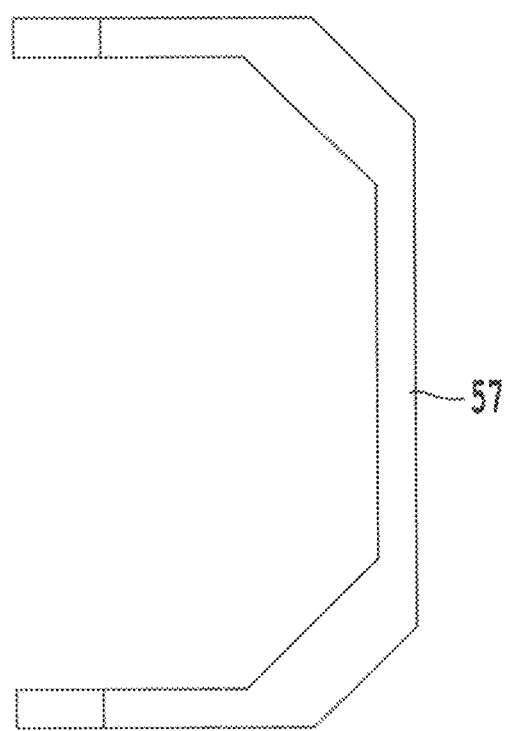
FIG. 40 depicts the cross-section of a transition element for a third embodiment.
Figure 42:
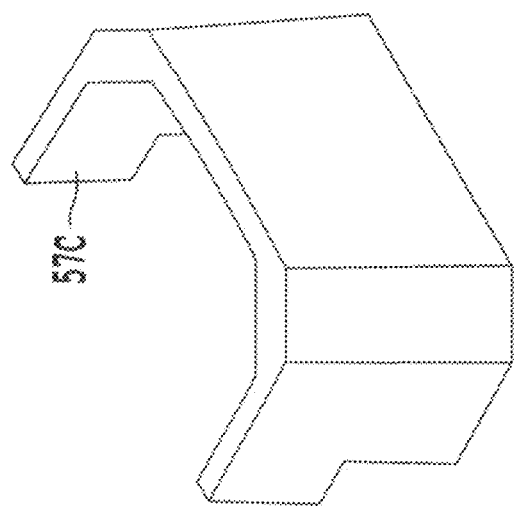
FIGS. 41 and 42 depict a perspective view of two transition elements for a third embodiment.
Figure 41:
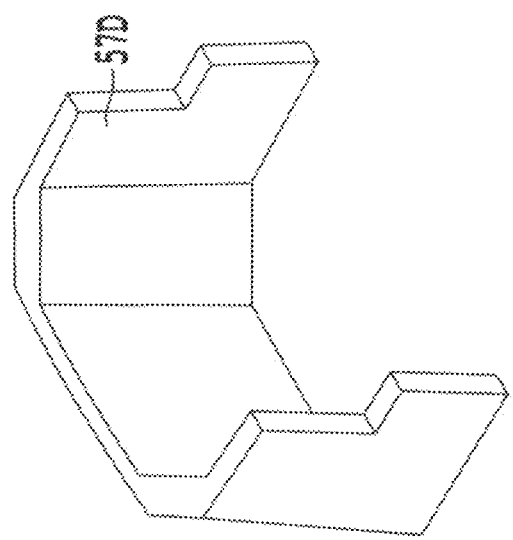

FIG. 39 depicts a third exemplary tower embodiment, comprising cruciform elements, transition elements, and circular elements. Referring to FIG. 40, a cross-section of a transition element (57) is shown. FIGS. 41 and 42 depict a pair of transition elements (57C-D). The cruciform elements of the third exemplary tower embodiment are similar to the cruciform elements of the second exemplary tower embodiment.

Figure 43:
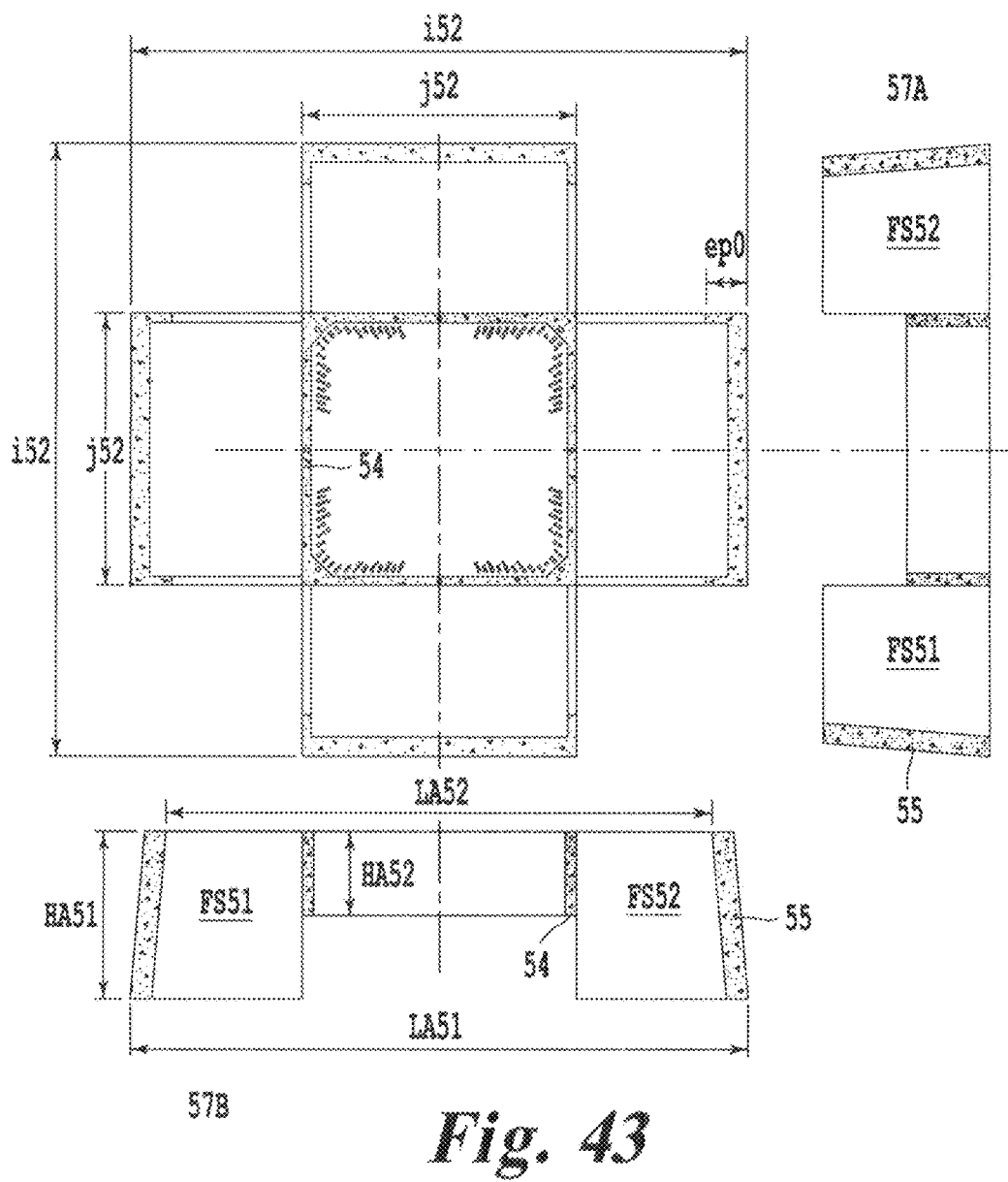
FIG. 43 depicts elements of a first variant of a third embodiment.
Figure 44:
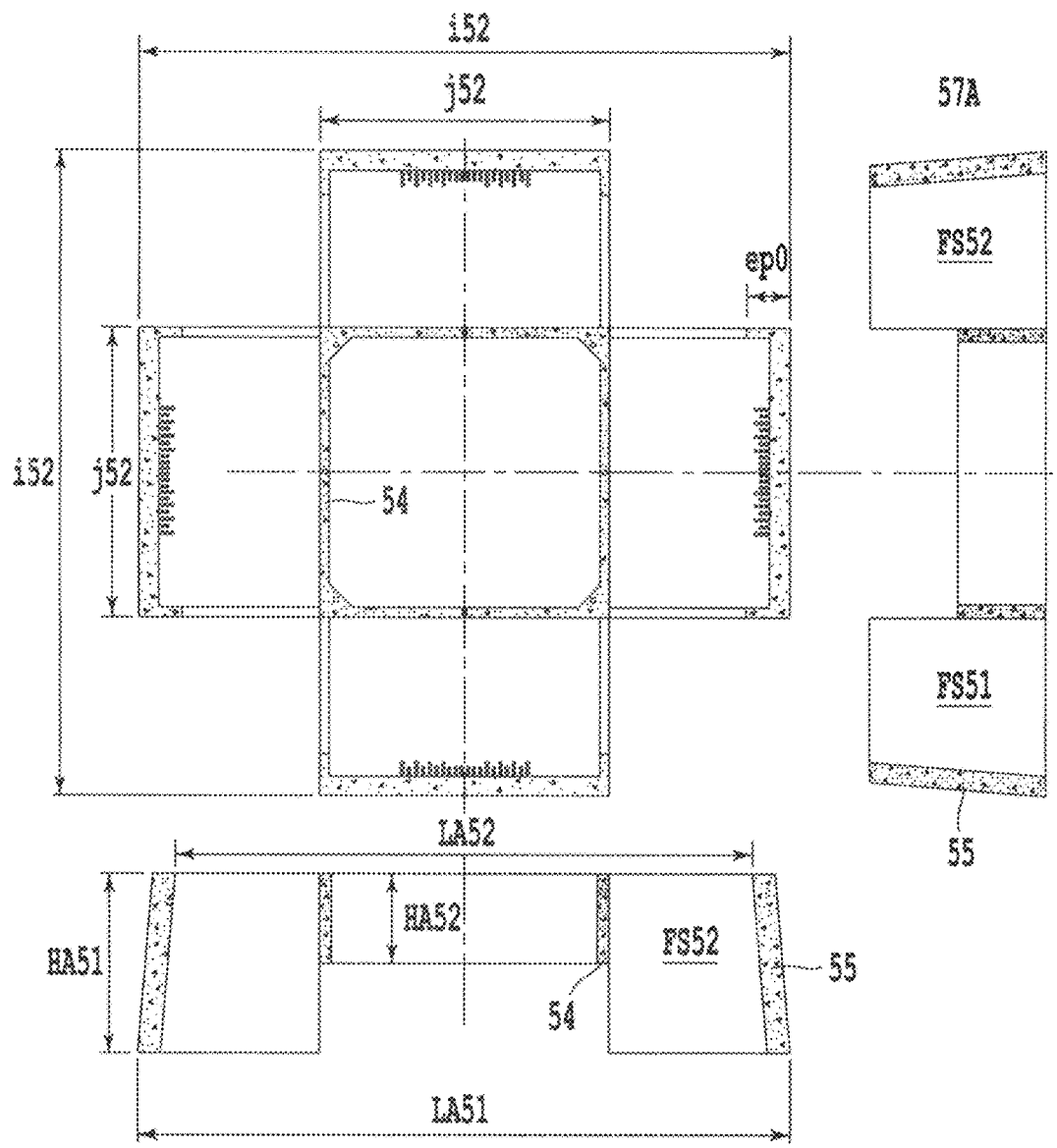
FIG. 44 depicts elements of a second variant of a third embodiment.

Similarly to FIG. 19, FIGS. 43 and 44 depict a plan view of the cruciform cross-section elements at ground level. FIG. 43 depicts a first variant of a PT strand distribution, with the strands located in four symmetrical groupings inside the inner cross-section of the cruciform assembly. FIG. 44 depicts a second variant of a PT strand distribution, with the strands located in four symmetrical groupings along the edges of the outer perimeter of the cruciform assembly.

A cruciform cross-section element comprises a first element (57A) and a second element (57B), each with a U-shape and an inter-locking notched section which allows the assembly of cruciform cross-section elements (57A-B) in a pair which forms a cruciform cross-section footprint element pair.

As shown in the exemplary embodiment of FIGS. 43 and 44, the U-shape of elements 57A-B includes two right trapezoidal prisms on opposite sides of a rectangular parallelepiped which form the notched section. The rectangular parallelepiped of element 57A is adjacent to a shorter base of the trapezoidal prisms, and the rectangular parallelepiped of element 57B is adjacent to a longer base of the trapezoidal prisms. Each element 57A and 57B has a width j52, preferably 4.8 meters, and a length i52, preferably 11 meters, and each combination of elements 57A-B has a height (HA51) of 3 meters. In an exemplary embodiment the height of each element pair 57A-B is constrained by shipping and handling capabilities, such as the dimensions of a truck bed, or train platform. In other exemplary embodiments, the width i52 is between 9 and 12 meters, and the width j52 is between 4 and 6 meters.

Referring to FIGS. 43 and 44, each element 57A or 57B includes a central notched section with a height HA52, flanked on opposite sides by elements FS51 and FS52, which have a height HA51, and include a vertical wall adjacent to the notched section, and oblique walls opposite the notched sections, creating a first length of the element on one side LA51, and a second length of element 57A or B on another side LA52. In an exemplary embodiment, dimensions LA51 and LA52 are determined by the overall tower height and the corresponding tower wall slope, which can vary for example between 0 and 6 degrees. In an exemplary embodiment, the length LA52 is 10 meters. In other exemplary embodiments, the length LA52 is between 8 and 12 meters.

In one embodiment, elements 57A-B can be used to form up to 50 meters of the tower. In another embodiment, elements 57A-B can be used to form up to a third of the overall tower height. Each pair of elements (57A-B) is epoxied along the walls of the inner rectangular cross-section, which are superposed with precast core elements (3a). In addition, each element 57A is epoxied to an upper level adjacent element 57A along its outermost edges which are superposed with precast foundation wings (3b), over a width (ep0). Each element 57B is epoxied to an upper level adjacent element 57B along the element outermost edges (55) which are superposed with precast foundation wings (3b). In an exemplary embodiment, the width ep0 is 0.75 meters. In other exemplary embodiments, the width ep0 is between 0.5 and 1 meter.

Figure 45:
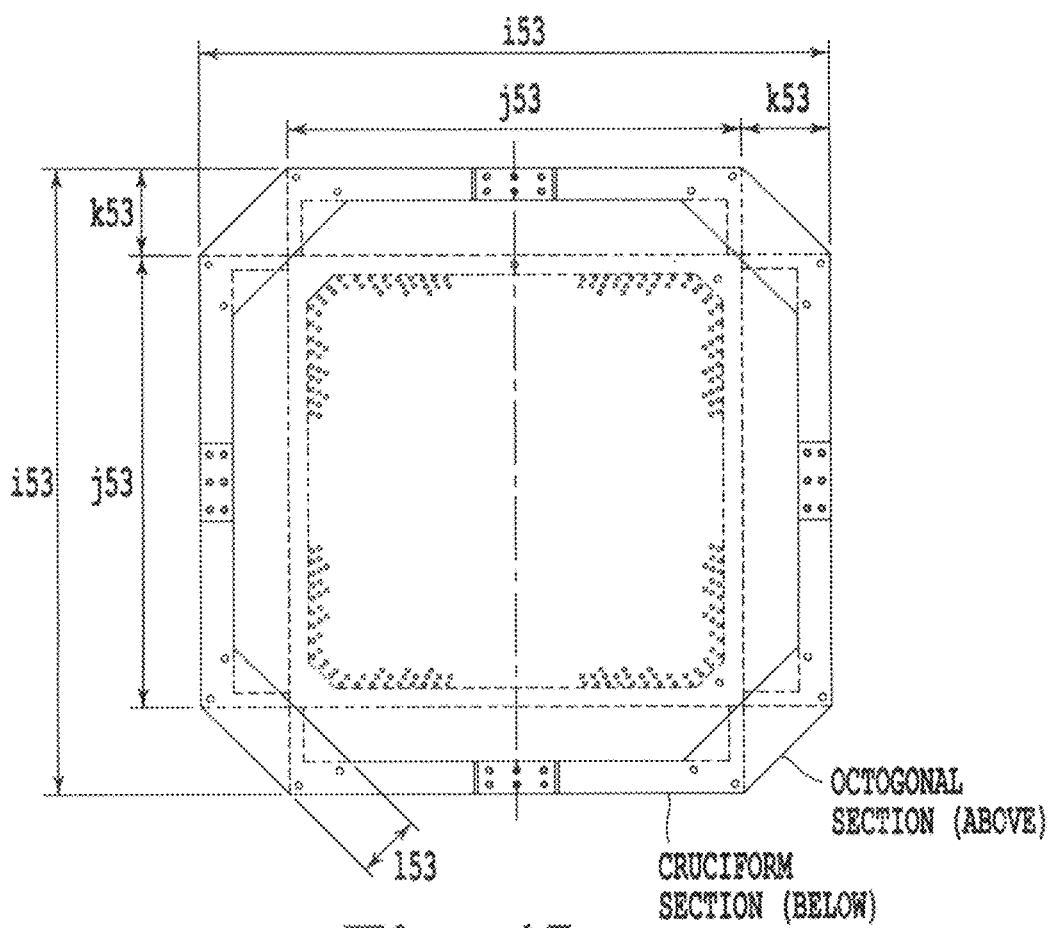
FIG. 45 depicts a cross-section of a first variant of a third embodiment at a first level.
Figure 46:
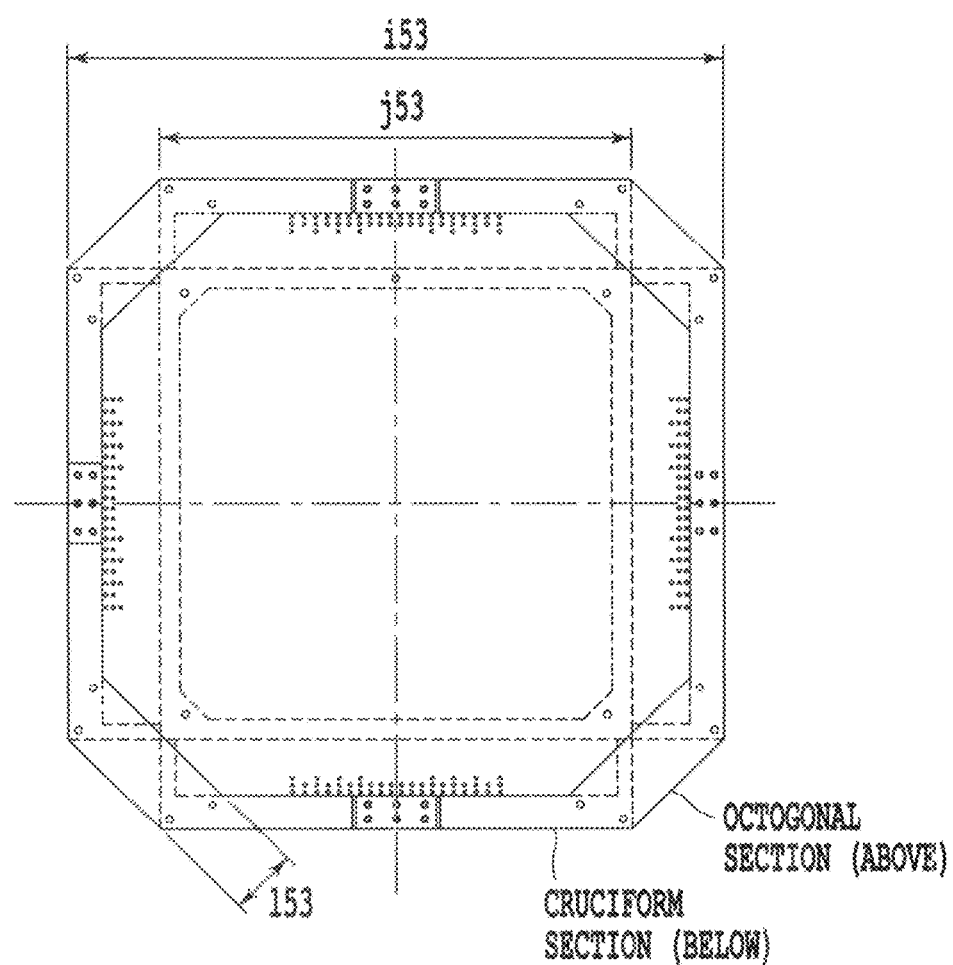
FIG. 46 depicts a cross-section of a second variant of a third embodiment at a first level.

Referring to FIG. 45, a cross-section of a first variant of a third embodiment at a first level is shown, which displays a lower cruciform section and an upper octagonal section. The lower cruciform section has an inner width (j53) and an outer width (i53), with a difference (k53), and a half-diagonal dimension (l53). The octagonal section provides thickened corners which provide closure by overlapping the corners of the lower cruciform sections. In this exemplary variant, mild reinforcing bars are shown at the corners, as well as the center of the flat faces, connecting transition elements as well as providing continuous reinforcement throughout the tower. Connections between the transition elements forming the upper octagonal section above can be seen with groups of 6 rebars on each principal side of the octagonal section. In the variant shown in FIG. 45, the PT strands are grouped inside the inner cross-section of the cruciform assembly. Alternatively, in the variant shown in FIG. 46, the PT strands are distributed in the outer portion of the cruciform assembly, along each principal side of the octagonal section. In an exemplary embodiment, the width j53 is 4.8 meters, and the width i53 is 6.7 meters. In other exemplary embodiments, the width j53 is between 3 and 6 meters, and the width i53 is between 5 and 8 meters.

Figure 47:
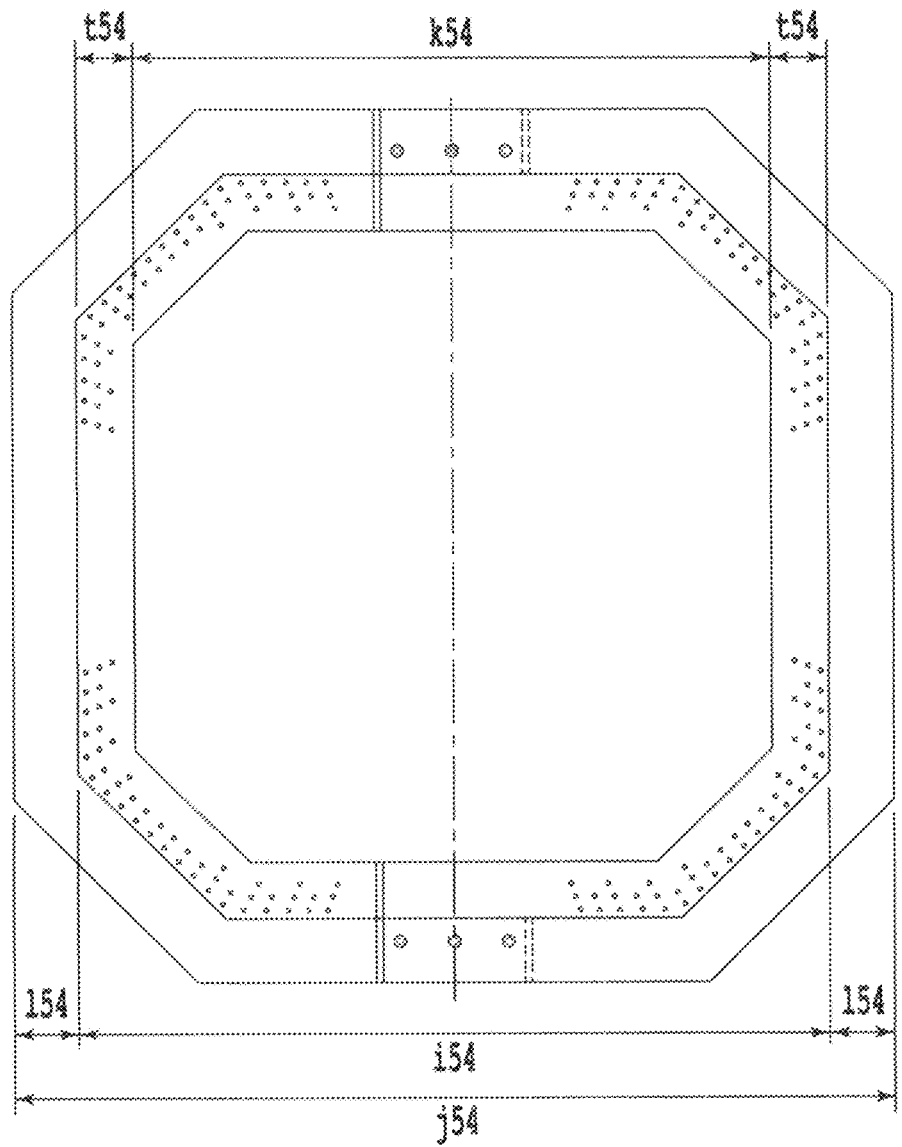
FIG. 47 depicts a cross-section of a first variant of a third embodiment at a second level.

In the exemplary embodiment shown in FIG. 47, a cross-section of a first variant of a third embodiment at a second level displays an octagonal cross-section with inner width (k54), outer width (j54), and intermediate width (i54), such that the width of the inner compartment in which the PT strands are located is (t54), and the width of the outer compartment in which the rebars are located is (l54). In an exemplary embodiment, the width j54 is 4.1 meters, the width k54 is 3.5 meters, and the width i54 is 4.8 meters. In other exemplary embodiments, the width j54 is between 3 and 6 meters, the width k54 is between 3 and 4 meters, and the width i54 is between 4 and 7 meters. In the variant shown in FIG. 47, the PT strands are distributed symmetrically in four corners of the octagonal cross-section, and there are two connecting zones with 3 rebars each, located on opposite main sides of the octagonal cross-section.

Figure 48:
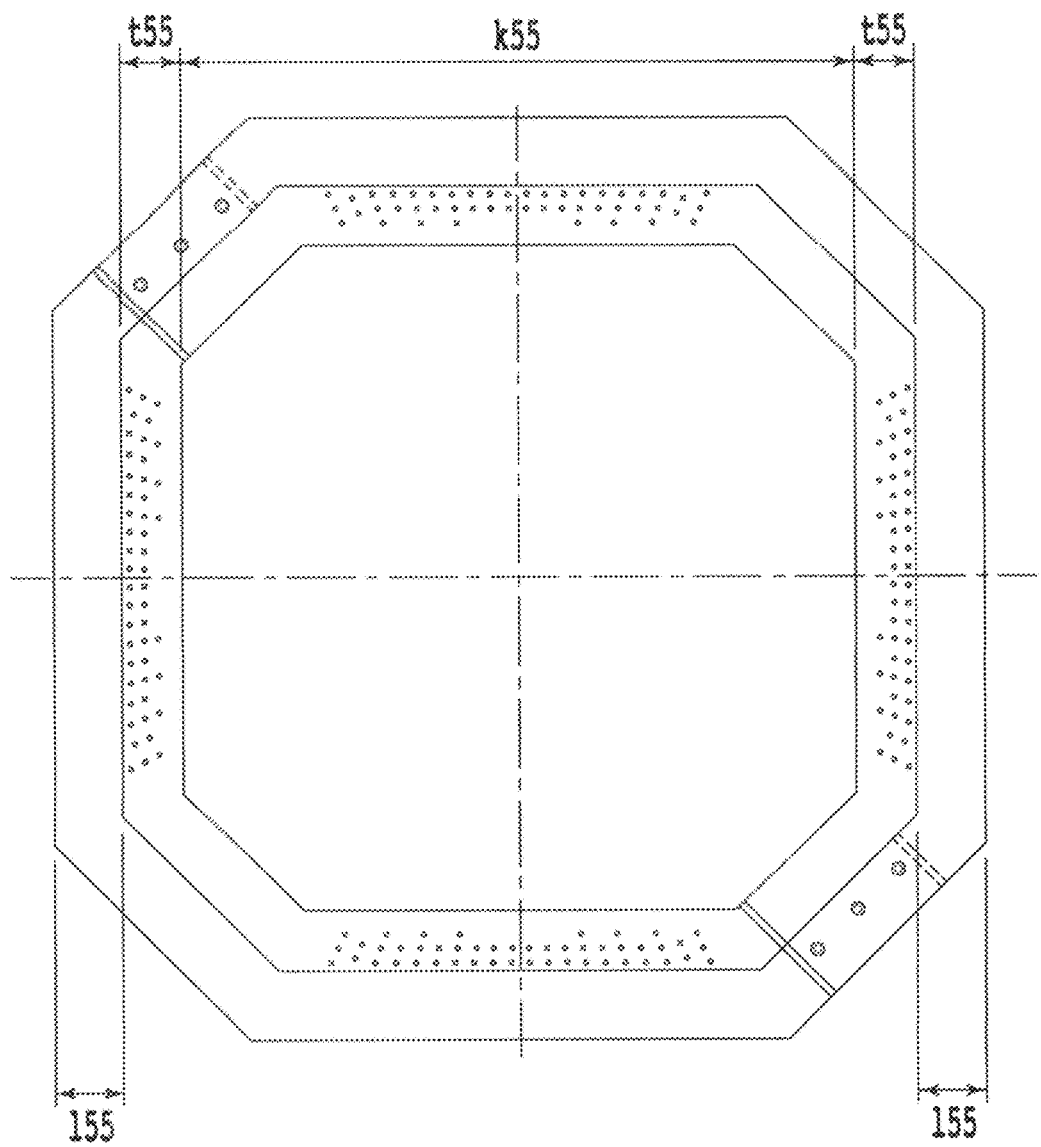
FIG. 48 depicts a cross-section of a second variant of a third embodiment at a second level.

In the variant shown in FIG. 48, the cross-section has an inner width (k55), and the PT strands are distributed within the first compartment with width (t55) symmetrically along the main edges of the octagonal cross-section, and there are two connecting zones with 3 rebars each, located in the second compartment with width (l55) on opposite minor sides of the octagonal cross-section.

Figure 49:
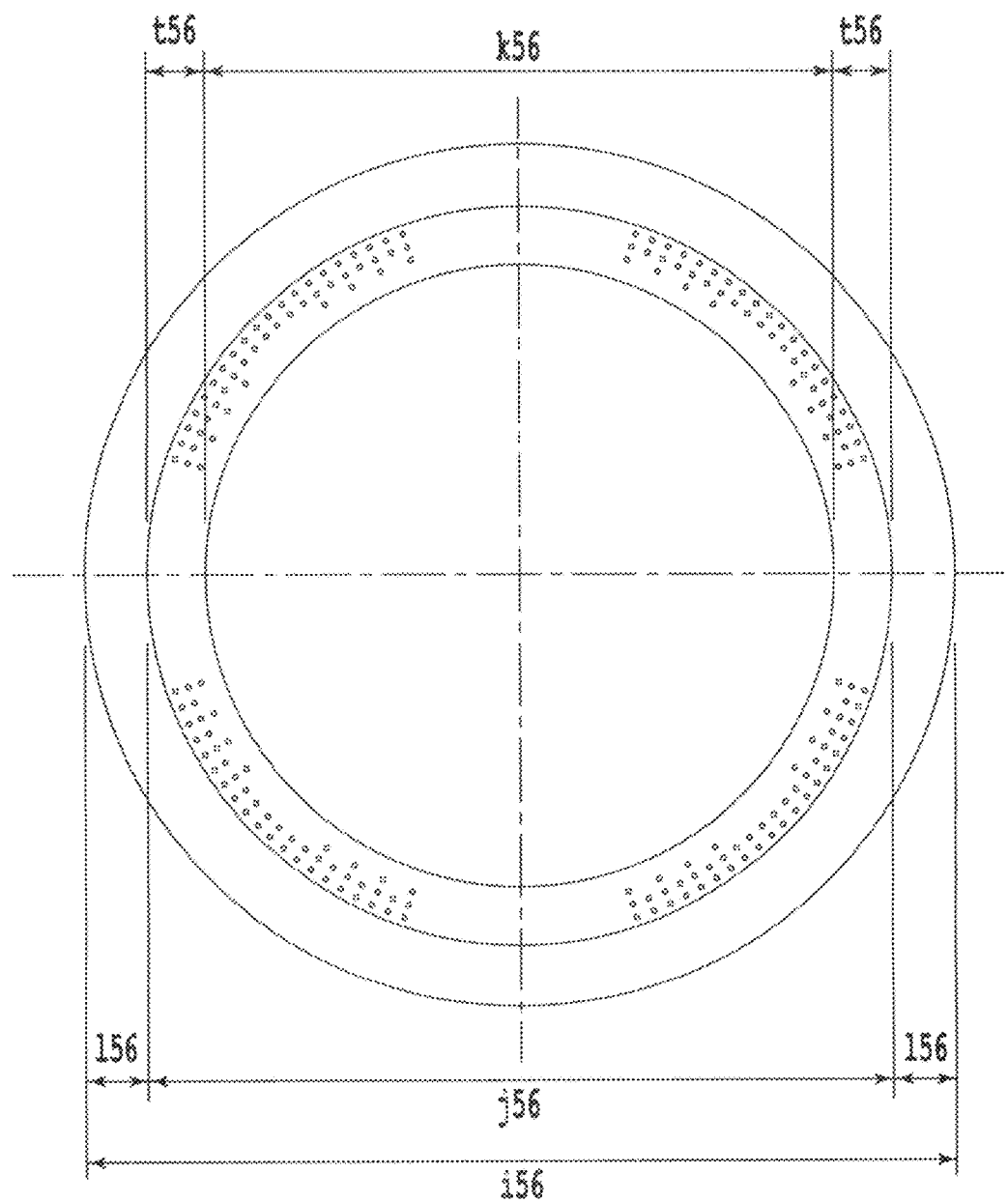
FIG. 49 depicts a cross-section of a third embodiment at a third level.

In the exemplary embodiment shown in FIG. 49, a cross-section of a third embodiment at a third level is circular, with an inner diameter (k56) of a first compartment with thickness (t56), and an outer diameter (i56) and an intermediate diameter (j56) defining a second compartment with thickness (l56). In this exemplary variant, the PT strands are distributed symmetrically in four groupings within the first compartment. In an exemplary embodiment, the distance j56 is 4.1 meters, the distance k56 is 3.5 meters, and the distance i56 is 4.8 meters. In other exemplary embodiments, the distance j56 is between 3 and 6 meters, the distance k56 is between 3 and 4 meters, and the distance i56 is between 4 and 7 meters.

Figure 50:
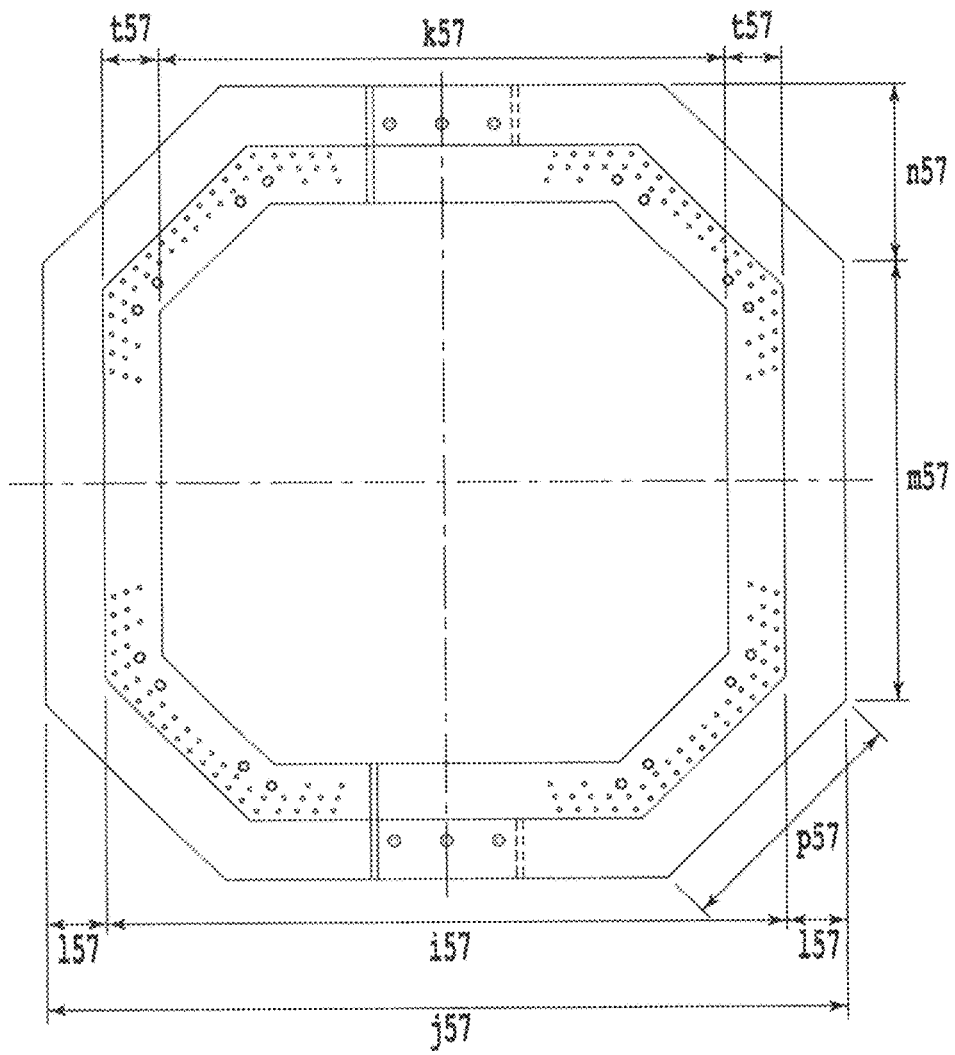
FIG. 50 depicts a cross-section of a first variant of a third embodiment at a fourth level.

Referring to FIG. 50, a cross-section of a first variant of a third embodiment is shown at a fourth level. The cross-section is octagonal in shape, with inner width (k57), outer width (j57), and intermediate width (i57), such that the width of the inner compartment in which the PT strands are located is (t57), and the width of the outer compartment in which the rebars are located is (l57). The shape of the octagonal cross-section is further defined by dimensions (p57) and (n57) for the minor sides of the cross-section. In an exemplary embodiment, the width j57 is 3.9 meters, the width k57 is 3.25 meters, and the width i57 is 4.6 meters. The lengths m57 and n57 are 2.5 meters and 1 meter respectively, and p57 is 1.4 meters. In other exemplary embodiments, the width j57 is between 3 and 5 meters, the width k57 is between 3 and 4 meters, and the width i57 is between 4 and 7 meters. The lengths m57 and n57 are between 2.25 and 2.75 meters and between 0.5 and 1.5 meters respectively, and p57 is between 1.2 and 1.6 meters. In this variant, two groupings of three rebars are located opposite each other and along the main sides of the cross-section, of length (m57).

Figure 51:
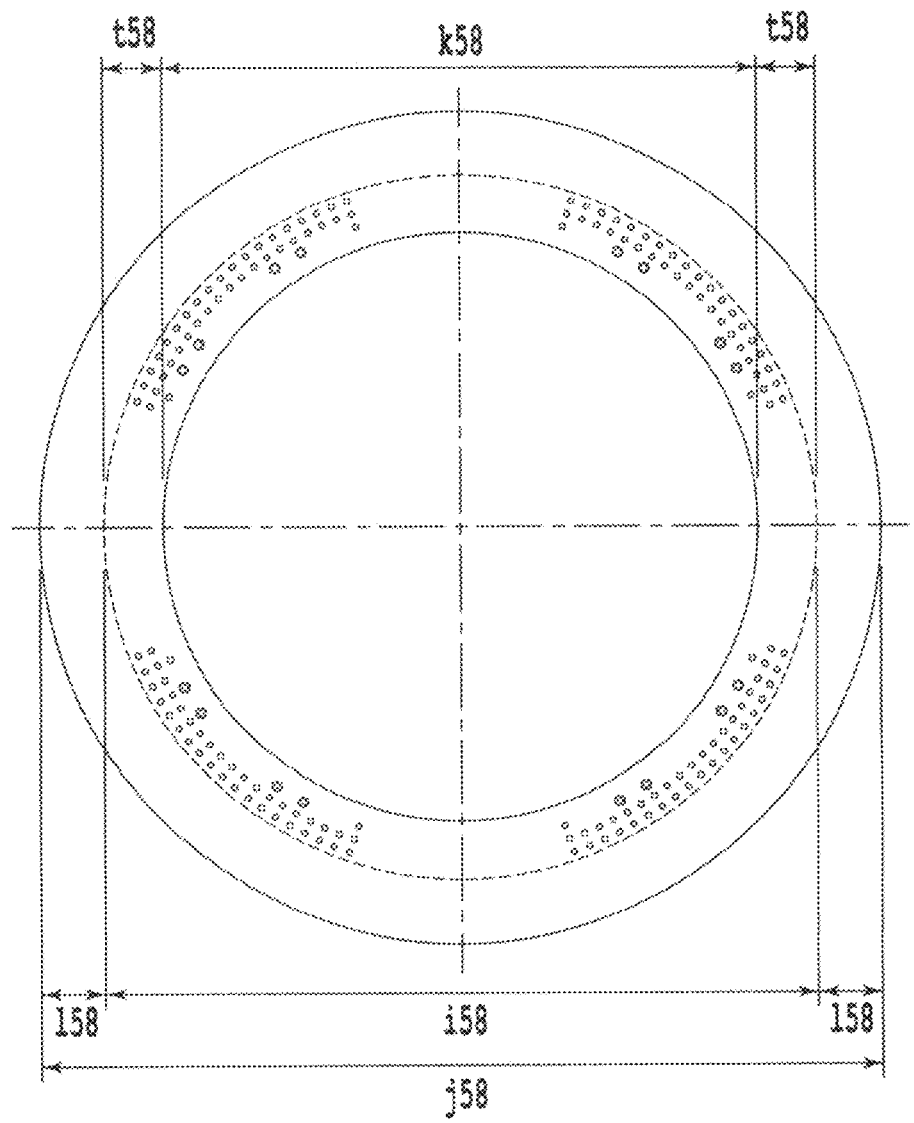
FIG. 51 depicts a cross-section of a second variant of a third embodiment at a fourth level.

Referring to FIG. 51 a cross-section of a third embodiment at a third level is circular, with an inner diameter (k58) of a first compartment with thickness (t58), and an outer diameter (i58) and an intermediate diameter (j58) defining a second compartment with thickness (l58). In this exemplary variant, the PT strands are distributed symmetrically in four groupings within the first compartment. In an exemplary embodiment, the distance j58 is 3.9 meters, the distance k58 is 3.25 meters, and the distance i58 is 4.6 meters. In other exemplary embodiments, the distance j58 is between 3 and 5 meters, the distance k58 is between 2.5 and 3.5 meters, and the distance i58 is between 4 and 5.5 meters.

Figure 52:
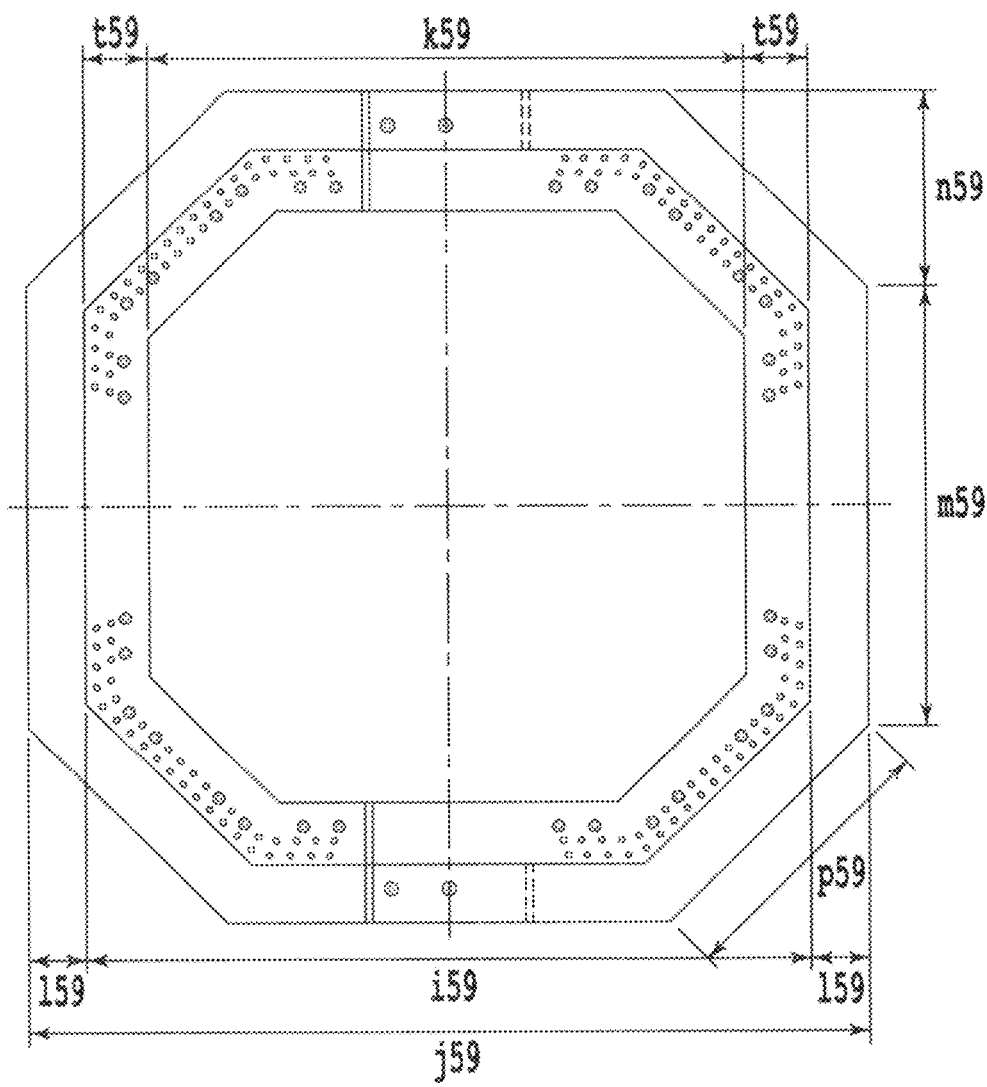
FIG. 52 depicts a cross-section of a first variant of a third embodiment at a fifth level.

In the exemplary embodiment of FIG. 52, a cross-section of a first variant of a third embodiment is shown at a fifth level. The cross-section is octagonal in shape, with inner width (k59), outer width (j59), and intermediate width (i59), such that the width of the inner compartment in which the PT strands are located is (t59), and the width of the outer compartment in which the rebars are located is (l59). The shape of the octagonal cross-section is further defined by dimensions (p59) and (n59) for the minor sides of the cross-section. In an exemplary embodiment, the width j59 is 3.7 meters, the width k59 is 3.0 meters, and the width i59 is 4.3 meters. The lengths m59 and n59 are 2.3 meters and 1 meter respectively, and p59 is 1.4 meters. In other exemplary embodiments, the width j59 is between 3 and 5 meters, the width k59 is between 2.5 and 3.5 meters, and the width i59 is between 3.5 and 5.5 meters. The lengths m59 and n59 are between 2.25 and 2.75 meters and between 0.5 and 1.5 meters respectively, and p59 is between 1.2 and 1.6 meters. In this variant, two groupings of two rebars are located opposite each other and along the main sides of the cross-section, of length (m59).

Figure 53:
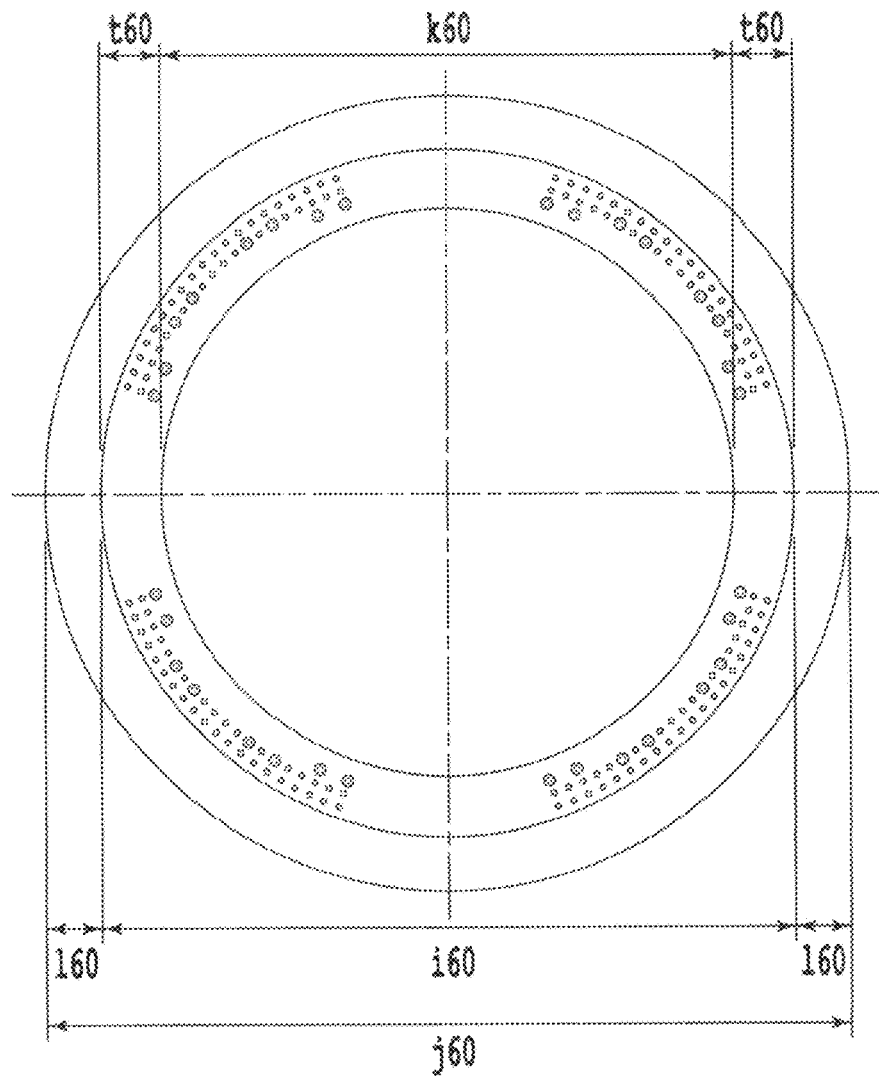
FIG. 53 depicts a cross-section of a second variant of a third embodiment at a fifth level.

Referring to the exemplary embodiment shown in FIG. 53, a cross-section of a second variant of a third embodiment at a fifth level is circular. The inner diameter (k60) of a first compartment has a thickness (t60), and an outer diameter (i60), with an intermediate diameter (j60) defining a second compartment with thickness (l60). In this exemplary variant, the PT strands are distributed symmetrically in four groupings within the first compartment.

In an exemplary embodiment, the distance j60 is 3.7 meters, the distance k60 is 3.0 meters, and the distance i60 is 4.3 meters. In other exemplary embodiments, the distance j60 is between 3 and 5 meters, the distance k60 is between 2.5 and 3.5 meters, and the distance i60 is between 4 and 5 meters.

Figure 54:
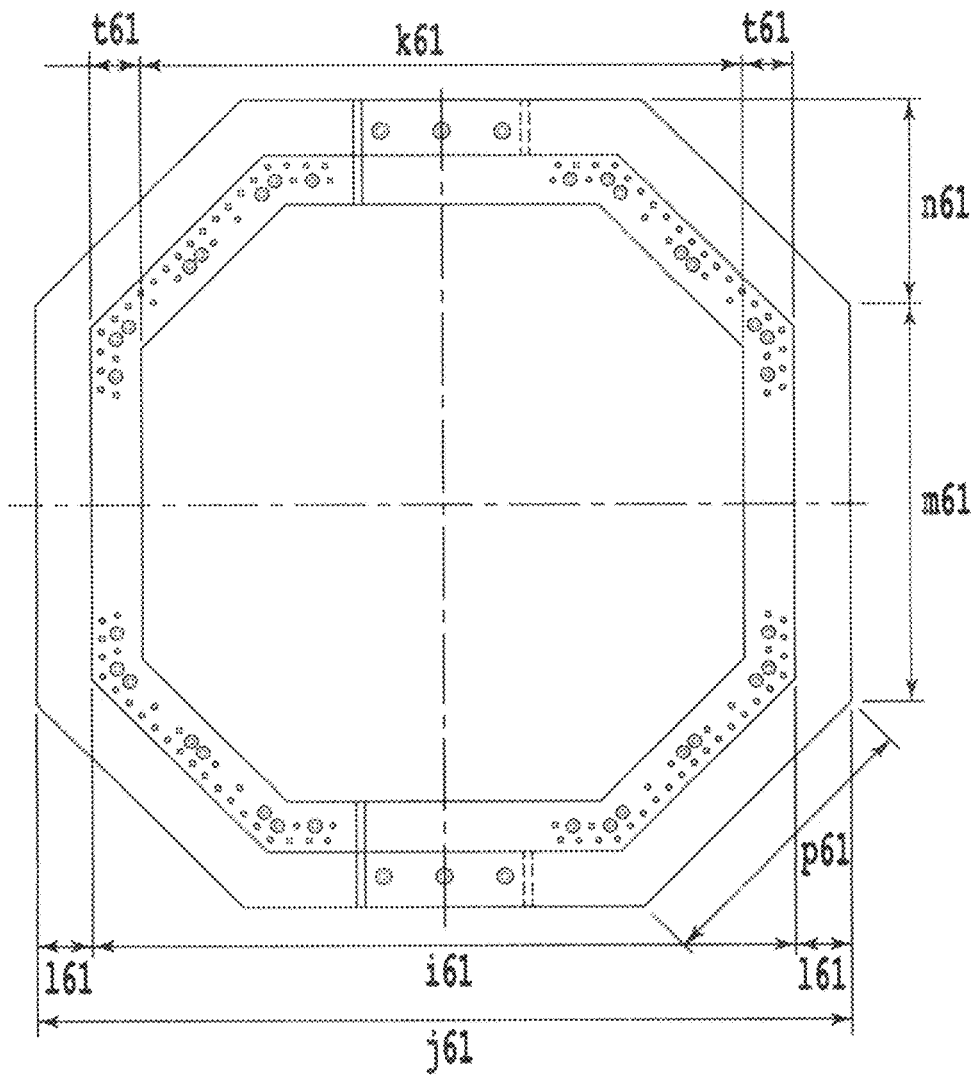
FIG. 54 depicts a cross-section of a first variant of a third embodiment at a sixth level.

As shown in the exemplary embodiment of FIG. 54, a cross-section of a first variant of a third embodiment at a sixth level is octagonal in shape, with inner width (k61), outer width (j61), and intermediate width (i61), such that the width of the inner compartment in which the PT strands are located is (t61), and the width of the outer compartment in which the rebars are located is (l61). In this variant, two groupings of three rebars are located opposite each other and along the main sides of the cross-section, of length (m61). The shape of the octagonal cross-section is further defined by dimensions (p61) and (n61) for the minor sides of the cross-section.

In an exemplary embodiment, the width j61 is 3.5 meters, the width k61 is 3.0 meters, and the width i61 is 4.0 meters. The lengths m61 and n61 are 2.0 meters and 1 meter respectively, and p61 is 1.4 meters. In other exemplary embodiments, the width j61 is between 3 and 4 meters, the width k61 is between 2.5 and 3.5 meters, and the width i61 is between 3.5 and 4.5 meters. The lengths m61 and n61 are between 1.5 and 2.5 meters and between 0.5 and 1.5 meters respectively, and p61 is between 1.2 and 1.6 meters.

Figure 55:
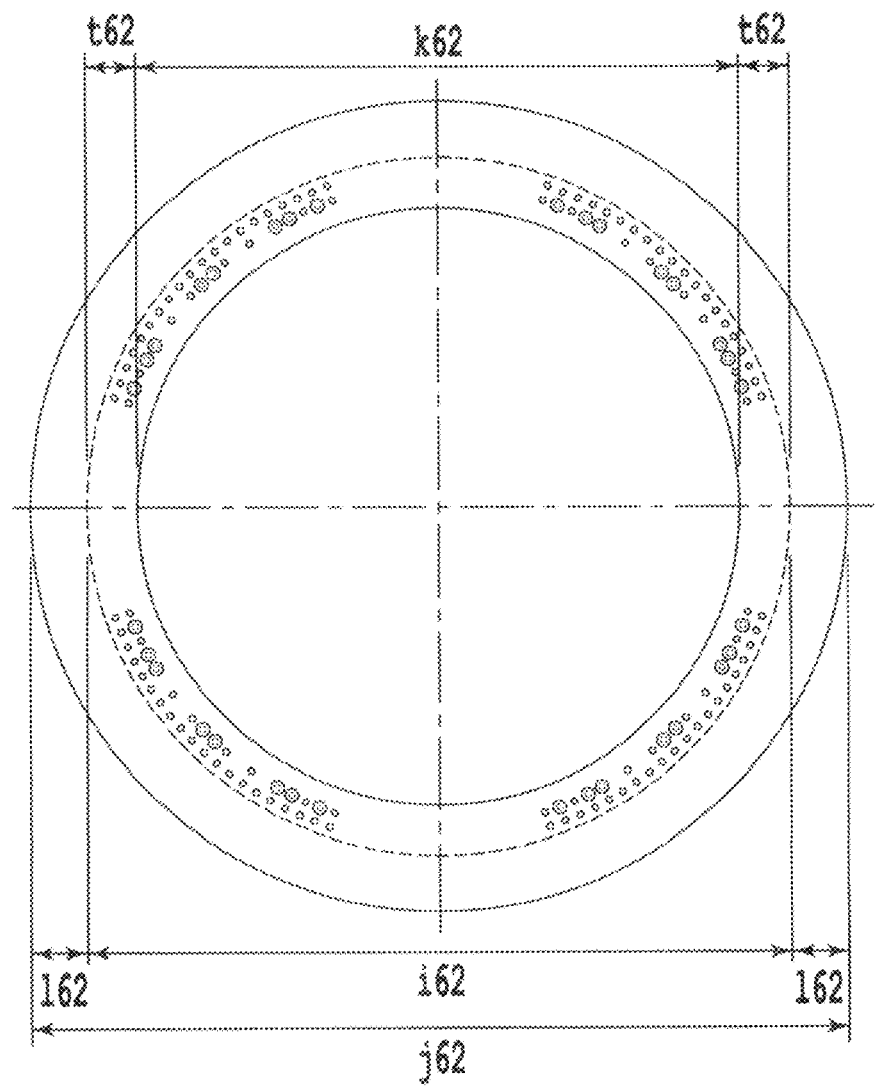
FIG. 55 depicts a cross-section of a second variant of a third embodiment at a sixth level.

FIG. 55 depicts a cross-section of a second variant of a third embodiment at a sixth level which is circular, with an inner diameter (k62) of a first compartment with thickness (t62), and an outer diameter (i62) and an intermediate diameter (j62) defining a second compartment with thickness (l62). In this exemplary variant, the PT strands are distributed symmetrically in four groupings within the first compartment. In this variant, two groupings of two rebars are located opposite each other and along the main sides of the cross-section, of length (m62). In an exemplary embodiment, the distance j62 is 3.5 meters, the distance k62 is 3.0 meters, and the distance i62 is 4.0 meters. In other exemplary embodiments, the distance j62 is between 3 and 4 meters, the distance k62 is between 2.5 and 3.5 meters, and the distance i62 is between 3.5 and 4.5 meters.

Figure 56:
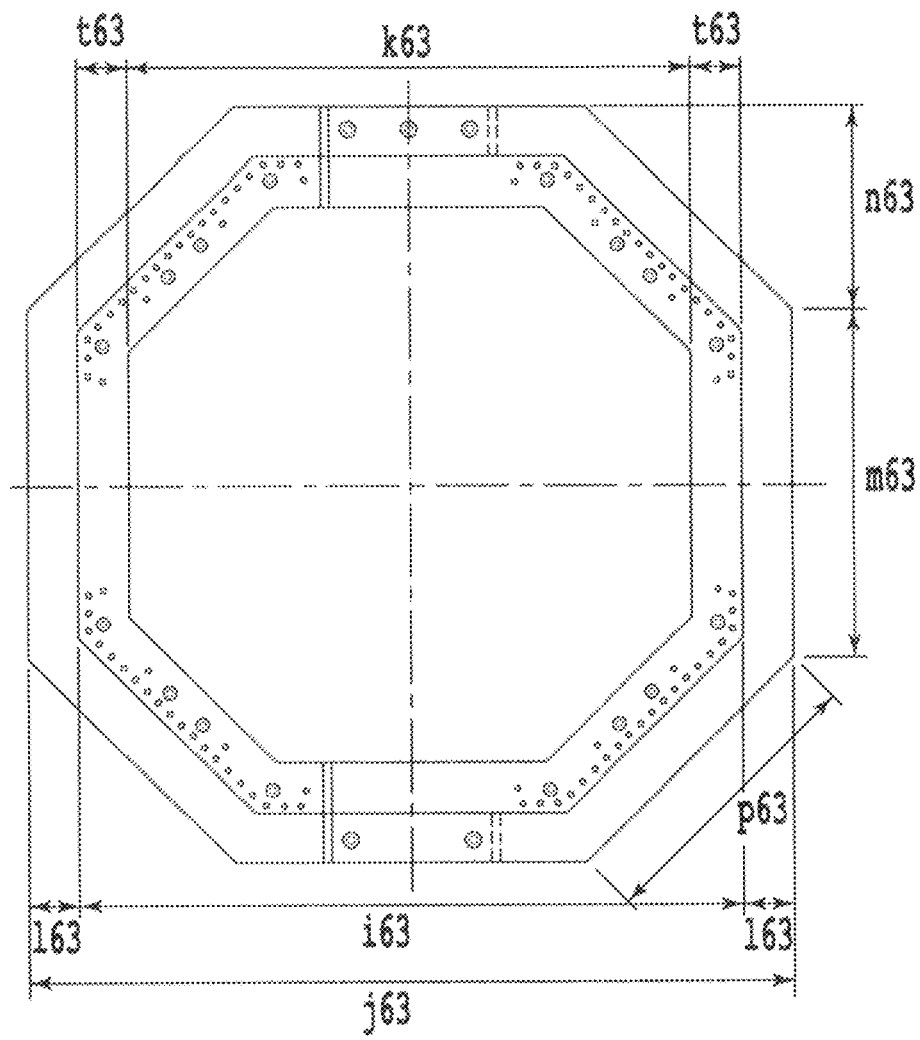
FIG. 56 depicts a cross-section of a first variant of a third embodiment at a seventh level.

As depicted in the exemplary embodiment of FIG. 56, a cross-section of a first variant of a third embodiment at a seventh level is octagonal. The cross-section has an inner width (k63), outer width (j63), and intermediate width (i63), such that the width of the inner compartment in which the PT strands are located is (t63), and the width of the outer compartment in which the rebars are located is (l63). In this variant, two groupings of two rebars are located opposite each other and along the main sides of the cross-section, of length (m63). The shape of the octagonal cross-section is further defined by dimensions (p63) and (n63) for the minor sides of the cross-section. In an exemplary embodiment, the width j63 is 3.2 meters, the width k63 is 2.8 meters, and the width i63 is 3.8 meters. The lengths m63 and n63 are 1.7 meters and 1 meter respectively. In other exemplary embodiments, the width j63 is between 2.5 and 4 meters, the width k63 is between 2 and 3.5 meters, and the width i63 is between 3 and 4.5 meters. The lengths m63 and n63 are between 1.5 and 2.0 meters and between 0.5 and 1.5 meters respectively.

Figure 57:
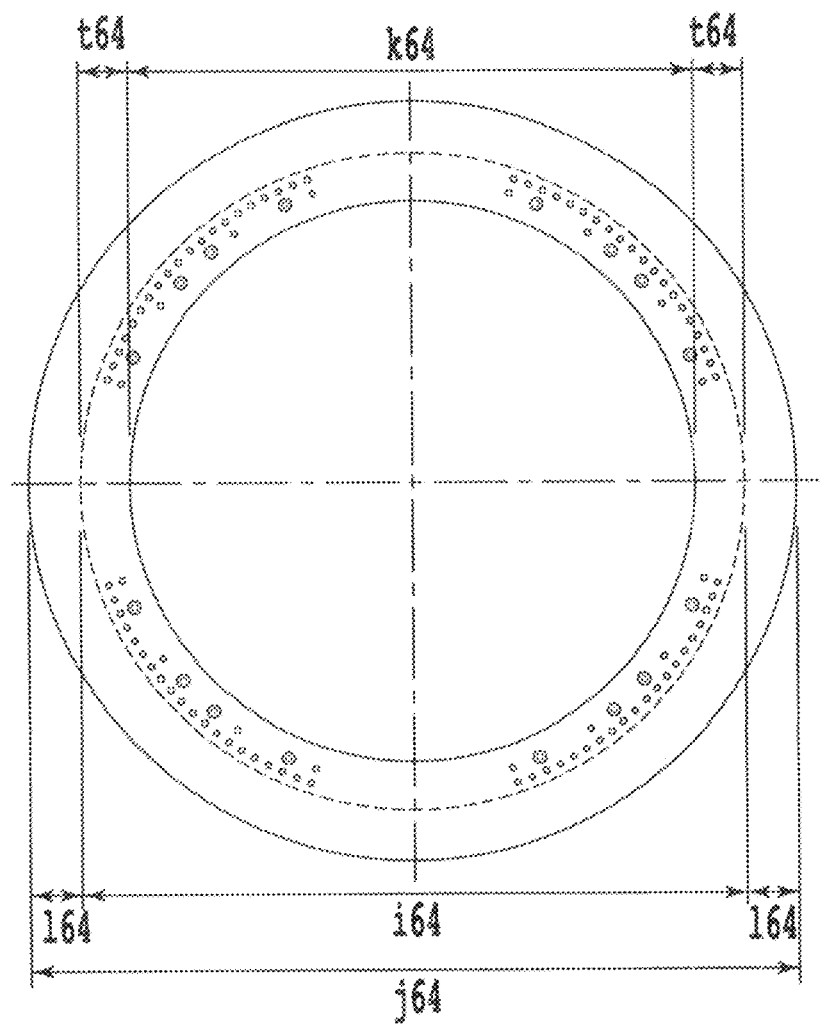
FIG. 57 depicts a cross-section of a second variant of a third embodiment at a seventh level.

Referring to the exemplary embodiment shown in FIG. 57, a cross-section of a second variant of a third embodiment at a seventh level is circular. An inner diameter (k64) of a first compartment has a thickness (t64), and an outer diameter (i64) and an intermediate diameter (j64) define a second compartment with thickness (l64). In this exemplary variant, the PT strands are distributed symmetrically in four groupings within the first compartment. In an exemplary embodiment, the distance j64 is 3.3 meters, the distance k64 is 2.8 meters, and the distance i64 is 3.8 meters. In other exemplary embodiments, the distance j64 is between 3 and 4 meters, the distance k64 is between 2.5 and 3.5 meters, and the distance i64 is between 3.5 and 4.5 meters.

Figure 58:
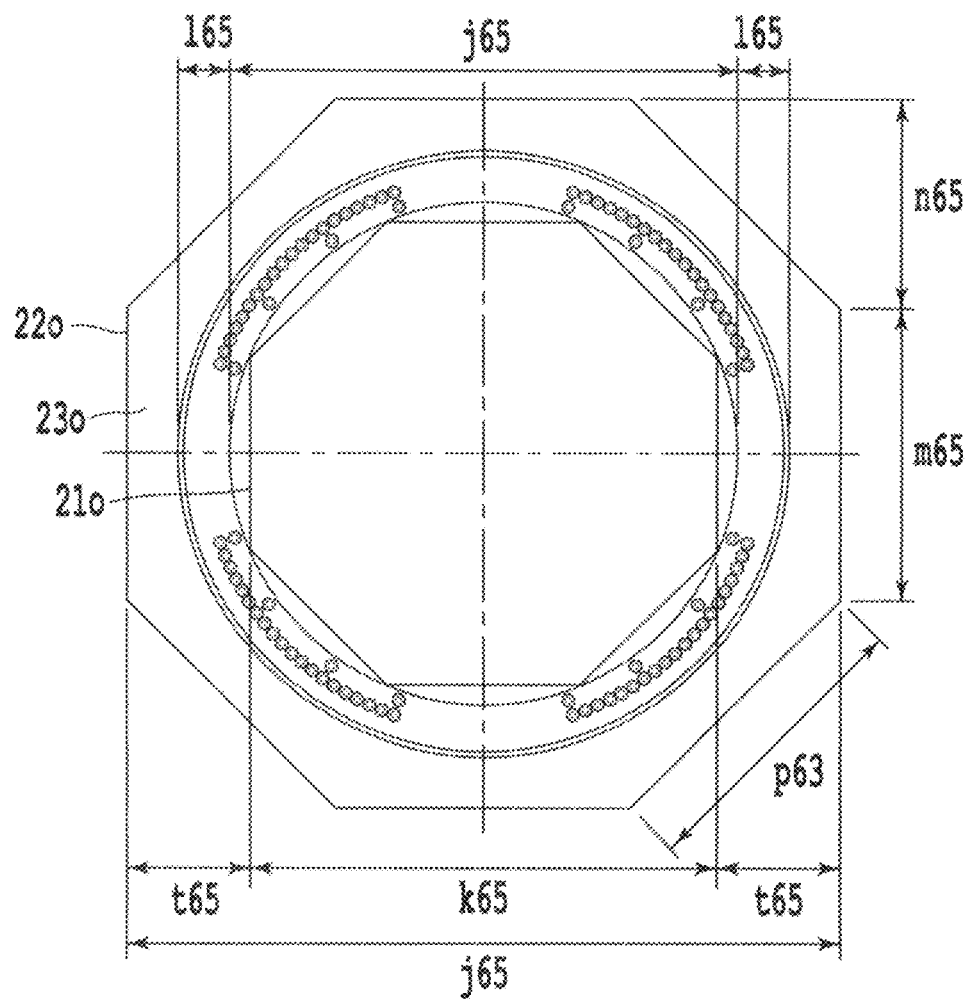
FIG. 58 depicts a cross-section of a first variant of a third embodiment at an eighth level.

FIG. 58 depicts a first variant of a cross-section of a third embodiment at an eighth level, with all PT strands capped off. Similarly to FIG. 14, the cross-section indicates that all PT strands are capped off on a steel plate (23o) protruding from the inner cylindrical steel section, and located between an inner concrete wall (21o) with an octagonal cross-section, and an outer concrete wall (22o) with an octagonal cross-section. The cross-section has an inner width (k65), outer width (j65), and intermediate width (i65), such that the width of the inner compartment in which the PT strands are located is (t65), and the width of the outer compartment in which the rebars are located is (l65). In this variant, the main sides of the cross-section have a length (m65). The shape of the octagonal cross-section is further defined by dimensions (p65) and (n65) for the length of the minor sides. In an exemplary embodiment, the width j65 is 2.5 meters, the width k65 is 2.3 meters, and the width i65 is 3.5 meters. The lengths m65 and n65 are 1.5 meters and 1 meter respectively, and p65 is 1.5 meters. In other exemplary embodiments, the width j65 is between 2 and 3 meters, the width k65 is between 2 and 3 meters, and the width i65 is between 3 and 4 meters. The lengths m65 and n65 are between 1 and 2 meters and between 0.5 and 1.5 meters respectively, and p65 is between 1.2 and 1.6 meters.

Figure 59:
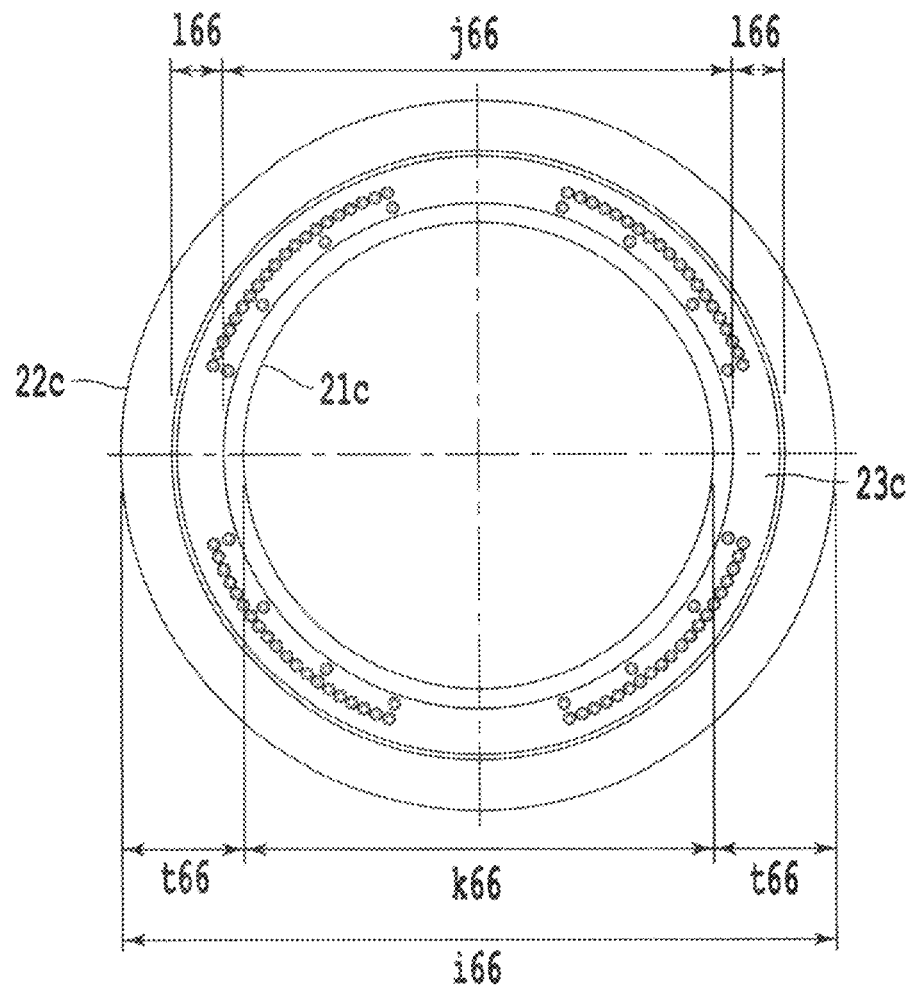
FIG. 59 depicts a cross-section of a second variant of a third embodiment at an eighth level.

Referring to the exemplary embodiment shown in FIG. 59, a cross-section of a second variant of a third embodiment at an eighth level is circular. Similarly to FIG. 14, the cross-section indicates that all PT strands are capped off on a steel plate (23c) protruding from the inner cylindrical steel section, and located between an inner concrete wall (21c) and outer concrete wall (22c). An inner diameter (k66) of a first compartment has a thickness (t66), with an outer diameter (i66) and an intermediate diameter (j66) defining a second compartment with thickness (l66). In this exemplary variant, the PT strands are distributed symmetrically in four groupings on the plate (23). In an exemplary embodiment, the distance j66 is 2.5 meters, the distance k66 is 2.3 meters, and the distance i66 is 3.5 meters. In other exemplary embodiments, the distance j66 is between 2 and 3 meters, the distance k66 is between 2 and 2.75 meters, and the distance i66 is between 3 and 4 meters.

Because many possible embodiments may be made of the invention without departing from the scope thereof, it is to be understood that all matter herein set forth or shown in the accompanying drawings is to be interpreted as illustrative and not in a limiting sense.

The invention claimed is:

1. A tower comprising:
a plurality of stacked sections extending in a longitudinal direction from a base section to a top section, at least one of the stacked sections including a first block and a second block joined together, the first block and the second block having interlocking portions such that a first portion of the first block is located above a first portion of the second block in the longitudinal direction, wherein a ratio of a height of the first portion of the first block in a longitudinal direction to a height of the first block in a longitudinal direction is between 0.2 and 0.35 and a ratio of a height of the first portion of the second block in a longitudinal direction to a height of the first block in a longitudinal direction is between 0.3 and 0.6.

2. The tower according to claim 1, wherein the first block and the second block have a same height in a longitudinal direction.

3. The tower according to claim 1, wherein an intermediate section between the base section and the top section includes the first block and the second block.

4. A tower comprising:
a foundation;
a plurality of stacked sections extending in a longitudinal direction from a base section to a top section and stacked on the foundation; and
a plurality of longitudinal post-tensioning strands each with a first end anchored at the foundation, and a second end, each strand adjacent to an interior surface of at least one stacked section, wherein a first number of the longitudinal post-tensioning strands are capped off at a top end of a first stacked section, a second number of the longitudinal post-tensioning strands are capped off at a top end of a top stacked section, and a ratio of the second number to a total number of strands is from 0.35 to 0.45.

5. The tower according to claim 4, wherein at least one of the stacked sections includes a first block and a second block joined together, the first block and the second block having interlocking portions such that a first portion of the first block is located above a first portion of the second block h the longitudinal direction.

6. The tower according to claim 5, wherein the first block and the second block have a same height in a longitudinal direction.

7. The tower according to claim 5, wherein a ratio of a height of the first portion of the first block in a longitudinal direction to a height of the first portion of the second block in a longitudinal direction is between 0.3 and 3.

8. The tower according to claim 5, wherein a ratio of a height of the first portion of the first block in a longitudinal direction to a height of the first portion of the second block in a longitudinal direction is substantially 1.

9. An assembly comprising:
a first block including concrete;
a second block including concrete and assembled with the first block at a same height as the first block;
wherein a connection between the first and second block includes at least one first joint substantially parallel to a main force on the assembly, and at least one second joint substantially perpendicular to the at least one first joint, wherein there is a gap between the first block and the second block along the at least one first joint, the gap extending an entire vertical distance from a top of the first block and the second block to a bottom of the first block and the second block, the gap including all of a volume between entire vertical facing sides of the first block and the second block such that substantially no loads are transferred through the first joint between the second end of the second block facing the first end of the first block, wherein the at least one second joint can withstand both axial and shear loads, and the assembly is a level of a tower, and the assembly is connected to levels above and below the assembly with joints that carry both shear and axial loads.

10. The assembly according to claim 9, wherein a ratio of a height in a longitudinal direction of the at least one first joint to a height of the first block or second block is between 0.3 and 0.6.

11. The assembly according to claim 10, wherein the ratio of the height in a longitudinal direction of the at least one first joint to the height of the first block or second block is substantially 0.5.

12. The assembly according to claim 9, wherein a ratio of a width of the at least second joint to a width of the first block is between 0.1 and 1.

13. The assembly according to claim 12, wherein the ratio of the width of the at least second joint to the width of the first block is substantially 0.25.

14. The assembly according to claim 9, wherein a combined length of the first and second blocks is between 6 and 13 meters.

15. The assembly according to claim 9, wherein a length of the at least one second joint is between 0.5 and 3 meters.

16. The assembly according to claim 15, wherein the length of the at least one second joint is substantially 1 meter.

17. The assembly according to claim 9, further comprising:

a non-structural caulk located in the gap to waterproof the gap.

18. An assembly comprising:
a first block including concrete;
a second block including concrete and assembled with the first block at a same height as the first block;
wherein a connection between the first and second block includes at least one first joint substantially parallel to a main force on the assembly, and at least one second joint substantially perpendicular to the at least one first joint, wherein there is a gap between the first block and the second block along the at least one first joint, the gap extending an entire vertical distance from a top of the first block and the second block to a bottom of the first block and the second block, the gap including all of a volume between entire vertical facing sides of the first block and the second block such that substantially no loads are transferred through the first joint between the second end of the second block facing the first end of the first block, wherein the at least one second joint can withstand both axial and shear loads, the first block and the second block are both precast concrete blocks, and both the first block and the second block are connected to levels above and below the first block and the second block using rebars.

* * * * *